United States Patent
Nonaka

(10) Patent No.: US 8,306,879 B2
(45) Date of Patent: *Nov. 6, 2012

(54) ELECTRONIC SETTLEMENT SYSTEM, ELECTRONIC SETTLEMENT SERVER, MOBILE COMMUNICATIONS TERMINAL, AND ELECTRONIC SETTLEMENT METHOD

(75) Inventor: Nobuyuki Nonaka, Chiba (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/996,178

(22) PCT Filed: Jun. 12, 2008

(86) PCT No.: PCT/JP2008/060758
§ 371 (c)(1),
(2), (4) Date: Feb. 17, 2011

(87) PCT Pub. No.: WO2009/150734
PCT Pub. Date: Dec. 17, 2009

(65) Prior Publication Data
US 2011/0137765 A1 Jun. 9, 2011

(51) Int. Cl.
*G07B 17/00* (2006.01)
*G06Q 40/00* (2012.01)
(52) U.S. Cl. .......................................... 705/30; 705/39
(58) Field of Classification Search .................. None
See application file for complete search history.

(56) References Cited

U.S. PATENT DOCUMENTS
7,711,100 B2 * 5/2010 Dennis ...................... 379/201.01
2004/0210487 A1 * 10/2004 Fujimoto et al. ............. 705/17

FOREIGN PATENT DOCUMENTS
JP 2002 210186 7/2002
JP 2002210186 * 7/2002
JP 2002 224423 8/2002
(Continued)

OTHER PUBLICATIONS

International Search Report Issued Jul. 29, 2008 in PCT/JP08/060758 filed Jun. 12, 2008.

*Primary Examiner* — Mussa A Shaawat
(74) *Attorney, Agent, or Firm* — Lexyoume IP Meister, PLLC.

(57) ABSTRACT

An electronic settlement system which is similar to cash settlement and which is usable in a gaming parlor is provided. In the electronic settlement system, a mobile phone communicates with a ball lending machine using a contactless IC card to acquire a device ID from the ball lending machine, and transmits a payment request message including the device ID and a user ID to an electronic settlement server. The electronic settlement server notifies an in-store server of a transfer amount from a user account to a settlement provider account, and the in-store server stores the transfer amount as a deposit. In response to a payment request message from the mobile phone, the in-store server instructs the ball lending machine to provide gaming media corresponding to a gaming medium cost, adds an amount corresponding to the gaming medium cost to a consumed amount, and issues a transfer request to a receiving network so as to transfer the consumed amount from the settlement provider account to a gaming parlor operator account. Upon receiving a provision instruction message from the in-store server, the ball lending machine provides gaming media corresponding to the gaming medium cost.

4 Claims, 30 Drawing Sheets

FOREIGN PATENT DOCUMENTS

| | | | |
|---|---|---|---|
| JP | 2003 132402 | | 5/2003 |
| JP | 2003132402 | * | 5/2003 |
| JP | 2006 127390 | | 5/2006 |
| JP | 2006127390 | * | 5/2006 |
| JP | 2006 146344 | | 6/2006 |
| JP | 2007 286986 | | 11/2007 |
| WO | 97 45814 | | 12/1997 |
| WO | WO 9745814 A1 | * | 12/1997 |
| WO | 02 097695 | | 12/2002 |

* cited by examiner

FIG.6

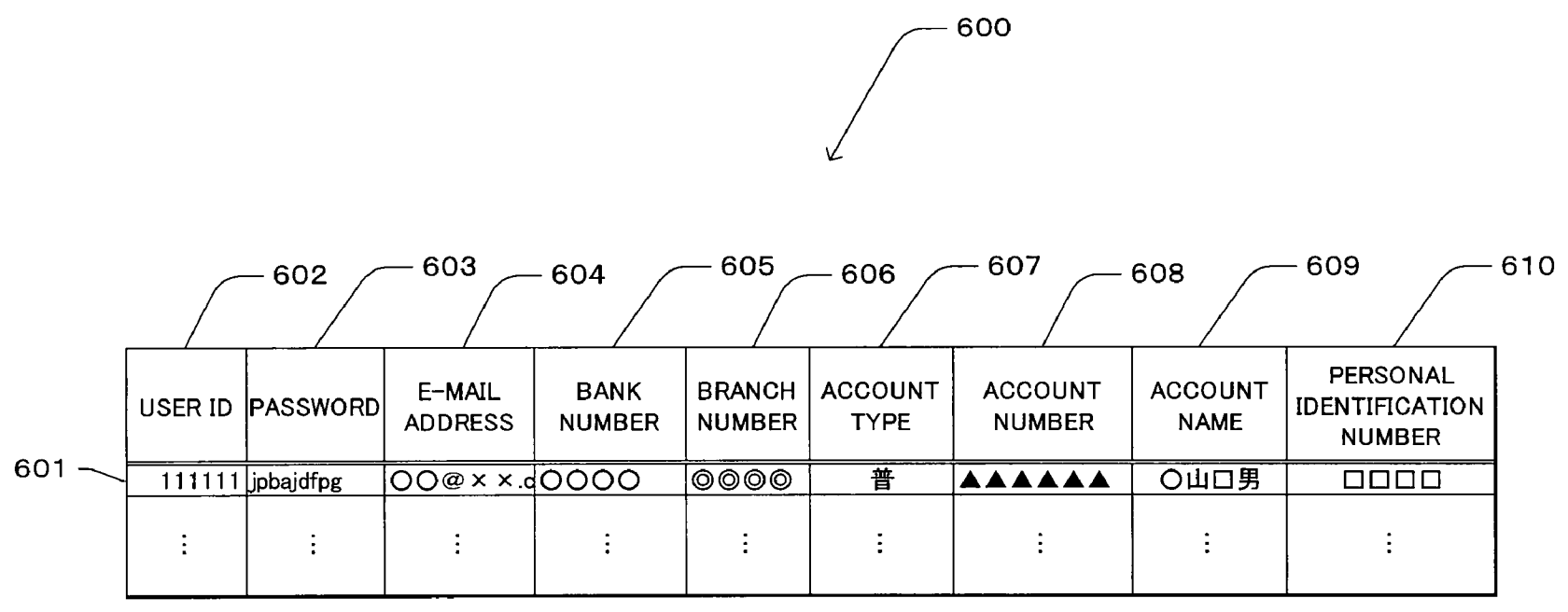

| USER ID | PASSWORD | E-MAIL ADDRESS | BANK NUMBER | BRANCH NUMBER | ACCOUNT TYPE | ACCOUNT NUMBER | ACCOUNT NAME | PERSONAL IDENTIFICATION NUMBER |
|---|---|---|---|---|---|---|---|---|
| 111111 | jpbajdfpg | ○○@×××.c | ○○○○ | ◎◎◎ | 普 | ▲▲▲▲▲▲ | ○山口男 | □□□□ |
| ... | ... | ... | ... | ... | ... | ... | ... | ... |

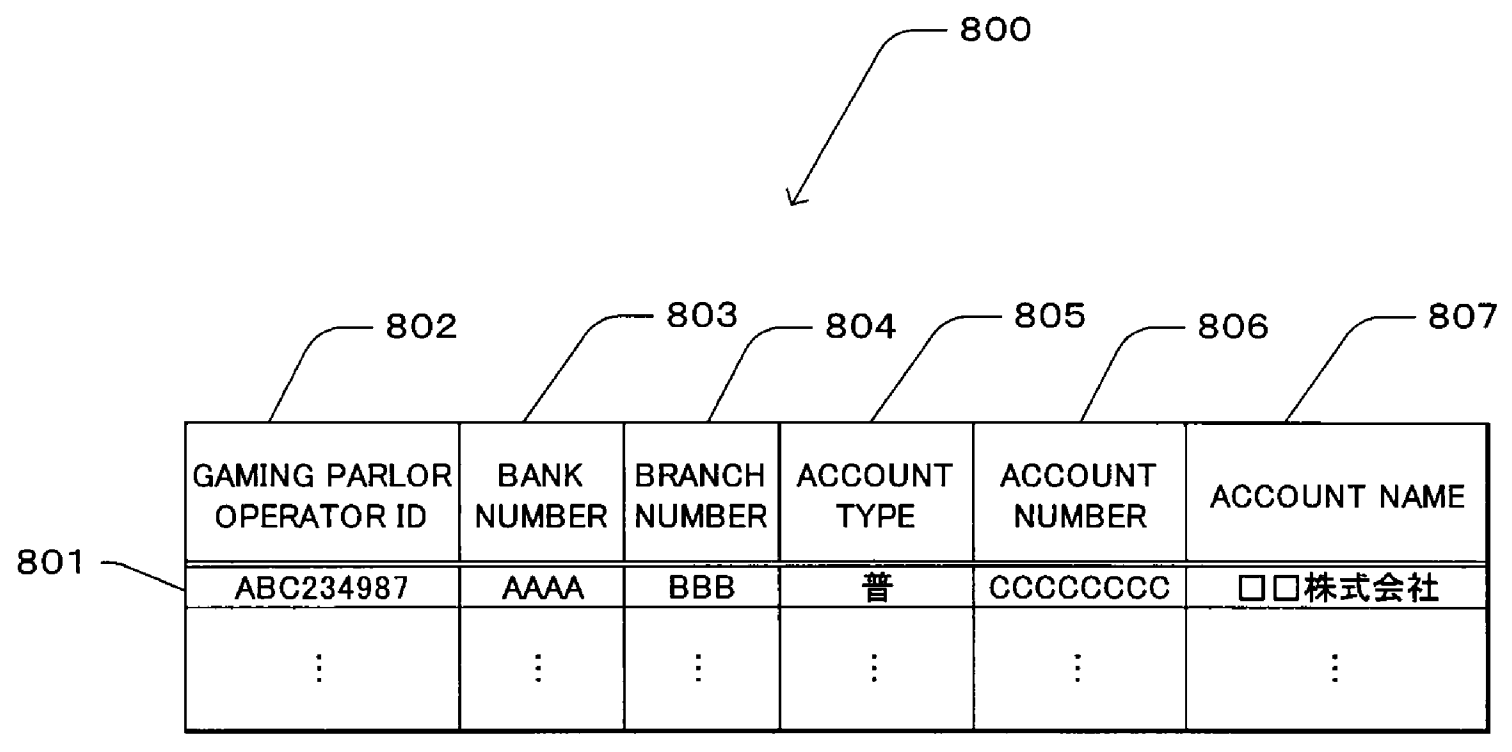

| GAMING PARLOR OPERATOR ID | BANK NUMBER | BRANCH NUMBER | ACCOUNT TYPE | ACCOUNT NUMBER | ACCOUNT NAME |
|---|---|---|---|---|---|
| ABC234987 | AAAA | BBB | 普 | CCCCCCC | □□株式会社 |
| ... | ... | ... | ... | ... | ... |

FIG.8

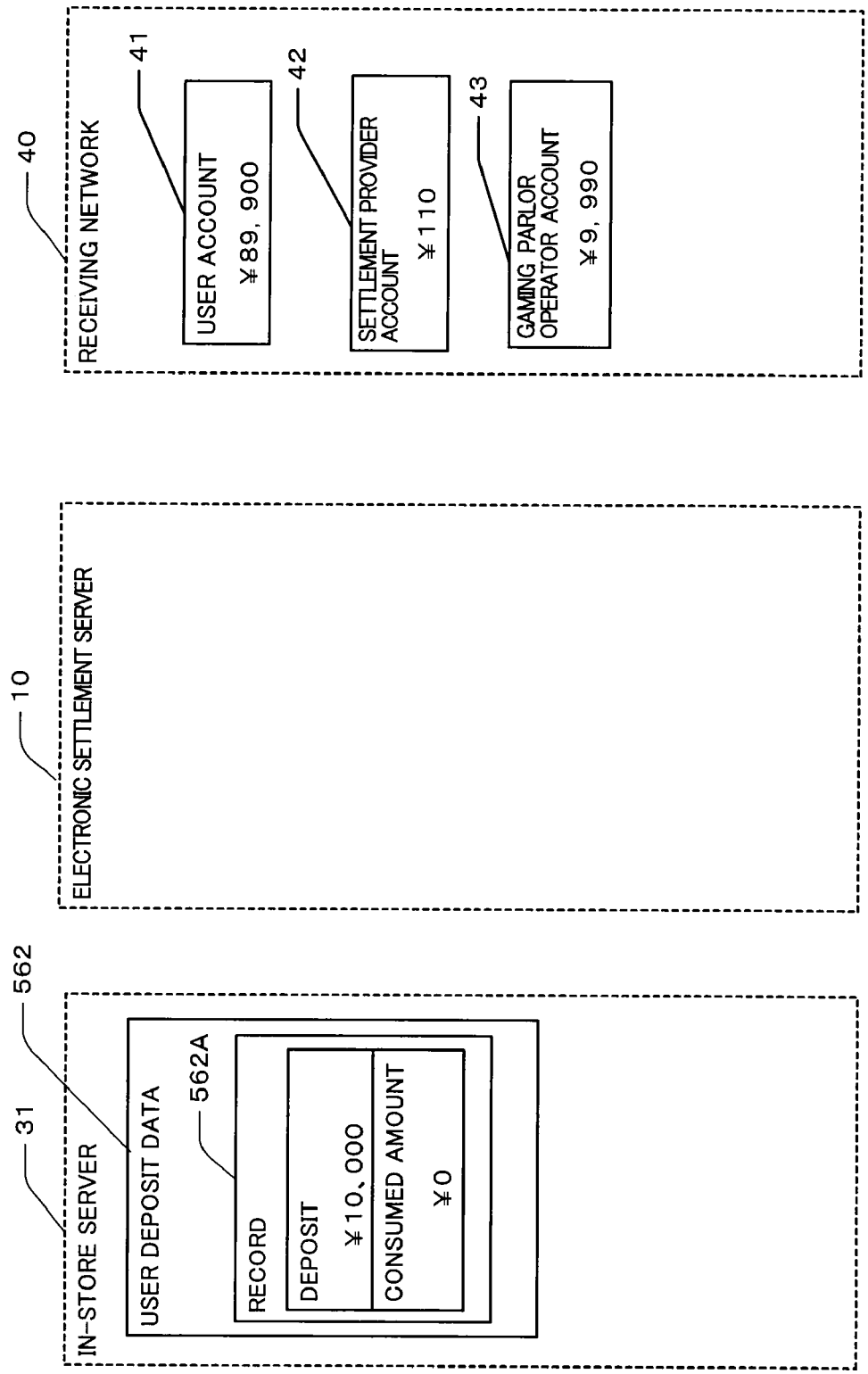

ELECTRONIC SETTLEMENT SYSTEM, ELECTRONIC SETTLEMENT SERVER, MOBILE COMMUNICATIONS TERMINAL, AND ELECTRONIC SETTLEMENT METHOD

TECHNICAL FIELD

The present invention relates to an electronic settlement system, an electronic settlement server, a mobile communications terminal, and an electronic settlement method. More particularly, the present invention relates to an electronic settlement system, an electronic settlement server, a mobile communications terminal, and an electronic settlement method for realizing electronic settlement pursuant to cash settlement.

BACKGROUND ART

Recent developments in information processing technology and communication technology and a spread of communication infrastructure have led to a diversification of payment methods for fees and costs. As a result, various methods as alternatives to payment by cash have been proposed and used.

Alternative cost payment methods to cash include credit cards which embody a so-called deferred payment style and prepaid cards which embody a so-called advance payment style.

With respect to payment at a gaming parlor such as a pachinko parlor, a casino, a betting booth at race events such as keirin or horse racing, various lottery stands, and a gaming arcade in which game machines are arranged (hereinafter simply referred to as a "gaming parlor"), the use of payment methods other than cash promises improved convenience for a user (gamer) as well as an improvement in earnings for the gaming parlor due to an increase in the utilization ratio of gaming machines.

DISCLOSURE OF THE INVENTION

Problems to be Solved by the Invention

However, due to regulations intended to prevent excessive borrowing by a gamer, the use of credit cards at a gaming parlor is generally restricted. In addition, hypothetically speaking, even if a settlement method using credit cards is to become available at a gaming parlor, bothersome situations may occur such as a record of credit use being mailed to a home or, depending on usage situations, a credit provider calling a user for identification purposes. Furthermore, due to a risk of personal information leakage, a gamer may harbor a considerable disinclination towards providing a credit card number and a personal identification number to the gaming parlor to perform a settlement, in which case a record of personal information is to be retained inside the gaming parlor. Accordingly, given the present circumstances, it is difficult to popularize the use of credit card settlement in gaming parlors.

Furthermore, although a settlement method using a prepaid card also exists as an alternative payment method to cash and credit cards, prepaid cards cannot be additionally purchased when, as a result of gaming, a gamer uses up all cash in hand. As such, even if a gamer desires to continue playing or to make some kind of a purchase at a gaming parlor after using all cash in hand for gaming, in the present circumstances, no settlement methods capable of satisfying such demands are available. Accordingly, a gaming parlor has had no choice but to let such potential demands slip by.

It is an object of the present invention to provide a novel electronic settlement system which is similar to cash settlement and which is usable in a gaming parlor.

Means for Solving the Problems

In order to achieve the object described above, the present invention is provided with the following features.

A first aspect of the present invention is proposed as an electronic settlement system including: an electronic settlement server capable of requesting, via a communication network, a receiving network (for example, the Multi-Payment Network operated in Japan; refer to http://www.jampa.gr.jp/pub/) capable of transferring money among a user account, a settlement provider account, and a gaming parlor operator account, to make a transfer among the accounts; an in-store server capable of communicating with the electronic settlement server via a communication network; a negotiable value providing device (for example, a ball lending machine, a sandwiched machine (a bill acceptor sandwiched between adjacent gaming machines), and a prepaid card issuing machine) capable of communicating with the in-store server; and a mobile communications terminal (for example, a mobile phone mounted with a contactless IC card) capable of communicating, via a communication network, with the in-store server as well as with the negotiable value providing device.

The electronic settlement server stores, for each user, a user retained amount that is an amount usable at each in-store server, transmits, to the receiving network, a transfer request message that requests a user transfer amount (for example, an amount obtained by adding a settlement provider handling fee to a transfer amount) corresponding to a transfer amount specified by a user to be transferred from a user account of the user to the settlement provider account, and adds the user transfer amount to the user retained amount and transmits a user deposit processing request message notifying the user transfer amount to the in-store server; the in-store server calculates and stores, according to the user deposit processing request message, a deposit that is an amount deposited by the user; the mobile communications terminal acquires, from the negotiable value providing device, a device identification information (for example, a device ID) that identifies the negotiable value providing device, generates a payment request message including the device identification information, and transmits the payment request message to the in-store server; the in-store server transmits, to the negotiable value providing device identified by the device identification information, in response to the payment request message from the mobile communications terminal, a provision instruction message that instructs a negotiable value (for example, a rental ball, a rental medal, a prepaid card, a house card that is valid only inside the gaming parlor, and a casino chip; hereinafter referred to as a negotiable value) to be provided, subtracts an amount corresponding to a user payable amount that is a cost of provision of the negotiable value from the user deposit and adds an amount corresponding to the user payable amount to the user consumed amount, and transmits a consumed amount notification message that notifies the consumed amount to the electronic settlement server; the negotiable value providing device provides a negotiable value corresponding to the user payable amount upon receiving the provision instruction message from the in-store server; and the electronic settlement server adds the consumed amount to a gaming parlor operator retained amount in response to the consumed amount notification message, and transmits, to the receiving network, a transfer request message that requests the receiving network to transfer an amount corresponding to the gaming parlor operator retained amount from the settlement provider account to the gaming parlor operator account.

According to the electronic settlement system described above, a novel settlement method that is an alternative to existing settlement methods such as a credit card and a debit card can be provided.

A second aspect of the present invention is proposed as an electronic settlement server capable of requesting, via a communication network, a receiving network (for example, the Multi-Payment Network) capable of transferring money among a user account, a settlement provider account, and a gaming parlor operator account, to make a transfer among the accounts.

The electronic settlement server includes: storage means (for example, a database unit) storing a user retained amount that is an amount usable by each user at each in-store server and a gaming parlor operator retained amount of each gaming parlor operator; a transfer request processing unit that transmits, to the receiving network, a transfer request message that requests a user transfer amount (for example, an amount obtained by adding a settlement provider handling fee to a transfer amount specified by a user) corresponding to a transfer amount specified by a user to be transferred from a user account of the user to the settlement provider account, adds the user transfer amount to the user retained amount, and transmits a user deposit processing request message notifying the user transfer amount, and adjustment processing means (for example, an adjustment processing unit) which, in response to a consumed amount notification message that notifies a consumed amount that is a total amount payable by the user as a cost of provision of a negotiable value, adds the consumed amount to the gaming parlor operator retained amount, and transmits, to the receiving network, a transfer request message that requests the receiving network to transfer an amount corresponding to the gaming parlor operator retained amount (for example, an amount obtained by subtracting a settlement provider handling fee from a gaming parlor operator retained amount) from the settlement provider account to the gaming parlor operator account.

According to the electronic settlement server described above, a novel settlement method that is an alternative to existing settlement methods such as a credit card and a debit card can be provided.

A third aspect of the present invention is proposed as an in-store server capable of communicating, via a communication network, with an electronic settlement server capable of requesting, via a communication network, a receiving network capable of transferring money among a user account, a settlement provider account, and a gaming parlor operator account, to make a transfer among the accounts.

The in-store server includes: storage means (for example, a database unit) that stores a deposit and a consumed amount of each user; deposit processing means (for example, a deposit processing unit) that calculates, and causes to be stored, a deposit in response to a user deposit processing request message transmitted from the electronic settlement server; payment request processing means (for example, a payment request processing unit) which, upon receiving a payment request message that requests payment of a user payable amount that is a cost of provision of a negotiable value, subtracts an amount corresponding to the user payable amount from the deposit and adds an amount corresponding to the user payable amount to the consumed amount; provision instructing means (for example, a provision instructing unit) which, according to a result of subtracting the user payable amount from the deposit, transmits a provision instruction message that instructs provision of a negotiable value; and adjustment processing means (for example, an adjustment processing unit) that transmits a consumed amount notification message that notifies a consumed amount to the electronic settlement server.

According to the in-store server described above, a novel settlement method that is an alternative to existing settlement methods such as a credit card and a debit card can be provided.

A fourth aspect of the present invention is proposed as a mobile communications terminal for an electronic settlement system. The mobile communications terminal is adapted to, by communicating with a negotiable value providing device (for example, a ball lending machine, a sandwiched machine, and a prepaid card issuing machine) by near field communication means (for example, a chip for a contactless IC card), acquire device identification information (for example, a device ID) that identifies the negotiable value providing device from the negotiable value providing device, generate a payment request message including the device identification information, transmit the payment request message to the in-store server, and cause the in-store server to instruct the negotiable value providing device to provide a negotiable value corresponding to a user payable amount (for example, a rental ball cost equivalent to 1,000 yen) that is a cost of provision of the negotiable value.

A fifth aspect of the present invention is proposed as an electronic settlement method.

The electronic settlement method includes the steps of: transmitting a transfer request message that requests a receiving network to transfer a transfer amount specified by a user from a user account to a settlement provider account (for example, transfer request message transmission S204); adding a user transfer amount that is an amount corresponding to the transfer amount to the user retained amount and causing the user retained amount to be stored (for example, retained amount data processing S207); transmitting a user deposit message notifying the user retained amount (for example, user deposit processing request message transmission S208); receiving the user deposit message, calculating a deposit according to the user deposit message, and causing the deposit to be stored (for example, deposit data update processing S209); receiving a payment request message including device identification information which identifies a negotiable value providing device and which is acquired by communicating with the negotiable value providing device using near field communication means (for example, payment request message transmission S303); calculating a consumed amount that is a total user payable amount that is a cost of provision of a negotiable value and causing the consumed value to be stored in response to the payment request message (for example, consumed amount processing S308); transmitting, when the deposit and the consumed amount satisfy a predetermined condition, in response to the payment request message, a provision instruction message that instructs a negotiable value providing device identified by the device identification information to provide a negotiable value corresponding to the user payable amount (for example, deposit check S304, provision instruction message transmission S305); transmitting a consumed amount notification message for notifying the consumed amount (for example, consumed amount notification message transmission S404); adding an amount corresponding to the consumed amount to a gaming parlor operator retained amount and storing the same in response to the consumed amount notification message (for example, retained amount adjustment processing S406); and transmitting a transfer request message that requests the receiving network to transfer an amount corresponding to the gaming parlor operator retained amount from the settlement provider account to the gaming parlor operator account (for example, transfer request message transmission S408).

According to the electronic settlement method described above, a novel settlement method that is an alternative to existing settlement methods such as a credit card and a debit card can be provided.

A sixth aspect of the present invention is proposed as an electronic settlement system including: an electronic settlement server capable of requesting, via a communication network, a receiving network (for example, the Multi-Payment Network) capable of transferring money among a user account, a settlement provider account, and a gaming parlor operator account, to make a transfer among the accounts; an in-store server capable of communicating with the electronic settlement server via a communication network; a negotiable value providing device (for example, a ball lending machine or a sandwiched machine) capable of communicating with the in-store server; and a mobile communications terminal (for example, a mobile phone mounted with a contactless IC card) capable of communicating, via a communication device, with the in-store server as well as with the negotiable value providing device.

The electronic settlement server transmits, to the receiving network, a transfer request message that requests a user transfer amount (for example, an amount obtained by subtracting a handling fee to be paid to a settlement provider from a transfer amount) corresponding to a transfer amount specified by a user to be transferred from the user account to the settlement provider account, transmits, to the receiving network, a transfer request message that requests an amount corresponding to a user transfer amount to be transferred from the settlement provider account to the gaming parlor operator account, and transmits, to the in-house server, a user deposit processing request message notifying the user transfer amount; the in-house server calculates and stores a user deposit (for example, a deposit 1501) that indicates a deposit from the user in response to the user deposit processing request message; the mobile communications terminal acquires, from the negotiable value providing device, device identification information (for example, a device ID) that identifies the negotiable value providing device, generates a payment request message including the device identification information, and transmits the payment request message to the in-house server; the in-house server transmits, in response to the payment request message from the mobile communications terminal, a provision instruction message that instructs provision of a negotiable value to a negotiable value providing device identified by the device identification information; and the negotiable value providing device provides a negotiable value corresponding to a user payable amount that is a cost of provision of the negotiable value upon receiving the provision instruction message from the in-house terminal.

According to the electronic settlement server described above, a novel settlement method that is an alternative to existing settlement methods such as a credit card and a debit card can be provided.

A seventh aspect of the present invention is an electronic settlement server capable of requesting, via a communication network, a receiving network (for example, the Multi-Payment Network) capable of transferring money among a user account, a settlement provider account, and a gaming parlor operator account, to make a transfer among the accounts, wherein the electronic settlement server: transmits, to the receiving network, a transfer request message that requests a user transfer amount (for example, an amount obtained by adding a settlement provider handling fee to a transfer amount) corresponding to a transfer amount specified by a user to be transferred from the user account to the settlement provider account; transmits, to the receiving network, a transfer request message that requests an amount corresponding to the user transfer amount from the settlement provider account to the gaming parlor operator account; and transmits a user deposit processing request message notifying the user transfer amount.

According to the electronic settlement server described above, a novel settlement method that is an alternative to existing settlement methods such as a credit card and a debit card can be provided.

An eighth aspect of the present invention is proposed as an in-store server capable of communicating, via a communication network, with an electronic settlement server capable of requesting, via a communication network, a receiving network (for example, the Multi-Payment Network) capable of transferring money among a user account, a settlement provider account, and a gaming parlor operator account, to make a transfer among the accounts.

The in-store server includes: storage means (for example, a database unit) that stores a deposit (for example, a deposit 1501) and a consumed amount (a consumed amount 1502) of each user; deposit processing means (for example, a deposit processing unit) that calculates, and causes to be stored, a deposit in response to a user deposit processing request message transmitted from the electronic settlement server; payment request processing means (for example, a payment request processing unit) which, upon receiving a payment request message that requests payment of a user payable amount that is a cost of provision of a negotiable value, subtracts the user payable amount from the deposit and stores the same; and provision instructing means (for example, a provision instructing unit) which, according to a result of subtracting the user payable amount from the deposit, transmits a provision instruction message that instructs provision of a negotiable value.

According to the in-store server described above, a novel settlement method that is an alternative to existing settlement methods such as a credit card and a debit card can be provided.

A ninth aspect of the present invention is proposed as an electronic settlement method. The electronic settlement method includes the steps of: transmitting a transfer request message that requests a receiving network to transfer a user transfer amount (for example, an amount obtained by subtracting a handling fee to be paid to a settlement provider from a transfer amount) corresponding to a transfer amount specified by a user from a user account to a settlement provider account (for example, transfer request message transmission S504); transmitting, to the receiving network, a transfer request message that requests transfer of an amount corresponding to the user transfer amount from the settlement provider account to the gaming parlor operator account (for example, transfer request message transmission S507); transmitting a user deposit message notifying a user deposit that is an amount corresponding to the transfer amount (for example, user deposit processing request message transmission S510); receiving the user deposit message, calculating a deposit according to the user deposit message, and causing the deposit to be stored (for example, deposit data update processing S511); receiving a payment request message including device identification information that identifies a negotiable value providing device that is acquired by communicating with the negotiable value providing device using near field communication means (for example, payment request message transmission S303); calculating a consumed amount that is a total user payable amount that is a cost of provision of a negotiable value and causing the consumed value to be stored in response to the payment request message (for example, consumed amount processing S308); and transmitting, when the deposit and the consumed amount satisfy a predetermined condition, in response to the payment request message, a provision instruction message that instructs the negotiable value providing device to provide a negotiable value corresponding to the user payable amount (for example, deposit check S304, provision instruction message transmission S305).

According to the electronic settlement method described above, a novel settlement method that is an alternative to existing settlement methods such as a credit card and a debit card can be provided.

ADVANTAGE OF THE INVENTION

According to the present invention, simple and secure electronic settlement that is usable in a gaming parlor can be realized.

BEST MODE FOR CARRYING OUT THE INVENTION

Hereinafter, embodiments of the present invention will be described with reference to the drawings.

[I. First Embodiment]

[1. Configuration Example of Electronic Settlement System]

FIG. 1 is a network diagram illustrating an example of an electronic settlement system.

In the example illustrated in the diagram, an electronic settlement system 1 includes an electronic settlement server 10, a mobile communications terminal 20, a negotiable value providing device 30, and an in-store server 31.

The electronic settlement server 10 is connected to the mobile communications terminal 20, the in-store server 31, and a receiving network 40 via a communication network 50. The receiving network 40 is a system that executes, based on an instruction from the electronic settlement server 10, transfer processing of a specified amount from an account of a user to a specified transfer destination account, and is, for example, the "Multi-Payment Network" (for example, refer to http://www.jampa.gr.jp/pub/).

FIG. 2 is a block diagram illustrating a schematic configuration of the receiving network 40. The receiving network 40 is connected to a financial institution system 44 (including modes like a shared-use center) of a financial institution such as a bank via a communication network 45 (which may be the same network as the communication network 50) so as to be capable of communicating with each other. The financial institution system 44 is a system capable of electronically performing the following account activities. The financial institution system 44 used by the present electronic settlement system 1 includes: an account of a person (hereinafter referred to a user) who plays at a gaming machine and who makes a payment using the present electronic settlement system (hereinafter referred to as a user account 41); an account of an entity (hereinafter referred to as a settlement provider) who directly or indirectly operates and manages the present electronic settlement system 1 and who receives compensation, a cost, a handling fee or the like for operating the electronic settlement system 1 (hereinafter referred to as a settlement provider account 42); and an account of an entity (hereinafter referred to as a gaming parlor operator) who provides gaming through the gaming machine to the user and who receives a payment from the user using the present electronic settlement system 1 (hereinafter referred to as a gaming parlor operator account 43). The accounts 41, 42, and 43 may either be provided in the same financial institution system 44 or be individually provided in financial institution systems 44 that differ from each other. While FIG. 2 illustrates the accounts 41, 42, 43 as being provided at different financial institution systems 44, the present embodiment is not intended to be limited to such a mode.

A terminal device to be used by a client to transmit a payment request to the receiving network 40 is connected to the communication network 45. A personal computer (PC) 46, a mobile phone 47, an ATM (Automated Teller Machine) 48, or the like is used as the terminal device. In the electronic settlement system 1 according to the present embodiment, the mobile communications terminal 20 or the electronic settlement server 10 is to operate as a terminal device of the receiving network 40.

The description of a configuration example of the electronic settlement system 1 will now be continued by returning to FIG. 1.

The electronic settlement server 10 is connected to the communication network 50 and is capable of communicating with the in-store server 31 via the communication network 50. The mobile communications terminal 20 is capable of communicating with the electronic settlement server 10, the in-store server 31, and the receiving network 40 via a base station (BS) 60, a mobile communications network 70, and a gateway 80 that connects the mobile communications network 70 to the communication network 50, and is also capable of communicating with the negotiable value providing device 30 using near field communication means (for example, a contactless IC card and a reader/writer thereof) provided in the mobile communications terminal 20.

Each component of the electronic settlement system 1 above will now be described.

[1.1. Negotiable Value Providing Device]

The negotiable value providing device 30 is a device that provides some kind of a negotiable value (assumed to refer to a tangible entity or an intangible entity that can be purchased in exchange with money) in return for an electronic settlement performed by a user using the mobile communications terminal 20. The negotiable value providing device 30 is, for example, a ball lending machine, a medal lending machine, or a CAT terminal device in a gaming parlor. Moreover, the negotiable value providing device 30 according to the present embodiment need not be a device that directly provides a negotiable value to the user such as a ball lending machine or a medal lending machine, and may instead include a device that indirectly provides a negotiable value to the user such as a debit card CAT terminal which notifies a gaming parlor (store) that electronic settlement can be performed and causes the gaming parlor to hand over goods and the like to the user.

In addition, the negotiable value providing device 30 may be a device that outputs, transmits, or writes electronic data as a negotiable value to another device or storage medium. For example, the negotiable value providing device 30 may be a device that transmits a message or a command to provide gaming or a game to a gaming machine or a game machine connected to a network. In this case, through the negotiable value providing device 30, the user can enjoy gaming or games corresponding to a gaming charge or a game charge paid using the present electronic settlement system 1. In addition, the negotiable value providing device 30 may be device that writes electronic data indicating the number of times a game machine can be used, a spendable amount, or the like on a storage medium such as a mobile phone mounted with an IC card or an IC card function or a USB memory. The user can have a device such as a gaming machine, a game machine, a vending machine, or an adjustment machine read the storage onto which electronic data has been written by the negotiable value providing device 30 in order to acquire goods or services provided by the device.

FIG. 3 is a functional block diagram illustrating a configuration example of the negotiable value providing device 30 and the mobile communications terminal 20. Hereinafter, a configuration of the negotiable value providing device 30 will be described with reference to FIG. 3.

The negotiable value providing device 30 includes a network communication processing unit 301, a provision control unit 302, a providing device-side near field communication unit 303, a negotiable value supplying unit 304, and a gaming history processing unit 305.

The network communication processing unit 301 is equipped with a function for executing communication with the in-store server 31 and is, for example, a communication board mounted with a protocol stack. Moreover, the negotiable value providing device 30 may be connected in plurality to the in-store server 31, in which case the negotiable value providing devices 30 and the in-store server 31 are to be connected by a communication network such as a LAN or by other communication means.

The provision control unit 302 is equipped with a function for instructing and controlling operations of the network communication processing unit 301, the providing device-side near field communication unit 303, and the negotiable value supplying unit 304 and is, for example, a microcomputer mounted with a program for realizing the negotiable value providing device 30.

The providing device-side near field communication unit 303 is equipped with a function for communicating with a terminal-side near field communication unit 201 mounted on the mobile communications terminal 20 and is, for example, a reader/writer of a contactless IC card. Moreover, a communication method to be employed by the providing device-side near field communication unit 303 need not be limited to wireless, and infrared communication may alternatively be used. In addition, a contactless communication method need not be adopted. The present invention can even be realized by adopting a communication method involving a connection using a communication cable or a USB socket.

The negotiable value supplying unit 304 is equipped with a function for providing a negotiable value to the user in response to an instruction from the provision control unit 302. The negotiable value supplying unit is, for example, a rental ball output unit of a ball lending machine, a medal hopper of a medal lending machine, a display of an authentication terminal (such as a CAT terminal), or a printer. The negotiable value may take any form as long as such value is purchasable with money and is a rental ball, a rental medal, a prepaid card, an on-value card (house card) or an equivalent thereof, or an intangible service. The negotiable value supplying unit 304 need not be limited to a unit that directly provides a negotiable value to the user, and may alternatively provide a negotiable value to the user in an indirect manner. For example, an arrangement in which the negotiable value supplying unit 304 is a liquid crystal display device that displays a message instructing an employee or a staff member of a gaming parlor to hand over goods is also a mode of provision of a negotiable value according to the present invention.

The gaming history processing unit 305 is equipped with a function to generate, based on a use of the negotiable value providing device 30 by a gamer, gaming history data that is data regarding a gaming history of the gamer, and to transmit the gaming history data to the in-store server 31 or the electronic settlement server 10 via the network communication processing unit 301.

For example, let us assume that the negotiable value providing device 30 is a sandwiched machine (ball lending machine) annexed to a specific gaming machine. In order to enjoy gaming using the gaming machine to which the sandwiched machine is annexed, a gamer receives ball lending by a settlement according to the present electronic settlement system 1 using the negotiable value providing device 30 that is the sandwiched machine and the gamer's own mobile phone that is the mobile communications terminal 20. The gaming history processing unit 305 generates gaming history data, which is data indicating which gamer had engaged in gaming at which gaming machine at what time for what amount and the like, based on an operation condition of the provision control unit 302 and an operation condition of the gaming machines, and transmits the gaming history data to a server that manages gaming history data. Gaming history data is sent to the server to be accumulated each time any of the negotiable value providing devices 30 is used. Analyzing the gaming history data by a method such as data mining reveals a habitual tendency of a gamer, a trend in popularity of a gaming machine, an hourly utilization trend, and the like, and as a result, enables acquisition of useful information that becomes a resource with respect to store management and gaming machine development.

Moreover, while the present embodiment is described using a configuration in which the electronic settlement server 10 is used as a server that manages gaming history data, it is obvious that a server that manages gaming history data can be incorporated into the present electronic settlement system 1 as a server device separate from the electronic settlement server 10.

[1.2. Mobile Communications Terminal]

Next, the mobile communications terminal 20 will be described with reference to FIG. 3. The mobile communications terminal 20 is capable of communicating with the electronic settlement server 10 and/or the receiving network 40 via the communication network 50, and is also capable of communicating with the negotiable value providing device 30 using near field communication means. In addition, the mobile communications terminal 20 may be adapted to be capable of communicating with the in-store server 31 via the communication network 50.

The mobile communications terminal 20 is, for example, a mobile phone equipped with a contactless IC card (for example, FeliCa, a registered trademark of Sony Corporation) function, a PDA (Personal Data Assistant) mounted with near field communication means and wireless communication means, a mobile game machine, an IP telephone set mounted with wireless LAN, or a dedicated terminal device for the present electronic settlement system 1. The mobile communications terminal 20 includes a terminal-side near field communication unit 201 for communicating with the aforementioned providing device-side near field communication unit 303, a payment request generating unit 202, a wireless communication unit 203, an input unit 204, an output unit 205, a user information storage unit 206, and a transfer request generating unit 207.

The terminal-side near field communication unit 201 is equipped with a function for communicating with the providing device-side near field communication unit 303 and is, for example, an IC card chip and an antenna.

The payment request generating unit 202 is equipped with a function for generating a payment request message for requesting the in-store server 31 to pay and settle a price (cost) of a negotiable value to be received by a user so as to enable the negotiable value providing device 30 to provide the negotiable value, and is, for example, a microcomputer mounted with i-appli ("i-appli", a registered trademark of NTT DoCoMo, Inc., is an application which is not limited to any particular OS and which enables a value-added function to be added when downloaded on a mobile phone; hereinafter referred to as i-appli).

The wireless communication unit 203 is equipped with a function that enables the mobile communications terminal 20 to connect to the mobile communications network 70 and execute communication via the mobile communications network 70, and is, for example, a wireless communication circuit including a modulation circuit and a demodulation circuit. The mobile communications network may be one of a general mobile phone communication network, a communication network based on WiMAX, or a wireless LAN.

The input unit 204 is equipped with a function for converting a user instruction into an electric signal and handing over the user instruction to the payment request generating unit 202, the transfer request generating unit 207, and the like, and is, for example, keys of a mobile phone, a touch pen and a touch panel, or a pointing device.

The output unit 205 is equipped with an information output function that enables the mobile communications terminal 20 to convey information to a user, and is, for example, a liquid crystal panel of a mobile phone, an audio output device (such as a speaker), or a small-size printer.

The user information storage unit 206 is equipped with a function for storing information necessary for payment or settlement by a user. FIG. 4 illustrates an example of information stored by the user information storage unit 206. In this example, the user information storage unit 206 stores: a user ID 208 that is information that uniquely identifies a user who is registered as a user of the mobile communications terminal 20; a password 209 used by the electronic settlement server 10 and/or the in-store server 31 to authenticate the user; and a bank number 210, a branch number 211, an account number 212, and a personal identification number 213 set to the account which are information for identifying the user account 41 that is an account used by the user to withdraw a payment. The aforementioned information and, in particular, the bank number 210, the branch number 211, the account number 212, and the personal identification number 213 may be inputted by the user when an application such as i-appli that enables functions of the payment request generating unit 202 and the transfer request generating unit 207 is installed in the mobile communications terminal 20 by the user, or upon user registration for receiving services of the present electronic settlement system 1. For example, upon activation in the mobile communications terminal 20, an application such as i-appli requests the user to input the aforementioned information using the input unit 204, whereby the inputted information 208 to 213 is stored in the user information storage unit 206. The information 208 to 213 is to be used when generating a transfer request message for requesting transfer of a deposit from the user account 41 to the settlement provider account 42, and is to be transmitted as a part of the transfer request message to the electronic settlement server 10.

Moreover, the user ID 208 may be an identification number automatically allocated by the electronic settlement server 10, identification information such as a FeliCa ID ("FeliCa" is a registered trademark of Sony Corporation) retained by the mobile communications terminal 20, or individual identification information (including FOMA card identification information; "FOMA" is a registered trademark of NTT DoCoMo, Inc.).

[1.3. Electronic Settlement Server]

The description of components of the electronic settlement system 1 will now be continued by returning to FIG. 2.

The electronic settlement system 1 includes the electronic settlement server 10 as a core component. The electronic settlement server 10 is a device including an arithmetic processing unit (CPU), a main memory (RAM), a read only memory (ROM), an input/output device (I/O), and when necessary, an external storage device such as a hard disk device, and is, for example, an information processing device such as a computer or a work station. A program that enables the information processing device to function as the electronic settlement server 10 or a program that causes a computer to execute the electronic settlement method is stored in the ROM or the hard disk device, in which case the electronic settlement server 10 is realized or the electronic settlement method is executed by placing the program on a main memory and having the CPU execute the program. In addition, the program need not necessarily be stored in a storage device in the information processing device, and a configuration may be adopted in which the program is provided from an external device (for example, a server of an ASP (application service provider) or the like) to be placed on the main memory. Furthermore, the electronic settlement server 10 may be configured either as a single device or a plurality of devices connected by a network. The electronic settlement server 10 may either have a center configuration in which all functions are consolidated in one place or a distributed server configuration in which functions are separated from each other so as to enable decentralized processing.

Hereinafter, the electronic settlement server 10 will be described with reference to FIG. 5A. FIG. 5A is a functional block diagram illustrating a configuration example of the electronic settlement server 10.

The electronic settlement server 10 illustrated in FIG. 5A includes a network communication processing unit 401, a payment request processing unit 402, a database unit 403, a transfer request processing unit 404, an adjustment processing unit 405, and a gaming information updating unit 406. Moreover, the respective units are components that are realized by a storage device storing the program, a CPU executing the program, and the like.

The network communication processing unit 401 is equipped with a function for executing communication with the mobile communications terminal 20, the in-store server 31, and the receiving network 40 via the communication network 50, and is, for example, a communication board for executing a protocol stack. Upon receiving a transfer request message from the mobile communications terminal 20, the network communication processing unit 401 hands over the transfer request message to the transfer request processing unit 404. In addition, when the network communication processing unit 401 receives a transfer request message addressed to the receiving network 40 from the adjustment processing unit 405, the network communication processing unit 401 transmits the transfer request message to the receiving network 40.

In addition to storing retained amount data 700 of each user registered to the present electronic settlement system 1 and retained amount data 900 of the gaming parlor operator, the database unit 403 also stores a user table 600, user retained amount data 700, a gaming parlor operator table 800, gaming parlor operator retained amount data 900, an in-store server table 1000, and gaming history information 1100 which are information necessary for a transfer to be performed with the receiving network 40.

FIG. 6 is a configuration example of the user table 600 stored in the database unit 403. The user table 600 is data storing information regarding a user (gamer). The user table 600 is data including one record 601 for each user. Each record 601 stores a user ID 602, a password 603, an e-mail address 604, as well as a bank number 605, a branch number 606, an account type 607, an account number 608, an account name 609, and a personal identification number 610 for identifying a debit account that is a user account. The user ID 602 is information that uniquely identifies a user. The password 603 is information that prevents a third party from impersonating the user and abusing the present electronic settlement system 1. The e-mail address 604 is information that is used by the result notifying unit 407 when notifying a processing result of payment processing to the user as a destination address of an e-mail. The bank number 605, the branch number 606, the account type 607, the account number 608, the account name 609, and the personal identification number 610 are information used to specify a debit account to the receiving network 40 and to use the debit account.

Information stored in the user table 600 is to be inputted to the electronic settlement server 10 upon user registration to the electronic settlement server 10 by the user.

FIG. 7 is a configuration example of the user retained amount data 700 stored in the database unit 403. The user retained amount data 700 is data including one record 701 for each user. Each record 701 includes: a user ID field 702 that stores a user ID; an in-store server ID field 703 that stores an in-store server ID that is information uniquely identifying an in-store server 31; and a retained amount field 704 storing a retained amount that is an amount deposited by the user to an in-store server 31 identified by the in-store server ID. A value stored in the retained amount field 704 is rewritten so as to increase by a deposited amount when the user makes a deposit to the in-store server 31 in the electronic settlement system 1 and to decrease by a paid amount when a payment is made using the negotiable value providing device 30. Moreover, since retained amounts are managed per in-store server 31 even for the same user, a plurality of records 701 may be kept for the same user.

FIG. 8 is a configuration example of the gaming parlor operator table 800 stored in the database unit 403. The gaming parlor operator table 800 is data storing information regarding a gaming parlor operator. The gaming parlor operator table 800 is data including one record 801 for each gaming parlor operator subscribed to the electronic settlement system 1. Each record 801 stores: a gaming parlor operator ID 802 storing a gaming parlor operator ID; and a bank number 803, a branch number 804, an account type 805, an account number 806, and an account name 807 for specifying a transfer destination account that is an account of the gaming parlor operator to which an amount paid by the user to the negotiable value providing device 30 is to be transferred. The gaming parlor operator ID 802 is information that uniquely identifies a gaming parlor operator. The bank number 805, the branch number 806, the account type 807, the account number 808, and the account name 809 are information for specifying a transfer destination account to the receiving network 40.

Information stored in the gaming parlor operator table 800 is to be inputted to the electronic settlement server 10 upon subscriber registration to the electronic settlement system 1 by the gaming parlor operator.

FIG. 9 is a configuration example of the gaming parlor operator retained amount data 900 stored in the database unit 403. The gaming parlor operator retained amount data 900 is data including one record 901 for each gaming parlor operator registered to the electronic settlement system 1. Each record 901 includes: a gaming parlor operator ID 902; and a retained amount 903 storing a retained amount that is an amount to be transferred by the electronic settlement system 1 to the gaming parlor operator account 43. A value stored in retained amount 903 is rewritten so as to increase by an amount paid by the user through the use of the negotiable value providing device 30 via the in-store server 31 and to decrease by an amount transferred to the gaming parlor operator account 43 using the receiving network 40.

FIG. 10 is a configuration example of the in-store server table 1000 stored in the database unit 403. The in-store server table 1000 is data including one record 1001 for each in-store server 31 included in the electronic settlement system 1. Each record 1001 stores an in-store server ID 1002, an in-store server IP address 1003, and a gaming parlor operator ID 1004.

The in-store server ID 1002 is information for uniquely identifying an in-store server 31. The in-store server IP address 1003 is address information used by the electronic settlement server 10 to communicate with the in-store server 31 and is information that is used, for example, as a transmission destination address when transmitting a deposit notification message that notifies an in-store server 31 of a deposit from the user. The gaming parlor operator ID 1004 is information that identifies a gaming parlor operator having the right to receive a payment corresponding to a consumed amount of the user with respect to an in-store server 31 assigned the in-store server ID 1002, and uses the same ID as the gaming parlor operator ID 802 (refer to FIG. 8) in the gaming parlor operator table 800.

The gaming history information 1100 is information indicating a history related to gaming such as which machine had been played by a gamer at what time, which location, and for how much. The gaming history information 1100 is information generated by accumulating and storing gaming history data generated by the gaming history processing unit 305 of each negotiable value providing device 30 and transmitted via the in-store server 31. Various kinds of useful information can be obtained by subjecting the gaming history information 1100 to known marketing analysis or analysis using a data mining method.

The description of the configuration example of the electronic settlement server 10 will now be continued by returning to FIG. 5A.

Next, the transfer request processing unit 404 will be described. The transfer request processing unit 404 is equipped with a function for processing a transfer request message received from the mobile communications terminal 20. The transfer request processing unit 404 receives a transfer request message from the mobile communications terminal 20 via the network communication processing unit 401. A content of a transfer request message is a request for a specified amount to be withdrawn from the user account 41 and arrange for the withdrawn amount to become usable by the electronic settlement system 1 or, more specifically, by a specified in-store server 31. Upon receiving the transfer request message, the transfer request processing unit 404 checks the user table 600 stored in the database unit 403. The transfer request processing unit 404 acquires, from the user table 600, the bank number 605, the branch number 606, the account type 607, the account number 608, the account name 609, and the personal identification number 610 which are information specifying an account of a user to become a transfer source account, combines the information with information specifying the settlement provider account 43 to become a transfer destination account, and transmits the information as a transfer request message to the receiving network 40 via the network communication processing unit 401. Upon receiving the transfer request message, the receiving network 40 transfers the specified amount from the user account 41 to the settlement provider account 42. The transferred amount becomes funds (save an amount corresponding to a handling fee) usable by the user through the present electronic settlement system 1.

In addition, the transfer request processing unit 404 is equipped with a function for transmitting, in response to a transfer result notification message received from the receiving network 40, a user deposit processing request message that causes a deposit of the user to be stored in a corresponding in-store server 31.

Next, the adjustment processing unit 405 will be described. The adjustment processing unit 405 receives a message indicating an amount consumed by the user from each in-store server 31 and, in response to the message, changes or updates the gaming parlor operator retained amount data 900 or, more specifically, changes or updates the retained amount 903. In addition, the adjustment processing unit 405 requests the receiving network 40 to transfer an amount indicated by the gaming parlor operator retained amount data 900 from the settlement provider account 42 to the gaming parlor operator account 43 of each gaming parlor operator. The amount of funds to be transferred corresponds to a payable amount to a gaming parlor operator that the user has placed in the care of the electronic settlement system 1 or, in other words, the retained amount 903 of the gaming parlor operator retained amount data 900. In the present embodiment, the adjustment processing unit 405 performs transfer request processing in an autonomous manner. For example, the adjustment processing unit 405 is automatically activated at a predetermined timing (for example, at the end of each month). The activated adjustment processing unit 405 inquires each in-store server 31 about an amount consumed by the user or, in other words, a payable amount to a gaming parlor operator, and in response to a payment request message transmitted by the in-store server 31 in response to the inquiry, updates the retained amount 903 of the gaming parlor operator retained amount data 900. Furthermore, the adjustment processing unit 405 checks all gaming parlor operator retained amount data 900 stored in the database unit 403, and for gaming parlor operator retained amount data 900 for which a transfer is not yet completed, transmits a transfer request to the receiving network 40 to perform a transfer from the settlement provider account 42 to a corresponding gaming parlor operator account 43.

The gaming information updating unit 406 is equipped with a function for constantly accumulating and storing gaming history data received from the gaming history processing unit 305 of the negotiable value providing device 30 via the in-store server 31 and updating the gaming history information 1100.

[1.4. Distributed Server Configuration of Electronic Settlement Server]

While the example illustrated in FIG. 5A is arranged so that the electronic settlement server 10 is realized by a single server device, it is obvious that the electronic settlement server 10 is not limited to a configuration involving such a server device.

FIG. 5B is a functional block diagram illustrating a configuration example of a case where the electronic settlement server 10 adopts a distributed server configuration. Like components to those illustrated in FIG. 5A will be denoted by like reference numerals and a detailed description thereof will be omitted.

Adopting a distributed server configuration for the electronic settlement server 10 enables a risk of leakage or theft of information related to a user or a gaming parlor operator to be reduced and reliability toward the security of the present electronic settlement system 1 to be enhanced.

The electronic settlement server 10 in a distributed server configuration includes an application server 501 and one or a plurality of database servers 502A to 502D. The application server 501 includes a network communication processing unit 401, a transfer request processing unit 404, an adjustment processing unit 405, and a gaming information updating unit 406.

In the example illustrated in FIG. 5B, four database servers 502A, 502B, 502C, and 502D are connected to the application server 501 via a local network 503 so as to be capable of communication. The four database servers 502A to 502D are components corresponding to the database unit 403 illustrated in FIG. 5A. In the present configuration example, a first database server 502A stores the user table 600 and the user retained amount data 700, a second database server 502B stores the gaming parlor operator table 800 and the gaming parlor operator retained amount data 900, a third database server 502C stores the in-store server table 1000, and a fourth database server 502D stores gaming history information 1100. The application server 501 requests the database servers 502A to 502D for necessary information as required by processing, in which case the database servers 502A to 502D retrieve necessary information from stored contents in response to the request and hands over the information to the application server 501.

Moreover, the manner in which the database unit 403 is to be divided, the number of the database servers 502, and the manner in which stored contents (tables, data) of the respective database servers are allocated can be arbitrarily determined and are not limited to the configuration illustrated in FIG. 5B.

[1.5. In-Store Server]

The description of the configuration example of the electronic settlement system 1 will now be continued. Next, the in-store server 31 will be described.

As illustrated in FIG. 1, the electronic settlement system 1 includes the in-store server 31. The in-store server 31 is a device including an arithmetic processing unit (CPU), a main memory (RAM), a read only memory (ROM), an input/output device (I/O), and when necessary, an external storage device such as a hard disk device, and is, for example, an information processing device such as a computer or a work station. A program that enables the information processing device to function as the in-store server 31 or a program that causes a computer to execute the electronic settlement method is stored in the ROM or the hard disk device, in which case the in-store server 31 is realized or the electronic settlement method is executed by placing the program on a main memory and having the CPU execute the program. In addition, the program need not necessarily be stored in a storage device in the information processing device, and a configuration may be adopted in which the program is provided from an external device (for example, a server of an ASP (application service provider) or the like) to be placed on the main memory. Furthermore, the in-store server 31 may be configured either as a single device or a group of devices in which a plurality of devices are connected by a network.

Upon receiving a user deposit processing request message that is a message to the effect that a deposit of a user has been accepted (transfer between accounts has been performed) from the electronic settlement server 10, the in-store server 31 stores the amount of the deposit described in the message as an amount consumable by the user.

When the user attempts to consume a negotiable value from the negotiable value providing device 30 managed by the in-store server 31, the negotiable value providing device 30 inquires the in-store server 31 in regards to whether or not a price of the negotiable value can be withdrawn from the deposit of the user. If the price of the negotiable value can be withdrawn from the deposit of the user or, in other words, if sufficient deposit to pay the price remains, the in-store server 31 transmits a message (referred to as a provision instruction message) to the negotiable value providing device 30 to pay out the negotiable value.

Hereinafter, the in-store server 31 will be described with reference to FIG. 5C. FIG. 5C is a functional block diagram illustrating a configuration example of the in-store server 31.

The in-store server 31 illustrated in FIG. 5C includes a network communication processing unit 551, a deposit processing unit 552, a payment request processing unit 553, a provision instructing unit 554, a result notifying unit 555, an adjustment processing unit 556, a gaming information processing unit 557, and a database unit 560. Moreover, the respective units are components that are constituted by a storage device storing the program, a CPU executing the program, and the like.

The network communication processing unit 551 is equipped with a function for executing communication with the electronic settlement server 10, the mobile communications terminal 20, and the like, and is, for example, a communication board mounted with a protocol stack.

The deposit processing unit 552 is equipped with a function for, upon receiving a user deposit processing request message from the electronic settlement server 10, generating or updating user deposit data 562 according to the message.

The payment request processing unit 553 is equipped with a function for processing a payment request message received from the mobile communications terminal 20. The payment request processing unit 553 receives a payment request message from the mobile communications terminal 20 via the network communication processing unit 551. Subsequently, the payment request processing unit 553 checks user deposit data 562 of the corresponding user that is stored in the database unit 560, to be described later. When a comparison of the user deposit data 562 and the payment request message reveals that the deposit is equal to or greater than the payment request, the payment request processing unit 553 activates the provision instructing unit 554. The activated provision instructing unit 554 generates a provision instruction message and transmits the provision instruction message to the negotiable value providing device 30 specified in the payment request message via the network communication processing unit 551.

In addition, when a payment corresponding to the aforementioned payment request message can be made, the payment request processing unit 553 updates (rewrites) the user deposit data 562 of the corresponding user stored in the database unit 556 according to the payable amount.

The provision instructing unit 554 generates a provision instruction message to be transmitted to the negotiable value providing device 30, and transmits the provision instruction message to the negotiable value providing device 30 specified in the payment request message via the network communication processing unit 401.

The result notifying unit 555 is equipped with a function for notifying whether or not a payment request message has been appropriately processed to the mobile communications terminal 20. For example, the result notifying unit 555 generates and transmits an e-mail message addressed to the mobile communications terminal 20. Alternatively, the result notifying unit 555 may be adapted to enter information indicating a processing result on a web page viewable by the mobile communications terminal 20 and await viewing by the mobile communications terminal 20. A content of a notification from the result notifying unit 555 is to be a message such as "Your payment request has been processed. Thank you for your patronage." or "Your deposit balance is overdrawn. Payment could not be made as requested." In addition, the result notifying unit 555 may be equipped with a function where, when a user transmits a deposit balance inquiry message from the mobile communications terminal 20 to the in-store server (including a transmission via the negotiable value providing device 30), in response to the inquiry message, the result notifying unit 555 refers to user deposit data 562 of a corresponding user, calculates a balance of consumable deposit at that point, and outputs a result of the calculation to the mobile communications terminal 20 or to the negotiable value providing device 30.

The adjustment processing unit 556 is equipped with a function for referring to the user deposit data 562 and notifying an amount consumed by a user among the deposit to the electronic settlement server 10. Moreover, a consumed amount of an individual user need not necessarily be notified to the electronic settlement server 10. If a total amount of the consumed amounts of all users stored in the in-store server 31 can be calculated, such a total amount is to suffice as an amount consumed by a user.

The gaming information processing unit 557 is equipped with a function for receiving gaming history information, which is information indicating a history related to gaming such as which machine had been played by a gamer at what time, which location, and for how much, from each negotiable value providing device 30, causing the database unit 560 to store the gaming history information, and transmitting the gaming machine history information stored in the database unit 560 to the electronic settlement server 10. Moreover, the timing at which the gaming information processing unit 557 transmits the gaming history information to the electronic settlement server 10 may be arbitrarily determined and may be set to, for example, after business hours, once a week, or the like.

Next, the database unit 560 will be described. The database unit 560 stores a user table 561, user deposit data 562, and gaming history information 563.

The user table 561 is data storing information regarding a user (gamer). FIG. 5D illustrates a data configuration example of the user table 561. The user table 561 illustrated in the present example is data including one record 561A for each user using the in-store server 31. Each record 561A includes: a user ID field 561B that stores a user ID that is information that uniquely identifies a user; a password field 561C that stores a password; and an e-mail address field 561D that stores an e-mail address.

The user deposit table 562 is data including one record for each user using the in-store server 31. FIG. 5E illustrates a data configuration example of the user deposit table 562. A record 562A included in the user deposit table 562 includes: a user ID field 562B that stores a user ID; a deposit amount field 562C that stores an amount of a deposit that is an amount placed in care of the settlement provider by a user with respect to the in-store server 31; and a consumed amount field 562D that stores an amount consumed by the user using a negotiable value providing device 30 managed by the in-store server 31.

The gaming history information 563 is a collection of gaming history data that is data regarding a gaming history of a gamer or data similar thereto transmitted from the negotiable value providing device 30 connected to the in-store server 31.

[1.6. Communication Network]

The description of components of the electronic settlement system 1 according to the present embodiment will now recommence by returning to FIG. 1.

The communication network 50 operates to enable, when devices connected to the communication network 50 respectively establish a session to object devices, such devices to send/receive information to/from the object devices regardless of whether such devices are wired or wireless, or private line or switched line. The communication network 50 may be realized by a combination of a plurality of networks via a gateway such as the Internet. In addition, a connection of the communication network 50 need not be a direct connection to a backbone, and may be a temporary connection based on a PPP connection or the like as long as information can be sent and received among devices upon establishment of a session. Moreover, the term "communication network" used above is assumed to include a communication network such as a fixed network of private lines that does not use path-switching means such as a switchboard, a switch, and a router.

[1.5. Mobile Communications Network, Gateway, Base Station]

The configuration example of the electronic settlement system 1 illustrated in FIG. 1 assumes a case where a mobile phone is used as the mobile communications terminal 20. Therefore, the mobile phone that is the mobile communications terminal 20 is illustrated such that the mobile phone first connects to a base station 60 through a wireless line and then connects to the communication network 50 to which the electronic settlement server 10 is connected from the base station 60 via a mobile communications network 70 and a gateway 80. However, as long as the mobile communications terminal 20 can directly connect to the communication network 50, the mobile communications terminal 20 can connect to the electronic settlement server 10 without connecting via the mobile communications network 70 or the gateway 80. For example, when the mobile communications terminal 20 is equipped with a wireless LAN connection function, communication need no longer be performed via the mobile communications network 70 and the gateway 80. For example, the present invention can be realized even by adopting a configuration in which the mobile communications terminal 20 connects to the communication network 50 by accessing a hot spot (wireless LAN terminal) connected to the communication network 50.

[1.7 Receiving Network]

The receiving network 40 is a system equipped with a function for transferring, in response to a transfer request from the electronic settlement server 10, a specified amount from the user account 41 to the settlement provider account 42 and from the settlement provider account 42 to the gaming parlor operator account 43. While the electronic settlement server 10 and the financial institution system 40 are illustrated as being connected by the communication network 50 in the example illustrated in FIG. 1, the present embodiment can be realized even by adopting a configuration in which the electronic settlement server 10 and the financial institution system 40 are connected via a private line (not shown). For example, when the financial institution system 40 is a system provided by a so-called Internet bank, a configuration is expected in which the electronic settlement server 10 and the financial institution system 40 are connected via the communication network 50.

[2. Operation Example of Electronic Settlement System]

Next, operations of the aforementioned electronic settlement system 1 will be described with reference to FIG. 11 and thereafter. FIG. 11 is a diagram which illustrates an operation example of the electronic settlement system 1 described above and which is a sequence diagram of an operation example of the electronic settlement system 1 when a user performs user registration to the electronic settlement system 1 using the mobile communications terminal 20.

First, at the start of use of the present electronic settlement system 1, the user connects to the electronic settlement server 10 using the mobile communications terminal 20, and requests the electronic settlement server 10 for software (for example, an application such as i-appli which enables a function to be added when downloaded on a mobile phone; hereinafter referred to as "application") for the mobile communications terminal 20 which enables services provided by the electronic settlement system 1 to be received (S101). In response to the request, the electronic settlement server 10 causes data of the application to be downloaded to the mobile communications terminal 20 (S102). The mobile communications terminal 20 having received the application stores data of the application in a storage device such as a memory (S103). When executed by the CPU or the like of the mobile communications terminal 20, the application functions as the payment request generating unit 202, the transfer request generating unit 207, and the like described earlier.

While the above embodiment has been described as using the electronic settlement server 10 as a server for downloading an application such as i-appli, it is obvious that the server for downloading an application such as i-appli may be a device or a system that is separate from the electronic settlement server 10.

The downloaded application is activated when the user performs a predetermined operation using the mobile communications terminal 20 or the like (S104). Upon initial activation, the downloaded application causes an initial input screen that enables input of initial information by the user to be displayed on the output unit 205, and prompts the user to input initial information. Information requested at this point as initial information includes the user ID 602, the password 603, the e-mail address 604, the bank number 605, the branch number 606, the account type 607, the account number 608, the account name 609, and the personal identification number 610. Moreover, the user ID 602 and the password 603 may be arranged to be set to the electronic settlement server 10 in advance instead of being input by the user.

Upon conclusion of the input of initial information by the user using the input unit 204 of the mobile communications terminal 20, the mobile communications terminal 20 causes the initial information to be stored in the user information storage unit 206 and, at the same time, the mobile communications terminal 20 connects to the electronic settlement server 10 via the base station 60, the mobile communications network 70, the gateway 80, and the communication network 50, and transmits the inputted initial information and the like to the electronic settlement server 10 (S106).

The electronic settlement server 20 having received the initial information performs user registration based on the initial information (S107). Specifically, the electronic settlement server 20 respectively adds new records 601 and 701 to the user table 600 and the user retained amount data 700 of the database unit 403, and writes the user ID 602, the password 603, the e-mail address 604, the bank number 605, the branch number 606, the account type 607, the account number 608, the account name 609, the personal identification number 610, and the like into the records 601 and 701.

Simply completing the user registration described above does not enable the user to use the electronic settlement system 1 to make a purchase (receive a negotiable value) from the negotiable value providing device 30. The user must request the electronic settlement system 1 or, more specifically, the electronic settlement server 10 from the mobile communications terminal 20 to have a deposit of an appropriate amount be transferred from the user's own user account 41 to the settlement provider account 42. An amount consumed by the user due to the provision of a negotiable value by the negotiable value providing device 30 is subtracted from the deposit. The subtracted amount is an amount paid to the negotiable value providing device 30 to be subsequently transferred by processing performed by the receiving network 40 to an account of the gaming parlor operator that is a beneficiary of the payment or, in other words, the gaming parlor operator account 43. An operation example of the aforementioned electronic settlement system 1 in a case where the user requests the electronic settlement server 10 to perform a transfer from the user account 41 that is the user's own account to the settlement provider account 42 will now be described with reference to FIG. 12. FIG. 12 is a sequence diagram illustrating an operation example of the electronic settlement system 1 when the user requests a transfer from the user account 41 to the settlement provider account 42.

First, the user activates an application or, more specifically, the transfer request generating unit 207 in the mobile communications terminal 20 (S201). The activated application or, more specifically, the transfer request generating unit 207 causes the output unit 205 of the mobile communications terminal 20 to display an input interface screen or the like, and prompts the user to input information necessary to generate a transfer request message such as a transfer amount, an account personal identification number, and information identifying the in-store server 31 to be used (for example, an in-store server ID).

Upon receiving input of such information (S202), the mobile communications terminal 20 or, more specifically, the transfer request generating unit 207 generates a transfer request message and transmits the transfer request message to the electronic settlement server 10 via the communication network 50 or the like (S203). The transfer request message stores the user ID 208, the password 209, the account personal identification number 213, an inputted transfer amount corresponding to the deposit, information identifying an in-store server 31 to be used, and the like.

The electronic settlement server 10 or, more specifically, the transfer request processing unit 404 having received the transfer request message uses the user ID 208 included in the transfer request message as a key to search a user table 600, and acquires the bank number 605, the branch number 606, the account type 607, the account number 608, and the account name 609 which are information specifying the user account 41 from the record 601 that is consistent with the user ID 208. In addition, the transfer request processing unit 404 reads separately stored information (not shown) that identifies a settlement provider account 42 or, more specifically, the bank number, the branch number, the account type, and the account number of the settlement provider account 42, generates a transfer request message using the information, and transmits the transfer request message to the receiving network 40 (S204). Moreover, a data configuration, a communication procedure, and the like to be used when transmitting the transfer request message may conform to a method adopted by the receiving network 40.

The receiving network 40 having received the transfer request message performs transfer processing according to the content of the transfer request message so as to transfer the specified amount (hereinafter referred to as a "user transfer amount") from the user account 41 to the settlement provider account 42 (S205). When the transfer processing (S205) is successfully performed, the receiving network 40 transmits, to the electronic settlement server 10, a transfer result notification message that notifies the electronic settlement server 10 that transfer processing has been successfully executed (S206). Moreover, when the transfer processing could not be properly performed due to reasons such as an insufficient balance of the user account 41, the receiving network 40 transmits a transfer result notification message to the effect that the transfer could not be performed to the electronic settlement server 10 (not shown). In this case, the electronic settlement server 10 notifies the mobile communications terminal 20 that transfer processing cannot be performed and terminates processing.

On the other hand, the electronic settlement server 10 having received a transfer result notification to the effect that transfer processing has been successfully performed executes retained amount data processing that is processing to reflect the user transfer amount to the corresponding record 701 in the user retained amount data 700 (S207).

In addition, the electronic settlement server 10 having received a transfer result notification to the effect that transfer processing has been successfully performed transmits, based on information included in the transfer request message which identifies a in-store server 31, a user deposit processing request message that requests the in-store server 31 to store a deposit (corresponding to the user transfer amount) of the user in question (S208). The user deposit processing request message includes information for identifying the user (for example, user ID), information indicating a deposit corresponding to the user transfer amount, and the like. The in-store server 31 having received the user deposit processing request message performs user deposit data update processing that updates the user deposit data 562 (S209). For user deposit data update processing, when a record 562A of the user in question has not been added to the user deposit data 562, a new record 562A for the user is added and information indicating the deposit is stored in a deposit field 562C of the record 562A. On the other hand, when a record 562A of the user is already included in the user deposit data 562, information indicating the deposit is stored in a deposit field 562O of the record 562A corresponding to the user by adding the deposit to an amount stored in the deposit field 562C.

Due to the user deposit data update processing, the user can now use an amount corresponding to the user transfer amount using the electronic settlement system 1 or, more specifically, the negotiable value providing device 30 managed by the specified in-store server 31.

FIGS. 13 to 15B are diagrams illustrating an operation example performed among the electronic settlement server 10, the in-store server 31, and the receiving network 40 in a case where a user transfer amount is processed.

FIG. 13 illustrates an example of a state prior to transfer request message transmission (S203 in FIG. 12) by the user to the electronic settlement server 10. In this example, the receiving network 40 has one each of the user account 41, the settlement provider account 42, and the gaming parlor operator account 43. Now, as an example, let us assume that the balance of the user account 41 is 100,000 yen, and the balances of the settlement provider account 42 as well as the gaming parlor operator account 43 having the right to earn revenue from the in-store server 31 are both 0 yen. Moreover, while it is conceivable that, in reality, a plurality of users and a plurality of gaming parlor operators are likely to have accounts in the receiving network 40, one each of the user account 41 and the gaming parlor operator account 43 have been displayed as a representative example in FIGS. 13 to 15.

As described above, the electronic settlement server 10 stores user retained amount data 700 and gaming parlor operator retained amount data 900. The retained amount data 700 includes a user retained amount 703 of the record 701 for each user, and the gaming parlor operator retained amount data 900 similarly includes a gaming parlor operator retained amount 903 of the record 901 for each gaming parlor operator. The illustrated user record 701 is data corresponding to the user of the user account 41, and the gaming parlor operator record 901 is data corresponding to the gaming parlor operator of the gaming parlor operator account 43 having the right to earn revenue from the in-store server 31. It is assumed that retained amounts 703 and 903 respectively stored in the records 701 and 901 are both 0 yen at this point.

In addition, while the in-store server 31 has user deposit data 562, a record 562A corresponding to the user has not yet been generated at this point.

Now, let us assume that the user desires to use exactly 10,000 yen among the user account 41 at the negotiable value providing device 30 connected to the specified in-store server 31. FIG. 14 illustrates a state where, after the state illustrated in FIG. 13, the user has transmitted a transfer request message from the mobile communications terminal 20 to the electronic settlement server 10 to have the user transfer amount of 10,000 yen transferred. The electronic settlement server 10 transmits a transfer request message such as the following to the receiving network 40 in response to the transfer request message. That is, a transfer request message whose content is "transfer the user transfer amount of 10,000 yen and a handling fee to be paid to the settlement provider (for example, 100 yen) from the user account 41 to the settlement provider account 42" is sent to the receiving network 40.

The receiving network 40 having received the transfer request message performs processing for transferring 10,100 yen from the user account 41 to the settlement provider account 42. As a result, as illustrated in FIG. 14, the balance of the user account 41 becomes 100,000 yen−10,100 yen=89,900 yen, and the balance of the settlement provider account 42 becomes 0 yen+10,100 yen=10,100 yen. The receiving network 40 changes balances of the respective accounts 41 and 42 as illustrated in FIG. 14 according to the transfer request message.

FIG. 15A illustrates a state where, after the state illustrated in FIG. 14, the electronic settlement server 10 has performed retained amount data processing (S207 in FIG. 12). As illustrated in FIG. 12, when transfer processing is performed by the receiving network 40, the receiving network 40 transmits a transfer result notification message to the effect that a transfer of 10,100 yen has been successfully performed to the electronic settlement server 10 (S206 in FIG. 12). In response to the transfer result notification message, the electronic settlement server 10 or, more specifically, the transfer request processing unit 404 adds the user transfer amount to a value of the user retained amount 703 stored in a record 701 corresponding to the user account 41 from which the transfer had been performed. However, 100 yen corresponding to the handling fee is not added. As a result of the retained amount data processing (S207) in the form of addition, 0 yen+10,000 yen=10,000 yen is to be recorded in the user retained amount 703.

FIG. 15B illustrates a state where, after the state illustrated in FIG. 15A, the in-store server 31 has performed user deposit data processing (S209 in FIG. 12). As illustrated in FIG. 12, when retained amount data processing (S207) is performed by the electronic settlement server 10, the electronic settlement server 10 transmits, to the specified in-store server 31, a user deposit processing request message to the effect that a deposit of 10,000 yen (corresponding to the user transfer amount) for the user is to be stored (S208). In response to the user deposit processing request message, the in-store server 31 or, more specifically, the deposit processing unit 552 adds the record 562A corresponding to the user to user deposit data 562 stored in the database unit 560, stores a deposit 1501 (=10,000 yen) in the deposit field 562G, and stores a consumed amount 1302 (=0 yen) in the consumed amount field 562D. By having the deposit 1501 of the user recorded in the in-store server 31, the user can now receive provision of a negotiable value within the range of the deposit 1501 from any of the negotiable value providing devices 30 managed by the in-store server 31.

Next, an operation example of the electronic settlement system 1 when, after the states illustrated in FIGS. 12 and 15B, the user receives provision of a negotiable value from the negotiable value providing device 30 managed by the in-store server 31 will be described with reference to FIG. 16. FIG. 16 is a sequence diagram illustrating an operation example of the electronic settlement system 1 when, in order to enable the user to receive provision of a negotiable value from the negotiable value providing device 30, the electronic settlement system 1 causes communication by near field communication means to be performed between the mobile communications terminal 20 and the negotiable value providing device 30.

First, let us assume that the user is attempting to use the present electronic settlement system 1 in order to receive provision of a negotiable value from the negotiable value providing device 30.

When the user attempts to receive provision of a negotiable value from the negotiable value providing device 30, the user causes the mobile communications terminal 20 to communicate with the negotiable value providing device 30 by near field communication in order to have the mobile communications terminal 20 acquire a device ID or the like of the negotiable value providing device 30. For example, in a case where the terminal-side near field communication unit 201 is an IC chip for a contactless IC card and the providing device-side near field communication unit 303 is a reader/writer, when the reader/writer senses that the contactless IC card chip is approaching, the reader/writer that is the providing device-side near field communication unit 303 transmits a device ID, an application number, and a user payable amount stored in the reader/writer to the contactless IC card chip that is the terminal-side near field communication unit 201 (S301). In this case, the device ID is identification information capable of uniquely identifying the negotiable value providing device 30, and the application number is identification information capable of uniquely identifying an application that runs on the mobile communications terminal 20. The user payable amount is information for identifying an amount of a price of the negotiable value that the negotiable value providing device 30 provides to the user. When a purchase offer for a negotiable value is made by the mobile communications terminal 20, the negotiable value providing device 30 handles the purchase offer as a purchase offer of a negotiable value corresponding to a predetermined payable amount. For example, in a case where the negotiable value providing device 30 is a ball lending machine, when the user brings the mobile communications terminal 30 close to the ball lending machine to have the contactless IC card chip read, the negotiable value providing device 30 performs processing as a purchase offer for rental balls corresponding to a payable amount (for example, 1,000 yen) set for the negotiable value providing device 30. Moreover, the user payable amount may differ from each negotiable value providing device 30 to another. For example, a payable amount may be set to 1,000 yen for a ball lending machine A and to 5,000 yen for a different ball lending machine B which are installed in the same gaming parlor. In addition, the user payable amount may be arranged so as to be determined by a selection made by the user. For example, in a case where the negotiable value providing device 30 is a prepaid card issuing device, the prepaid card issuing device is capable of issuing a plurality of prepaid cards of different amounts (for example, 1,000 yen, 3,000 yen, 5,000 yen, and 10,000 yen) and includes a plurality of amount selection buttons for specifying among the amounts. The user purchases a prepaid card of a desired amount by pressing the amount select button corresponding to the desired amount. In this case, an amount selected by the user using an amount select button may be handled by the electronic settlement system 1 as the user payable amount.

The user payable amount described above need not necessarily be transmitted from the negotiable value providing device 30 to the mobile communications terminal 20 in step S301. The payable amount may be adapted to be determined by the electronic settlement server 10 based on the device ID by using a table prepared in advance.

The terminal-side near field communication unit 201 having received the device ID, the application number, and the user payable amount activates an application corresponding to the application number or, in other words, the payment request generating unit 202 (S302). At this point, the device ID and the user payable amount are handed over from the terminal-side near field communication unit 201 to the payment request generating unit 202.

The activated payment request generating unit 202 generates a payment request message including the device ID and the user payable amount received from the negotiable value providing device 30 and the user ID 208 and the password 209 stored in the user information storage unit 206, and transmits the message to the in-store server 31 via the base station 60, the mobile communications network 70, the gateway 80, and the communication network 50 (S303). A destination address (for example, an IP address) of the in-store server 31 may be stored in the application in advance, or the negotiable value providing device 30 may transmit the destination address of the in-store server 31 to the mobile communications terminal 20 together with a device ID or the like in advance, in which case the mobile communications terminal 20 may be arranged to transmit a payment request message to the received destination address.

The in-store server 31 or, more specifically, the payment request processing unit 553 having received the payment request message first searches for user deposit data 562 using the user ID 208 as a search key, and acquires the deposit 1501 of the record 562A corresponding to the user ID 208. The payment request processing unit 553 performs a deposit check in which the user payable amount is compared with the deposit 1501 and a judgment is made on whether or not the user payable amount can be withdrawn from the deposit 1501 (S304).

In step S304, when it is judged that the withdrawal cannot be made, the payment request processing unit 553 activates the result notifying unit 555. The result notifying unit 555 generates a processing result notification message based on the judgment, and transmits the processing result notification message to the negotiable value providing device 30 and/or the mobile communications terminal 20 (not shown). The negotiable value providing device 30 and/or the mobile communications terminal 20 having received the processing result notification message displays a content of the processing result notification on respective output units (not shown) and on the output unit 205. For example, a content such as "Your deposit balance is overdrawn. Unable to provide negotiable value." is displayed.

On the other hand, in step S304, when it is judged that the withdrawal can be made, the payment request processing unit 553 activates the provision instructing unit 554. The activated provision instructing unit 554 transmits a provision instruction message to the negotiable value providing device 30 specified by the payment request message (S305). In response to the provision instruction message, the negotiable value providing device 30 drives the negotiable value supplying unit 304 thereof and provides a negotiable value corresponding to the user payable amount to the user (S306). Moreover, a transmission destination address of the provision instruction message is determined using the device ID as a key and based on a device ID transmission address conversion table (not shown) prepared in advance in the in-store server 31.

The negotiable value providing device 30 having provided the user with the negotiable value transmits a provision completion message notifying that the execution of provision has been completed to the in-store server 31 (S307).

The in-store server 31 or, more specifically, the payment request processing unit 402 having received the provision completion message performs consumed amount processing in which the user deposit data 562 or, more specifically, the deposit 1501 and the consumed amount 1502 of the record 562A having the corresponding user ID stored in the database unit 560 are rewritten so as to transfer the user payable amount by subtracting the user payable amount from the deposit 1501 and adding the user payable amount to the consumed amount 1502 (S308).

In addition, when it is judged that the withdrawal can be made in step S304, the in-store server 31 or, more specifically, the payment request processing unit 553 activates the result notifying unit 555. The activated result notifying unit 555 transmits, to the mobile communications terminal 20, an execution confirmation message that is a message for notifying that payment of a specified payable amount has been made from the deposit (S309). The execution confirmation message is a message indicating that a payment procedure corresponding to the user payable amount specified by the user has been completed. Moreover, a transmission destination address of the execution confirmation message is determined by searching the user table 561 while using the user ID as a key and based on the e-mail address 561D of a corresponding record 561A.

The mobile communications terminal 20 having received the execution confirmation message performs result display on the output unit 205 of the content of the execution confirmation message (S310). For example, result display is performed by displaying "1,000 yen has been paid from your deposit. Your balance is now ●●●● yen" or the like on the output unit 205 of the mobile communications terminal 20. During result display, a value of the deposit 1501 after withdrawing the payable amount or, in other words, a balance in the in-store server 31 may be displayed. It should be noted that the deposit 1501 is not stored in the mobile communications terminal 20. Instead, the in-store server 10 is responsible for storing deposit amounts.

FIG. 17 is a diagram illustrating a storage state of the receiving network 40, the electronic settlement server 10, and the in-store server 31 after processing of steps S301 to S307 have been performed after the state illustrated in FIG. 15B. In the state illustrated in FIG. 15B prior to the transfer of the user payable amount, the deposit 1501 of the corresponding record 562A in the user deposit data 562 is 10,000 yen and the consumed amount 1502 is 0 yen.

FIG. 17 illustrates a state after performing consumed amount processing (S308) in a case where the user payable amount is 1,000 yen. In the consumed amount processing (S308), the payment request processing unit 553 of the in-store server 31 subtracts 1,000 yen that is the user payable amount from 10,000 yen that is the value of the deposit 1501 that is the user retained amount and rewrites the value of the deposit 1501 to 9,000 yen and, at the same time, adds 1,000 yen that is the user payable amount to 0 yen that is the value of the consumed amount 1502 and rewrites the value of the consumed amount 1502 to 1,000 yen.

By such rewriting of the deposit 1501 and the consumed amounts 1502 and 903 in the consumed amount processing (S308), a payment of a price of provision of the negotiable value by the negotiable value providing device 30 or, in other words, a payment from the user to the gaming parlor operator is executed in the in-store server 31 server.

Processing of steps S301 to S310 described above is performed every time each user purchases a negotiable value using the negotiable value providing device 30, in which case the respective user payable amounts are recorded by subtracting from the deposit 1501 and adding to the consumed amount 1502. In other words, every time each user purchases a negotiable value using the negotiable value providing device 30 managed by the in-store server 31, a value of the consumed amount 1502 corresponding to a payable amount to the gaming parlor operator which owns or manages the in-store server 31 is to increase.

The consumed amount 1502 described above is transferred to the gaming parlor operator account 43 on the receiving network 40. Hereinafter, a transfer to the gaming parlor operator account 43 in the electronic settlement system 1 will be described with reference to FIG. 18. FIG. 18 is a sequence diagram illustrating an example of transfer processing to the gaming parlor operator account 43 in the electronic settlement system 1.

The electronic settlement server 10 or, more specifically, the adjustment processing unit 405 is automatically activated at a predetermined timing to execute consumed amount inquiry processing (S401). The consumed amount inquiry processing is processing for inquiring the consumed amount 1502 to each in-store server 31.

Upon automatic activation (S401), the adjustment processing unit 405 transmits a consumed amount inquiry message to each in-store server 31 (S402).

The in-store server 31 having received the consumed amount inquiry message references the user deposit data 562 to read the consumed amount 1502 of each record 562A, and based on the consumed amount 1502 and the like, performs consumed amount notification message generation processing (S403) for generating a consumed amount notification message. The consumed amount notification message may be arranged so as to notify the deposit 1501 and the consumed amount 1502 for each record 652A of the user deposit data 652 or to notify a total amount of the consumed amounts 1502 of all records 562. In the presently described example, the consumed amount notification message is assumed to be a message arranged so as to notify the deposit 1501 and the consumed amount 1502 for each record 652A of the user deposit data 652 to enable the electronic settlement server 10 to be aware of the deposit of the user.

The in-store server 31 or, more specifically, the adjustment processing unit 556 having performed consumed amount notification message transmission (S404) performs clear consumed amount processing (S405) for rewriting the value of the consumed amount 1502 of each record 562A to "0", and subsequently stands by for storing a consumed amount to be newly consumed by the user.

On the other hand, the electronic settlement server 10 having received consumed amount notification messages from the respective in-store servers 31 performs, in response to each consumed amount notification message, retained amount update processing for updating the retained amount 903 of the gaming parlor operator retained amount data 900 stored in the electronic settlement server 10 (S406). Specifically, the electronic settlement server 10 or, more specifically, the adjustment processing unit 405 determines, based on the in-store server ID or the gaming parlor operator ID included in the received consumed amount notification message, which record 901 among the gaming parlor operator retained amount data 900 is to have the consumed amount described in the consumed amount notification message reflected on the gaming parlor operator retained amount 903 of the record 901, and causes the notified consumed value to be stored by adding to the retained amount 903 of the determined record 901. In addition, the adjustment processing unit 405 updates (subtracts) the retained amount 704 of a corresponding user record 701 according to the deposit 1501 included in the consumed amount notification message. Due to the retained amount update processing, the electronic settlement server 10 can aggregate and store consumed amounts stored in the respective in-store servers 31. The aggregated consumed amount is an amount to be transferred to each gaming parlor operator account 43 (save a handling fee of the settlement provider).

Next, a transfer request message that is a message for requesting the receiving network 40 to transfer an amount corresponding to the retained amount 903 of the gaming parlor operator in question from the settlement provider account 42 to the gaming parlor operator account 43 is transmitted (S407). Details of the message may be determined so as to conform to specifications determined by the receiving network 40.

While one transfer request message is generated for each record 901 of the gaming parlor operator retained amount table 900 in the present embodiment, a transfer request message may be generated in a different manner. The transfer request message stores information that identifies the gaming parlor operator account 43 that is a transfer destination account or, more specifically, the bank number 803, the branch number 804, the account type 805, the account number 806, and the account name 807. In addition, the transfer request message stores information that identifies the settlement provider account 42 that is a transfer source account or, more specifically, the bank number, the branch number, the account type, the account number, and the account name of the settlement provider account 42. Furthermore, the transfer request message stores a value of an amount based on the retained amount 903 as a transfer amount. The amount based on the retained amount 903 need not necessarily have the same value as the retained amount and may be, for example, a value of an amount obtained by subtracting a handling fee of the settlement provider from the retained amount.

A predetermined timing at which the adjustment processing unit 405 is activated may be any timing as long as such timing can be judged by the CPU. For example, the timing may be based on temporal conditions (the 30th of each month, every fourth Monday, days of the month ending in 5 or 0 (when payments are often due), or the like), or based on monetary conditions such as when the retained amount reaches a predetermined value. In addition, the adjustment processing unit 405 need not necessarily be automatically activated, and the present invention can be realized even when adopting a configuration in which an administrator or an operator of the electronic settlement server 10 manually operates the adjustment processing unit 405.

After generating a transfer request message for each record 901, the adjustment processing unit 405 transmits the generated transfer request messages to the receiving network 40 (S408). The receiving network 40 having received the transfer request messages executes transfer processing from the settlement provider account 42 to the gaming parlor operator account 43 according to contents of the respective transfer request messages (S409). Due to processing from steps S401 to S409 described above, a total of amounts paid as the price of usage of the negotiable value providing device 30 by each user is to be transferred to the respective gaming parlor operator accounts 43.

When the transfer processing (S409) is successfully performed, the receiving network 40 transmits, to the electronic settlement server 10, a transfer result notification message in order to notify the electronic settlement server 10 that transfer processing has been successfully executed (S410). Moreover, when the transfer processing could not be properly performed due to reasons such as an insufficient balance of the settlement provider account 42, the receiving network 40 transmits a transfer result notification message to the effect that the transfer could not be performed to the electronic settlement server 10.

The electronic settlement server 10 having received a transfer result notification message to the effect that transfer processing has been successfully performed executes clear retained amount processing that is processing for reflecting the transfer amount to the corresponding record 901 in the gaming parlor operator retained amount data 900 (S411). Due to the clear retained amount processing, the value of the retained amount 903 of the gaming parlor operator is restored to "0" to prevent redundant transfer processing from being performed.

FIGS. 19A and 19B are diagrams illustrating stored contents of the in-store server 31, the electronic settlement server 10, and the receiving network 40 as a result of executing the steps S401 to S411 after the state illustrated in FIG. 17. In the state illustrated in FIG. 17, the deposit 1501 of the record 562A is 9,000 yen, the consumed amount 1502 is 1,000 yen, and the retained amount 903 of the record 901 is 0 yen.

FIG. 19A is a diagram illustrating stored contents upon the completion of clear consumed amount processing (S405) and retained amount update processing (S406).

Due to the execution of clear consumed amount processing (S405), the consumed amount 1502 of the in-store server 31 is rewritten from 1,000 yen to 0 yen. However, the deposit 1501 remains unchanged at 9,000 yen. In addition, due to the execution of retained amount update processing S406, the user retained amount 703 of the electronic settlement server 10 is changed from 10,000 yen to 9,000 yen and the value of the gaming parlor operator retained amount 903 is changed from 0 yen to 1,000 yen.

No changes are made at this point to the user account 41, the settlement provider account 42, and the gaming parlor operator account 43 stored in the receiving network 40.

FIG. 19B is a diagram illustrating stored contents upon completion of transfer processing S409 and clear retained amount processing S411 after the state illustrated in FIG. 19A. The electronic settlement server 10 or, more specifically, the adjustment processing unit 405 reads the retained amount 903 for each record 901 of the gaming parlor operator retained amount data 900, and requests the receiving network 40 to transfer an amount obtained by subtracting a predetermined settlement handling fee (for example, 10 yen) from the retained amount 903 from the settlement provider account 42 to the corresponding gaming parlor operator account 43. In the case of the present example, since the retained amount 903 at this point is 1,000 yen, the electronic settlement server 10 or, more specifically, the adjustment processing unit 405 requests transfer of 990 yen as a result of subtracting the settlement handling fee 10 yen from 1,000 yen.

Prior to transfer, the amount of the settlement provider account 43 is 10,100 yen and the amount of the gaming parlor operator account is 0 yen. When the receiving network 40 executes the transfer request described above, as illustrated in FIG. 19B, 990 yen is withdrawn from 10,100 yen to change the amount of the settlement provider account 43 to 9,110 yen, while the gaming parlor operator account 43 is changed to 990 yen by adding 990 yen. Moreover, no change is made to the amount of the user account 41. In addition, 9,000 yen among the balance 9,110 yen of the settlement provider account 42 is an amount held in care for the user, and the remaining 110 yen is the profit of the settlement provider. Consequently, the electronic settlement provider becomes capable of obtaining profit as compensation for managing the present electronic settlement system 1.

In addition, the electronic settlement server 10 or, more specifically, the adjustment processing unit 405 executes clear retained amount processing (S411) in response to the transfer result notification message (S410) to the effect that transfer processing (S409) described above has been completed, and changes the retained amount 903 of the corresponding record 901 from 1,000 yen to 0 yen.

Due to the processing described above, the present electronic settlement system 1 can now have a cost of use of the negotiable value providing device 30 used by the user via the in-store server 31 be paid to the gaming parlor operator account 43 and, at the same time, the settlement provider can now collect a settlement handling fee as a price of settlement using the electronic settlement system 1.

[II. Second Embodiment]

Next, a second embodiment according to the present invention will be described.

While the electronic settlement system 1 according to the first embodiment involves performing a transfer from the settlement provider account 42 to the gaming parlor operator account 43 in response to a user consuming a deposit, the second embodiment differs from the first embodiment in that a transfer from the settlement provider account 42 to the gaming parlor operator account 43 is made at a point where a user requests a transfer to the electronic settlement server 10. Therefore, an electronic settlement system 1 according to the second embodiment can reduce the number of transfer processing using the receiving network 40.

In addition, user retained amount data 700 and gaming parlor operator retained amount data 900 need not be stored in an electronic settlement server 10 according to the second embodiment.

[1. Configuration Example of Electronic Settlement System According to Second Embodiment]

Since a configuration of the electronic settlement system 1 according to the second embodiment is basically the same as that of the first embodiment, a detailed description thereof will be omitted.

[2. Operation Example of Electronic Settlement System According to Second Embodiment]

Next, an operation example of the electronic settlement system according to the second embodiment will be described.

In the electronic settlement system 1 according to the second embodiment, when a user attempts to receive provision of a negotiable value from a negotiable value providing device 30 under the management of a desired in-store server 31, a transfer is made from a user account 41 to a settlement provider account 42 and a transfer is also made from the settlement provider account 42 to a gaming parlor operator account 43 at the point where the user transmits a transfer request to receive such provision to the electronic settlement server 10. The second embodiment differs in this aspect from the first embodiment in which a transfer is made from the settlement provider account 42 to the gaming parlor operator account 43 according to an amount by which the user uses the negotiable value providing device 30.

With the electronic settlement system 1 according to the second embodiment, prior to using the electronic settlement system 1, the user must similarly download an application such as i-appli that runs on a mobile communications terminal 20 and perform user registration to the electronic settlement system 1 or, more specifically, the electronic settlement server 10. Since this processing is similar to that of the operation example of the first embodiment illustrated in FIG. 11, a detailed description of the processing according to the second embodiment will be omitted.

In the second embodiment, in a similar manner to the first embodiment, simply completing the user registration described above does not enable the user to use the electronic settlement system 1 to make a purchase (receive a negotiable value) from the negotiable value providing device 30. The user must request the electronic settlement system 1 or, more specifically, the electronic settlement server 10 from the mobile communications terminal 20 to perform transfer of money (deposit) of a specified amount from the user's own user account 41 to the settlement provider account 42. An amount consumed at the negotiable value providing device 30 by the user via the in-store server 31 is paid from this deposit. The electronic settlement server 10 causes the transfer, save a handling fee of the settlement provider, to be made by processing of the receiving network 40 from the settlement provider account 41 to an account of a gaming parlor operator that is a beneficiary or, in other words, the gaming parlor operator account 43. Hereinafter, an operation example of the electronic settlement system 1 according to the second embodiment in a case where the user requests the electronic settlement server 10 to perform a transfer from the user account 41 that is the user's own account to the settlement provider account 42 will now be described with reference to FIG. 20. FIG. 20 is a sequence diagram illustrating an operation example of the electronic settlement system 1 when the user requests a transfer from the user account 41 to the settlement provider account 42.

First, the user activates an application or, more specifically, a transfer request generating unit 207 in the mobile communications terminal 20 (S501). The activated application or, more specifically, the transfer request generating unit 207 causes an output unit 205 of the mobile communications terminal 20 to display an input interface screen or the like, and prompts the user to input information necessary for a transfer request message such as a transfer amount, an account personal identification number, and information identifying an in-store server 31 (for example, an in-store server ID).

Upon receiving input of such information (S502), the mobile communications terminal 20 or, more specifically, the transfer request generating unit 207 generates a transfer request message and transmits the transfer request message to the electronic settlement server 10 via a base station, a mobile communications network 70, a gateway 80, and a communication network 50 (S503). The transfer request message stores a user ID 208, a password 209, the inputted transfer amount, account personal identification number, information identifying an in-store server 31 to be used (in-store server ID), and the like.

The electronic settlement server 10 or, more specifically, a transfer request processing unit 404 having received the transfer request message uses the user ID 208 included in the transfer request message as a key to search a user table 600, and acquires a bank number 605, a branch number 606, an account type 607, an account number 608, and an account name 609 which are information specifying the user account 41 from a record 601 that is consistent with the user ID 208. In addition, the transfer request processing unit 404 reads separately stored information (not shown) that identifies a settlement provider account 42 or, more specifically, a bank number, a branch number, an account type, and an account number of the settlement provider account 42, generates a transfer request message using the information, and transmits the transfer request message to the receiving network 40 (S504). Moreover, a data configuration, a communication procedure, and the like to be used when transmitting the transfer request message may conform to a method adopted by the receiving network 40.

The receiving network 40 having received the transfer request message performs transfer processing according to the content of the transfer request message so as to transfer or wire-transfer the specified amount (hereinafter referred to as a "user transfer amount") from the user account 41 to the settlement provider account 42 (S505). When the transfer processing (S505) is successfully performed, the receiving network 40 transmits, to the electronic settlement server 10, a transfer result notification message in order to notify the electronic settlement server 10 that transfer processing has been successfully executed (S506). Moreover, when the transfer processing could not be properly performed due to reasons such as an insufficient balance of the user account 41, the receiving network 40 transmits a transfer result notification message to the effect that the transfer could not be performed to the electronic settlement server 10. Processing of steps S501 to S506 are the same as the processing of steps S201 to S206 according to the first embodiment.

Now, after step S506, the electronic settlement server 10 or, more specifically, the transfer request processing unit 404 generates a transfer request message for requesting an amount corresponding to the user transfer amount to be further transferred from the settlement provider account 42 to the gaming parlor operator account 43, and transmits the transfer request message to the receiving network 40 (S507). That is, the electronic settlement server 10 or, more specifically, the transfer request processing unit 404 uses information identifying the in-store server 31 included in the transfer request message (S503) as a key to search an in-store server table 1000 and a gaming parlor operator table 800, and acquires a bank number 803, a branch number 804, an account type 805, an account number 806, and an account name 807 which are information specifying the gaming parlor operator account 43 from records 1001 and 801 that are consistent with the information identifying the in-store server 31. In addition, the transfer request processing unit 404 reads separately stored information (not shown) that identifies a settlement provider account 42 or, more specifically, a bank number, a branch number, an account type, and an account number of the settlement provider account 42, generates a transfer request message using the information, and transmits the transfer request message to the receiving network 40 (S507). Moreover, a data configuration, a communication procedure, and the like to be used when transmitting the transfer request message may conform to a method adopted by the receiving network 40.

The receiving network 40 having received the transfer request message of step S507 performs transfer processing according to the content of the transfer request message so as to transfer the specified amount (hereinafter referred to as a "gaming parlor operator transfer amount") from the settlement provider account 42 to the gaming parlor operator account 43 (S508). When the transfer processing (S508) is successfully performed, the receiving network 40 transmits, to the electronic settlement server 10, a transfer result notification message in order to notify the electronic settlement server 10 that transfer processing has been successfully executed (S509). Moreover, when the transfer processing could not be properly performed due to reasons such as an insufficient balance of the user account 41, the receiving network 40 transmits a transfer result notification message to the effect that the transfer could not be performed to the electronic settlement server 10.

The receiving network 40 having received the transfer request message (S507) performs transfer processing according to the content of the transfer request message so as to transfer or wire-transfer the gaming parlor operator transfer amount from the settlement provider account 42 to the gaming parlor operator account 43 (S508). When the transfer processing (S508) is successfully performed, the receiving network 40 transmits, to the electronic settlement server 10, a transfer result notification message in order to notify the electronic settlement server 10 that transfer processing has been successfully executed (S509).

The electronic settlement server 10 having received the transfer result notification message to the effect that transfer processing has been successfully performed generates a user deposit processing request message so that the aforementioned user transfer amount is reflected onto user deposit data 562 of the in-store server 31, and transmits the message to the in-store server 31 specified by the user (S510). The in-store server 31 or, more specifically, a deposit processing unit 552 having received the user deposit processing request message executes deposit data update processing that is processing for reflecting a content of the user deposit processing request message onto a corresponding record 562A of the user deposit data 562 (S511). Due to the deposit data update processing, the user can now use an amount corresponding to the user transfer amount using the electronic settlement system 1 or, more specifically, the negotiable value providing device 30 managed by the in-store server 31. Moreover, when the user corresponding to the user deposit processing request message is a user not yet registered to a user table 561, a record 561A of the user in question is added to the user table 561.

FIGS. 21 to 24 are diagrams illustrating an operation example performed among the in-store server 31, the electronic settlement server 10, and the receiving network 40 according to the second embodiment in a case where a user transfer amount and a gaming parlor operator transfer amount are processed.

FIG. 21 illustrates an example of a state prior to transfer request message transmission (S503 in FIG. 20) by the user to the electronic settlement server 10. In this example, the receiving network 40 includes the user account 41, the settlement provider account 42, and the gaming parlor operator account 43.

Now, let us assume that the balance of the user account 41 is 100,000 yen, and the balances of the settlement provider account 42 and the gaming parlor operator account 43 are both 0 yen. Moreover, while it is conceivable that, in reality, a plurality of users and a plurality of gaming parlor operators are likely to have accounts in the receiving network 40, one each of the user account 41 and the gaming parlor operator account 43 have been displayed as a representative example in FIGS. 21 to 24.

As described above, in the second embodiment, the electronic settlement server 10 need not store user retained amount data 700 and gaming parlor operator retained amount data 900.

FIG. 22 illustrates a state where, after the state illustrated in FIG. 21, the user has transmitted a transfer request message from the mobile communications terminal 20 to the electronic settlement server 10 to have the user transfer amount of 10,000 yen to be used at a desired in-store server 31 transferred. The electronic settlement server 10 transmits a transfer request message such as the following to the receiving network 40 in response to the transfer request message (refer to S504). That is, a transfer request message whose content is "transfer the user transfer amount of 10,000 yen and a settlement provider handling fee (for example, 100 yen) from the user account 41 to the settlement provider account 42" is sent to the receiving network 40.

The receiving network 40 having received the transfer request message performs processing for transferring 10,100 yen from the user account 41 to the settlement provider account 42 (refer to S505). As a result, as illustrated in FIG. 22, the balance of the user account 41 becomes 100,000 yen−10,100 yen=89,900 yen, and the balance of the settlement provider account 42 becomes 0 yen+10,100 yen=10,100 yen. In this manner, the receiving network 40 changes balances of the respective accounts 41 and 42 in response to the transfer request.

FIG. 23 illustrates a state where, after the state illustrated in FIG. 22, a transfer request message has been transmitted from the electronic settlement server 10 to the receiving network 40 so as to transfer the gaming parlor operator transfer amount to the gaming parlor operator account 43 (refer to S507), and the receiving network 40 has executed transfer processing (refer to S508) according to the transfer request message.

The electronic settlement server 10 transmits a transfer request message such as the following to the effect of transferring the gaming parlor operator transfer amount to the gaming parlor operator account 43 to the receiving network 40 (refer to S507). That is, a transfer request message whose content is "transfer the gaming parlor operator transfer amount that is an amount obtained by subtracting a settlement provider handling fee (for example, 10 yen) from the user transfer amount of 10,000 yen (10,000 yen−10 yen=9,990 yen) from the settlement provider account 42 to the gaming parlor operator account 43" is transmitted to the receiving network 40.

The receiving network 40 having received the transfer request message performs processing for transferring 9,990 yen from the settlement provider account 41 to the gaming parlor operator account 43 (refer to S508). As a result, as illustrated in FIG. 23, the balance of the settlement provider account 42 becomes 10,100 yen−9,990 yen=110 yen, and the balance of the gaming parlor operator account 43 becomes 0 yen+9,990 yen=9,990 yen. The balance of the user account 41 remains unchanged at 89,900 yen. The receiving network 40 changes balances of the respective accounts 42 and 43 as described above in response to the transfer request message.

FIG. 24 illustrates a state where, after the state illustrated in FIG. 23, deposit update processing (S511) has been executed in response to a user deposit processing request message from the electronic settlement server 10. As illustrated in FIG. 20, when transfer processing (S508) is performed by the receiving network 40, the receiving network 40 transmits a transfer result notification message to the electronic settlement server 10 to the effect that the transfer of the gaming parlor operator transfer amount has been successfully performed (S509), and in response to the transfer result notification message, the electronic settlement server 10 transmits a user deposit processing request message to the in-store server 31 specified by the user (S510).

The in-store server 31 or, more specifically, the deposit processing unit 552 having received the user deposit processing request message executes, in response to the user deposit processing request message, deposit data update processing (S511) on the user deposit data 562 involving adding a user transfer amount to the user deposit 1501 stored in a record 562A corresponding to the user ID included in the message. However, 100 yen corresponding to the handling fee is not added. As a result of the retained amount data processing (S510) in the form of addition, 0 yen+10,000 yen=10,000 yen is to be recorded in a user retained amount 703 of a record 701. The 10,000 yen is to be the amount usable by the user in the electronic settlement system 1.

Next, an operation example of the electronic settlement system 1 according to the second embodiment in a case where the user attempts to receive provision of a negotiable value from the negotiable value providing device 30 will be described.

In the second embodiment, processing similar to that of steps S301 to S310 described for the first embodiment is executed (refer to FIG. 16). However, the processing of steps S410 to S411 illustrated in FIG. 18 is not performed in the second embodiment. In the second embodiment, the consumed amount 1502 (refer to FIG. 24) of a user is managed by the in-store server 31 and not by the electronic settlement server 10. As a result, the number of communications between the in-store server 31 and the electronic settlement server 10 can be further reduced in comparison to the first embodiment. In addition, the number of transmissions of transfer requests from the electronic settlement server 10 to the receiving network 40 can also be reduced in comparison to the first embodiment.

[III. Modifications and the Like]

(1) The providing device-side near field communication unit 303 and the terminal-side near field communication unit 201 may be replaced by having a QR code or the like displayed on a liquid crystal display provided in the negotiable value providing device 30 and a barcode reader using a CCD camera provided in the mobile communications terminal 20, and having the barcode reader read a bar code. In this case, information indicated by the bar code may be used as-is as a device ID.

(2) While the first and second embodiments described above are arranged such that a transfer from the user account 41 to the settlement provider account is performed by transmitting a transfer request from the mobile communications terminal 20 to the receiving network 40 via the electronic settlement server 10, the present invention can also be realized by having a transfer request sent directly from the mobile communications terminal 20 to the receiving network 40.

[IV. Advantages of Present Electronic Settlement System]

(1) Advantages to User

Since a settlement method which is an alternative to cash settlement and which is usable in a gaming parlor is realized, even after using up cash in hand in a gaming parlor, a gaming medium (rental balls, rental medals), merchandise, and the like can now be purchased with a simple settlement procedure (processing that involves performing an input operation as simple as holding a mobile communications terminal 20 close to a negotiable value providing device 30).

Therefore, since gaming media or the like can be additionally purchased with a simple operation even when cash in hand is used up during gaming or when hitting a jackpot while running low on cash in hand and gaming media such as balls or medals are almost used up, a gamer can continue playing with an easy mind without having to worry about cash balance.

Moreover, in addition to a sense of reassurance due to the fact that a terminal used to perform a settlement procedure is a mobile communications terminal owned by the user, since an input procedure of a card number or a personal identification number need not be performed, there is no longer a risk of a record of a card number or a personal identification number retained at a store or fraudulently obtained by a malicious person as is the case with a conventional credit card or a debit card, settlement can now be performed without anxiety.

In addition, since information distribution based on utilization status information acquired by the electronic settlement server 10 may also become available, a wider variety of receivable services can now be anticipated.

(2) Benefits to Store (Manager)

Since even a user who has run out of cash in hand due to gaming can additionally purchase gaming media using the present electronic settlement system, a utilization ratio of gaming machines can be increased. In addition, since the likelihood of such a user making a purchase in the store also increases, an improvement in sales of a gaming parlor can be expected. At the same, since information indicating which user had played on which gaming machine for how much or how long can be obtained, details of an operational status of gaming machines as well as preferences of a user can be learned based on the information and can be utilized as marketing information.

Since the use of the present electronic settlement system does not give rise to an increase of cash handled in the store, money received can be managed more easily and security control of cash can be strengthened.

(3) Advantages to Settlement Provider

By managing the present electronic settlement system, a settlement provider becomes capable of grasping a gaming status of a gamer that is a user and accumulating data to be referenced with respect to gaming machine development, sales, and marketing. In addition, since the number of transfers to a gaming parlor operator is limited to one transfer per user transfer request, the load on an electronic settlement server is small and a reduction in transfer handling fees can be achieved.

BRIEF DESCRIPTION OF THE DRAWINGS

FIG. 6 illustrates a configuration example of a user table stored in a database unit;

FIG. 8 illustrates a configuration example of a gaming parlor operator table stored in a database unit;

FIG. 24 is a diagram illustrating a state where, after the state illustrated in FIG. 23, an in-store settlement server has executed deposit data update processing.

DESCRIPTION OF SYMBOLS

Figure 1:
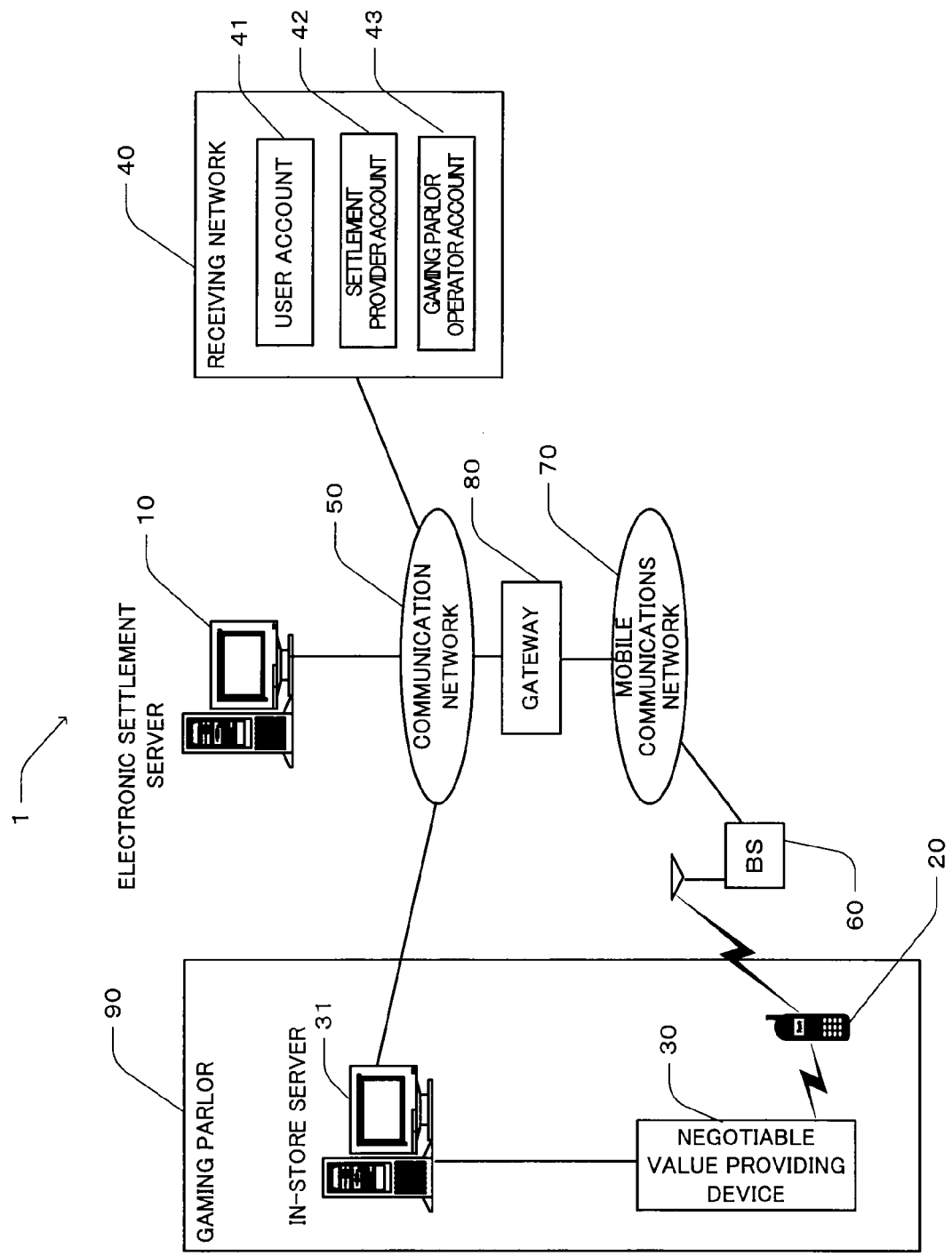
FIG. 1 is a network diagram illustrating an example of an electronic settlement system according to the present invention.
Figure 2:
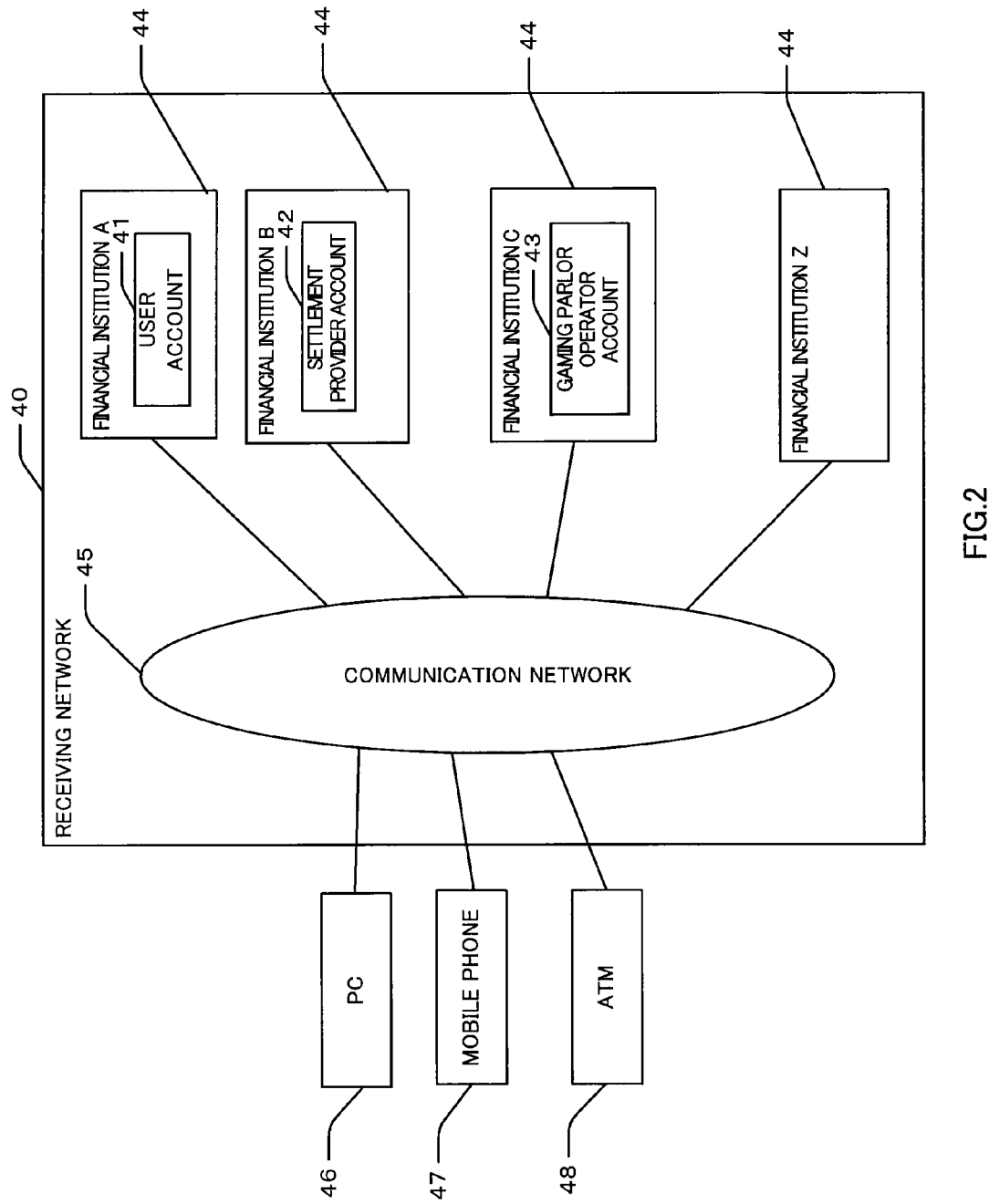
FIG. 2 is a block diagram illustrating a schematic configuration of a receiving network.
Figure 3:
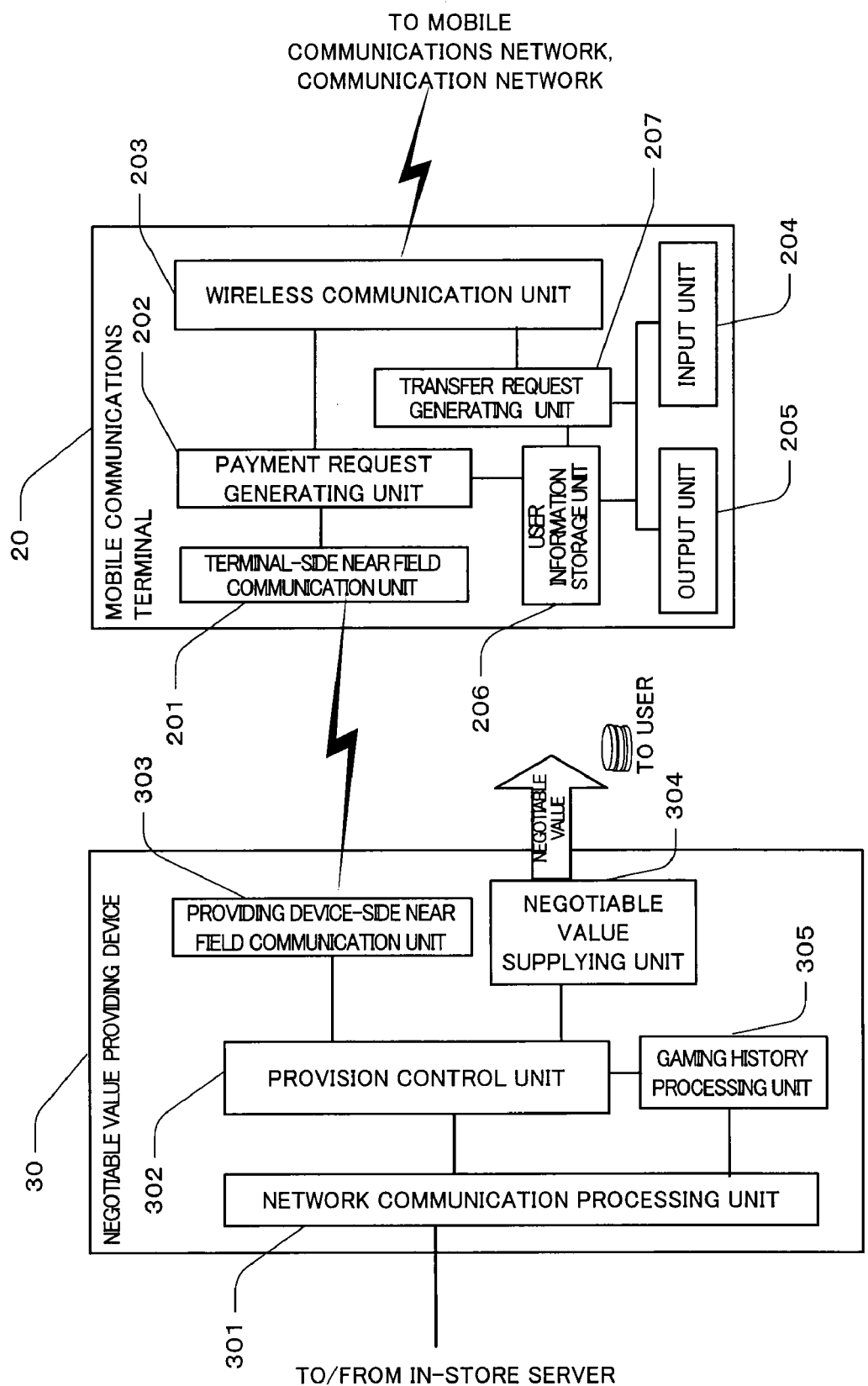
FIG. 3 is a functional block diagram illustrating a configuration example of a negotiable value providing device and a mobile communications terminal.
Figure 4:
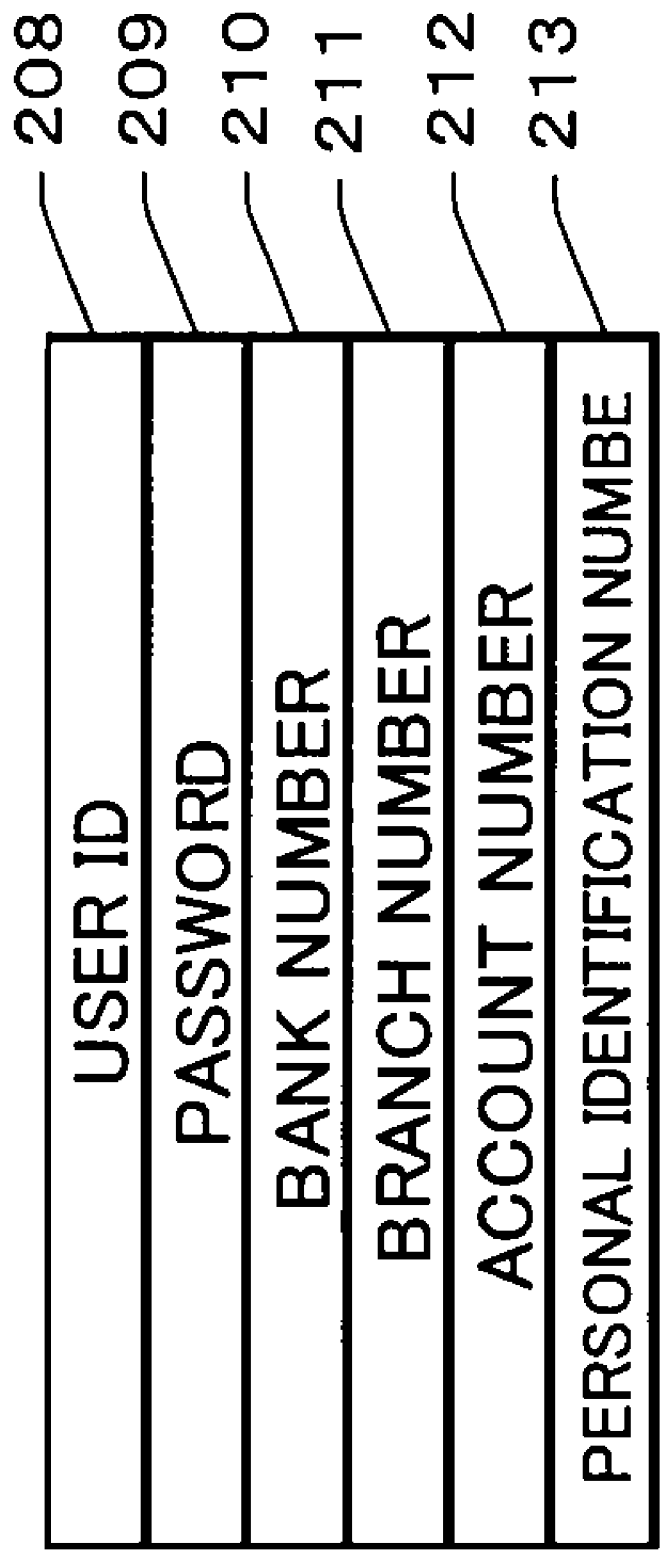
FIG. 4 illustrates an example of information to be stored by a user information storage unit.
Figure 5A:
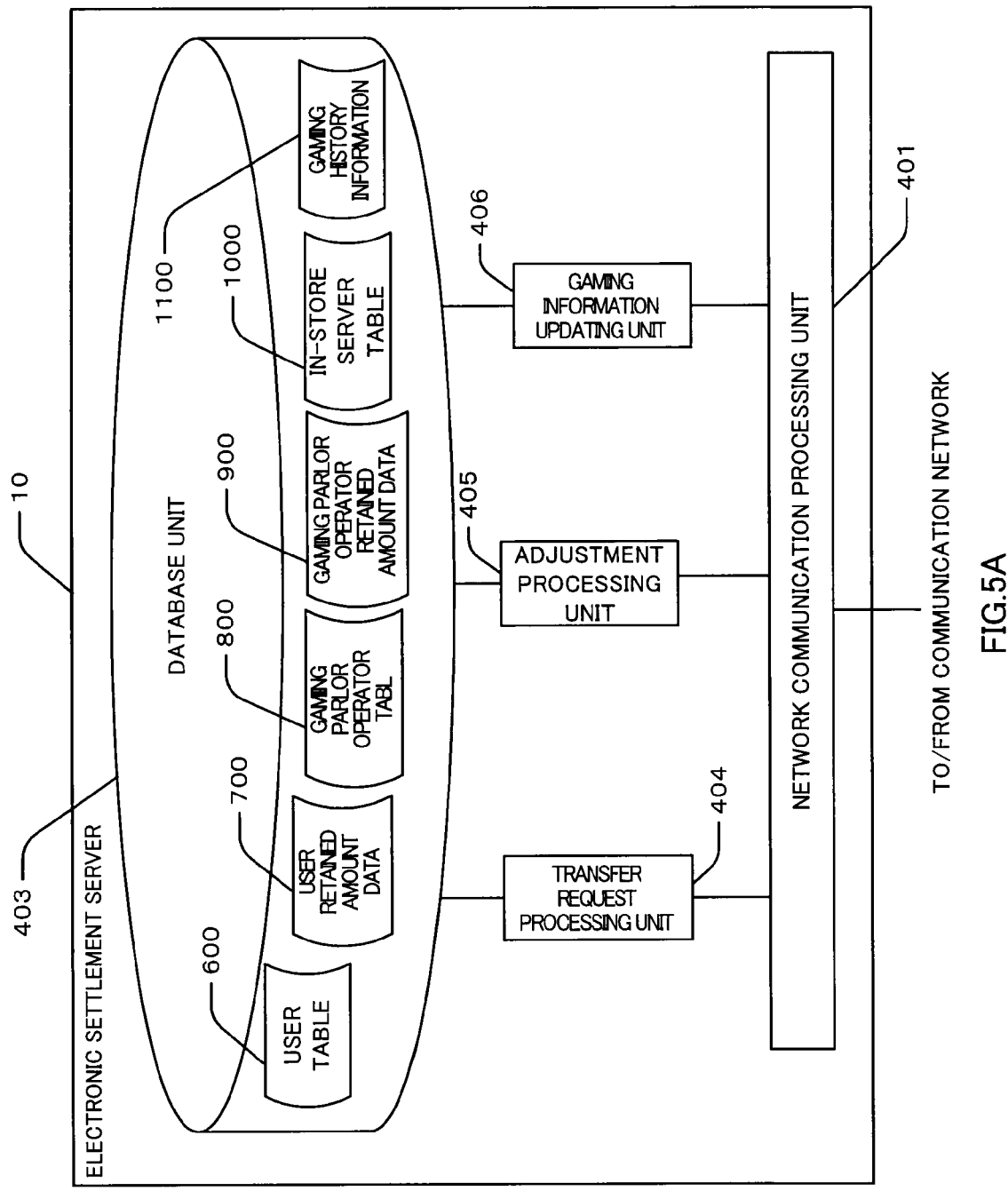
FIG. 5A is a functional block diagram illustrating a configuration example of an electronic settlement server.
Figure 5B:
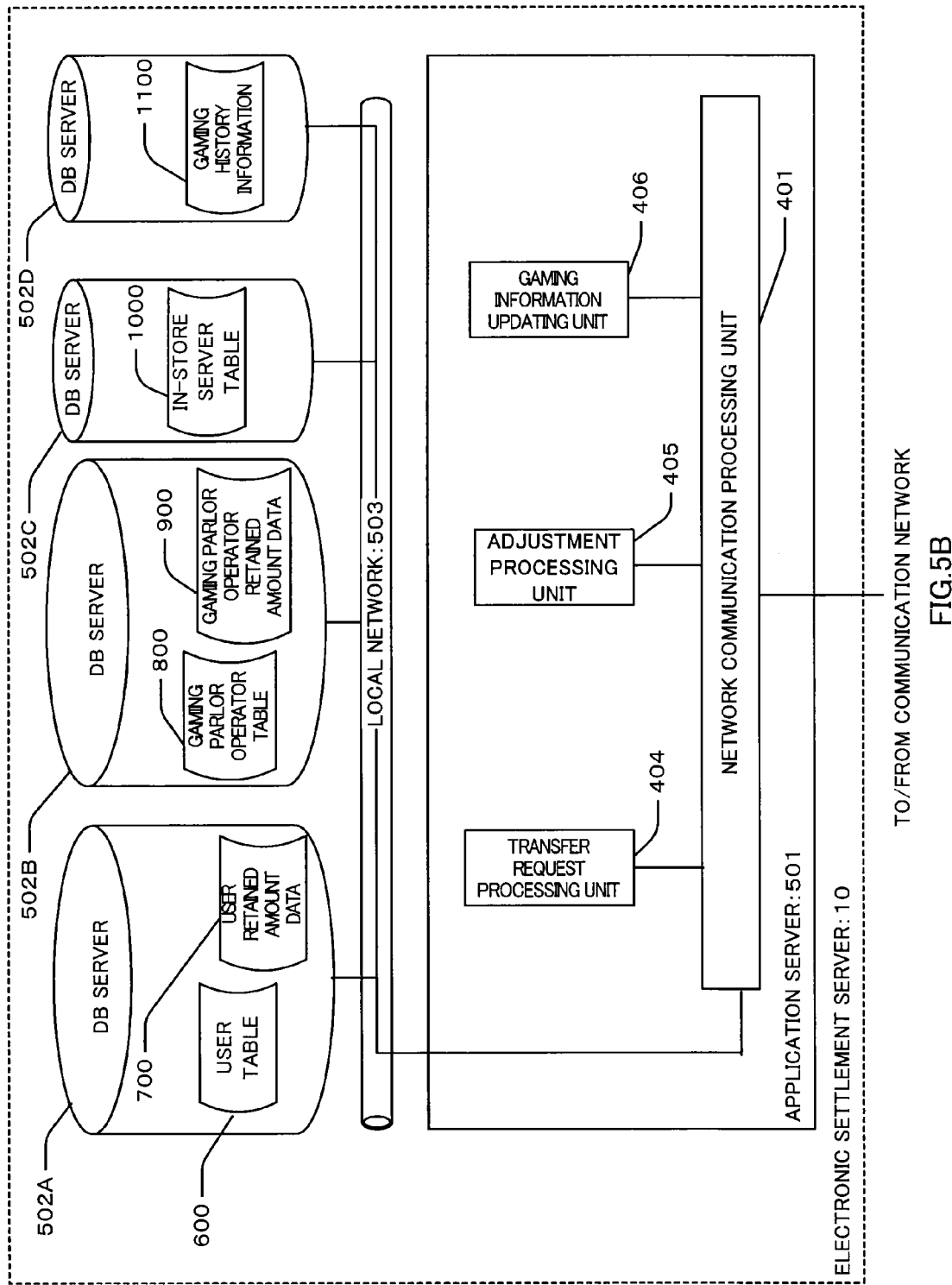
FIG. 5B is a functional block diagram illustrating a configuration example of an electronic settlement server adopting a distributed server configuration.
Figure 5C:
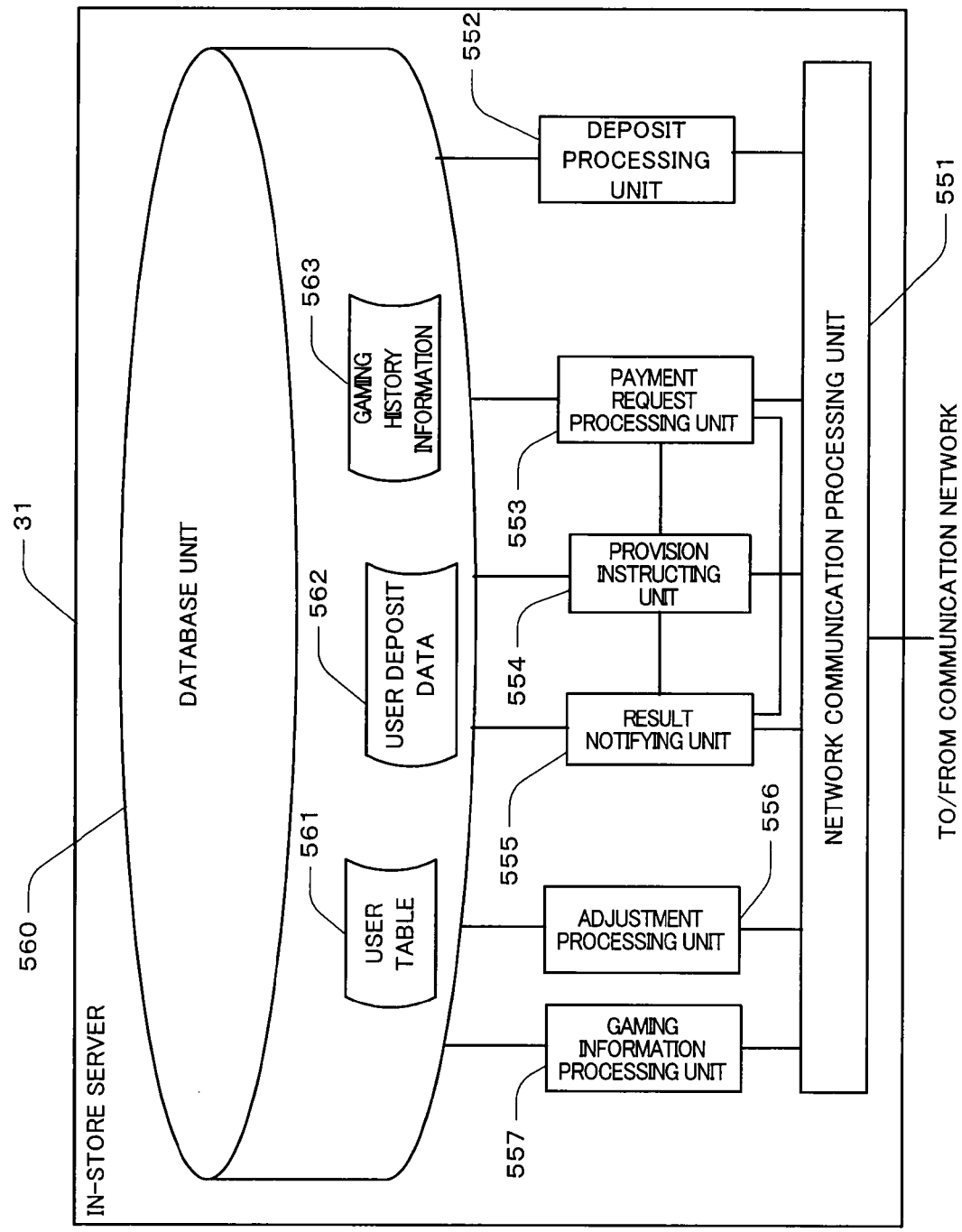
FIG. 5C is a functional block diagram illustrating a configuration example of an in-store server.
Figure 5D:
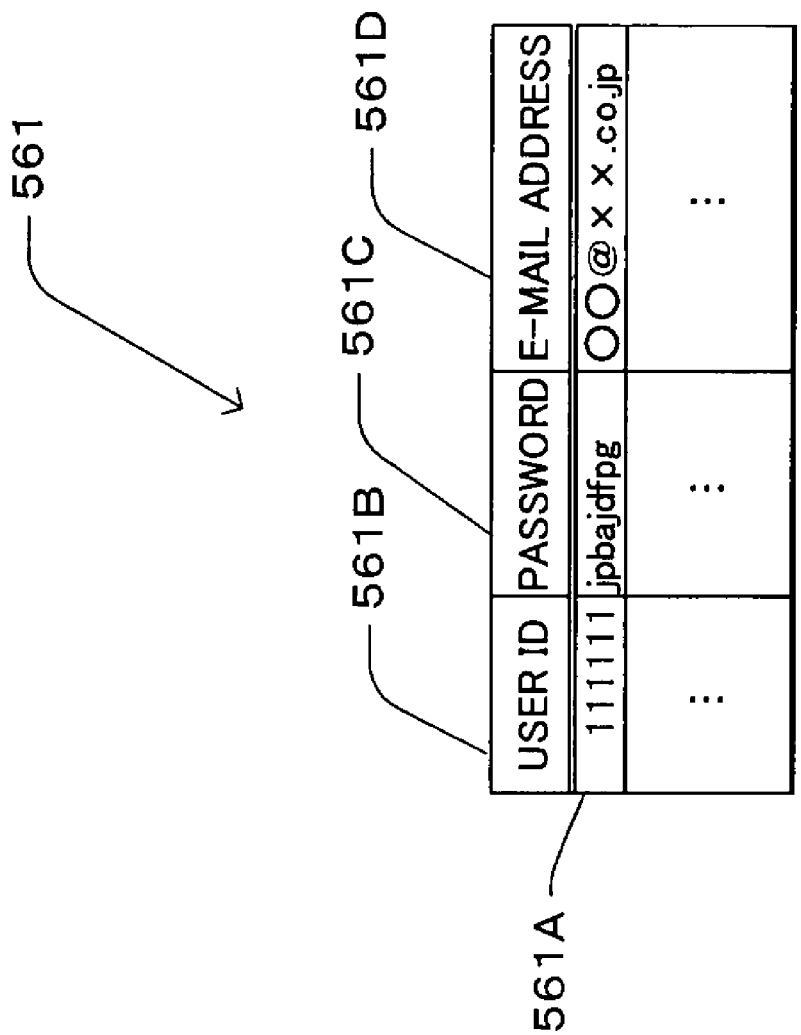
FIG. 5D illustrates a data configuration example of a user table stored in an in-store server.
Figure 5E:
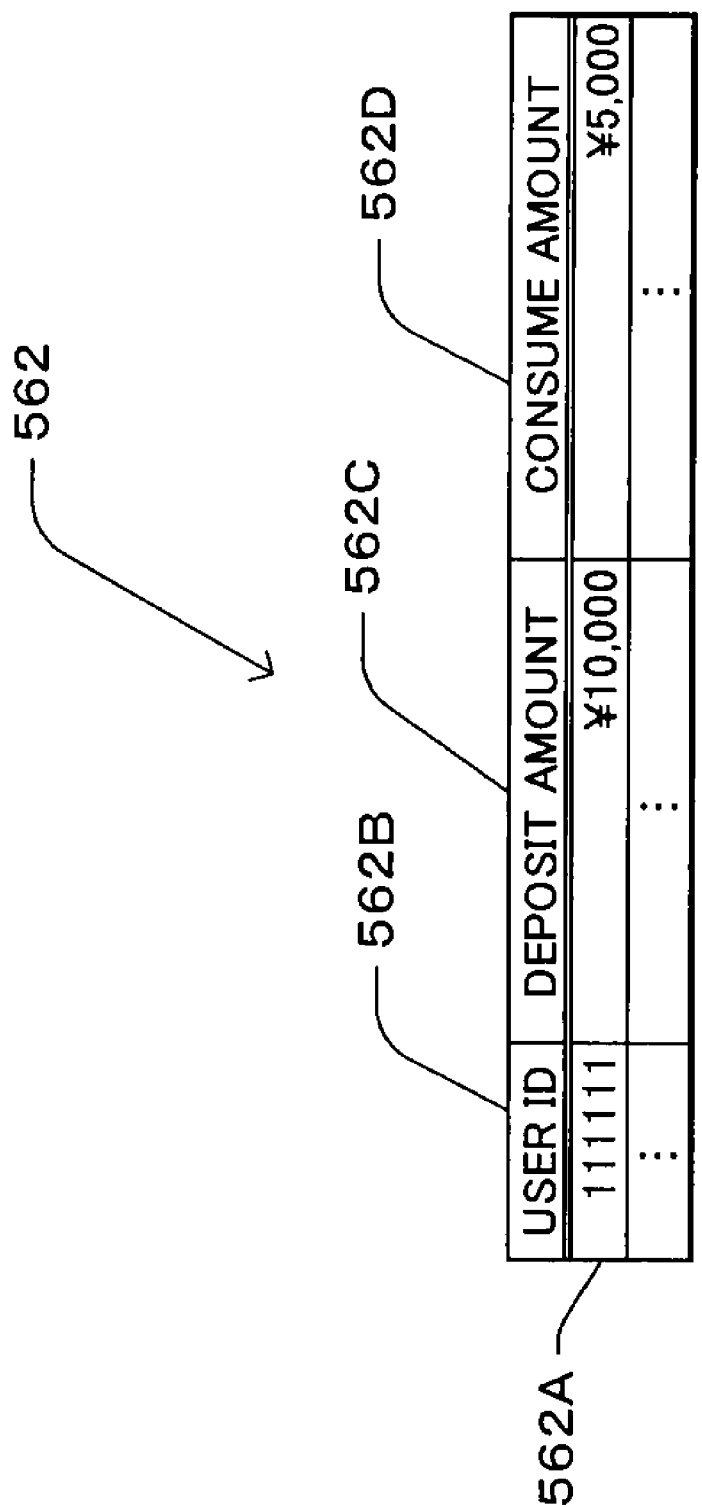
FIG. 5E illustrates a data configuration example of user deposit data stored in an in-store server.
Figure 7:
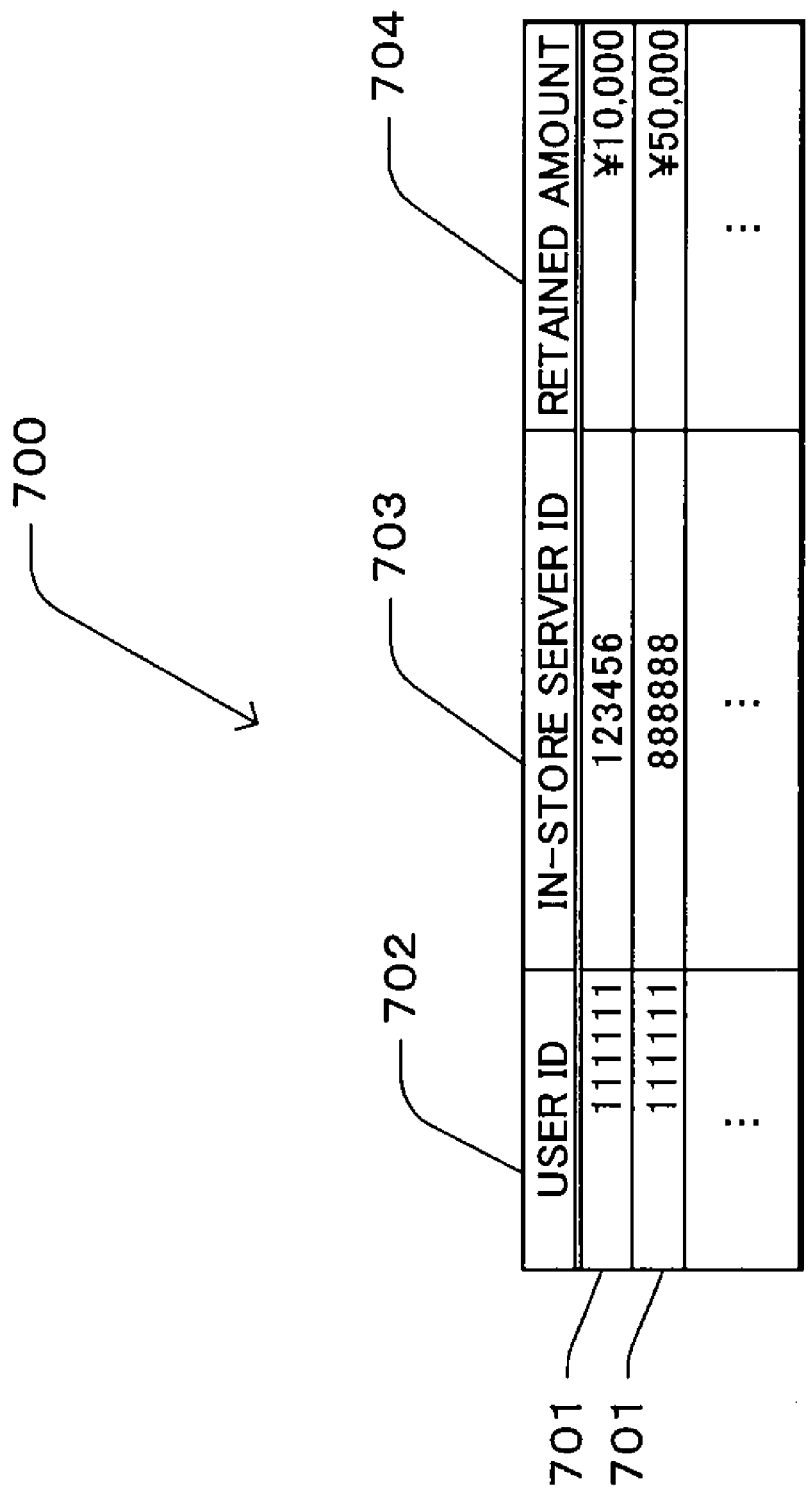
FIG. 7 illustrates a configuration example of user retained amount data stored in a database unit.
Figure 9:
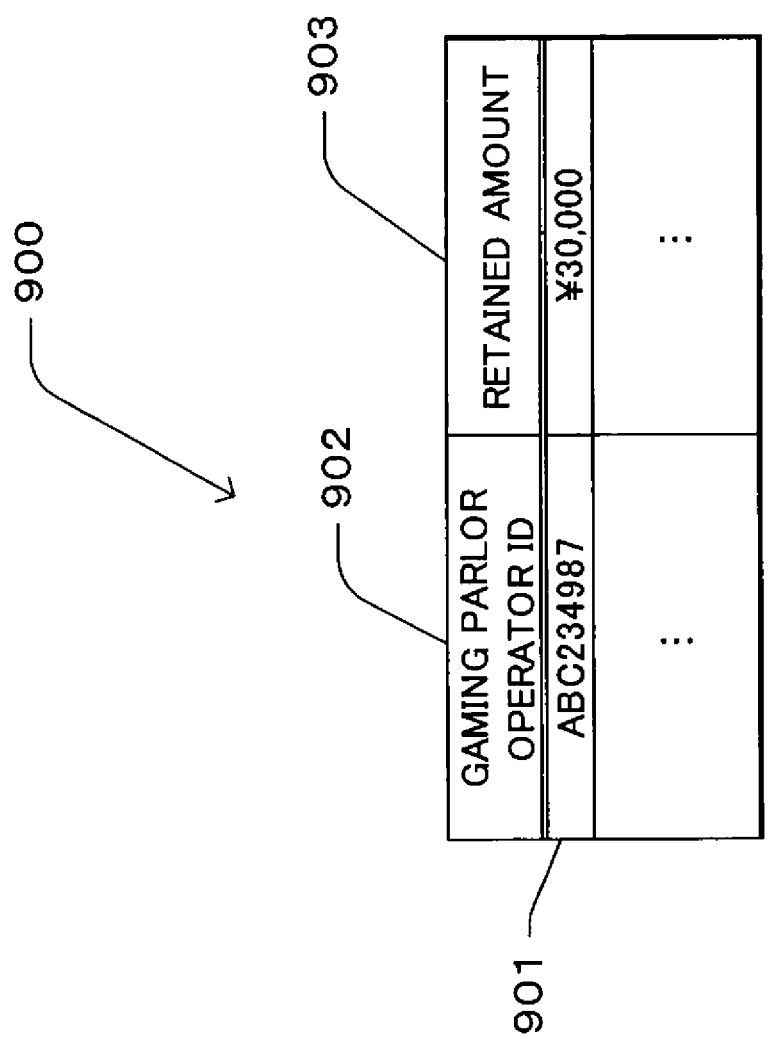
FIG. 9 illustrates a configuration example of a gaming parlor operator retained amount data stored in a database unit.
Figure 10:
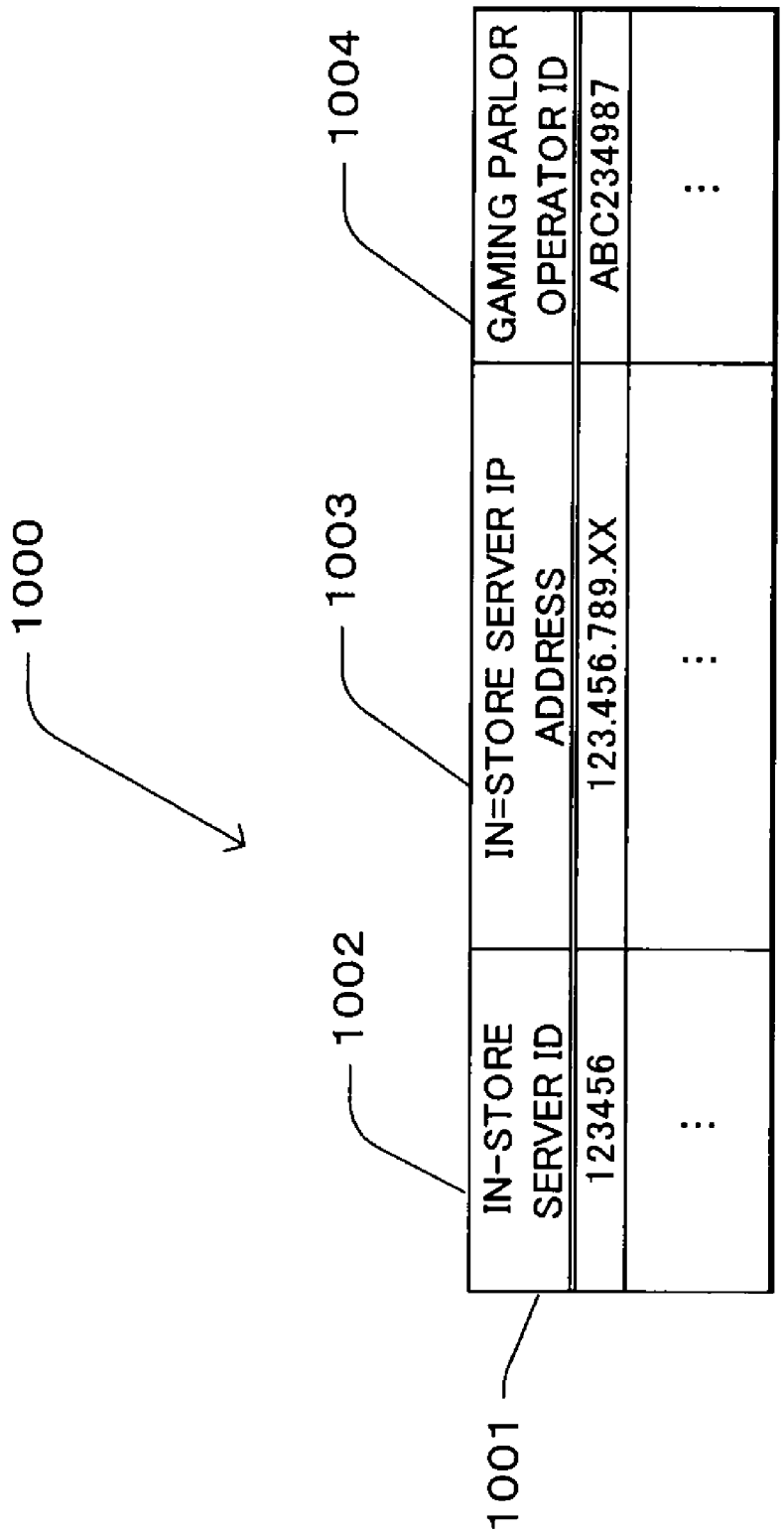
FIG. 10 illustrates a configuration example of an in-store server table stored in a database unit.
Figure 11:
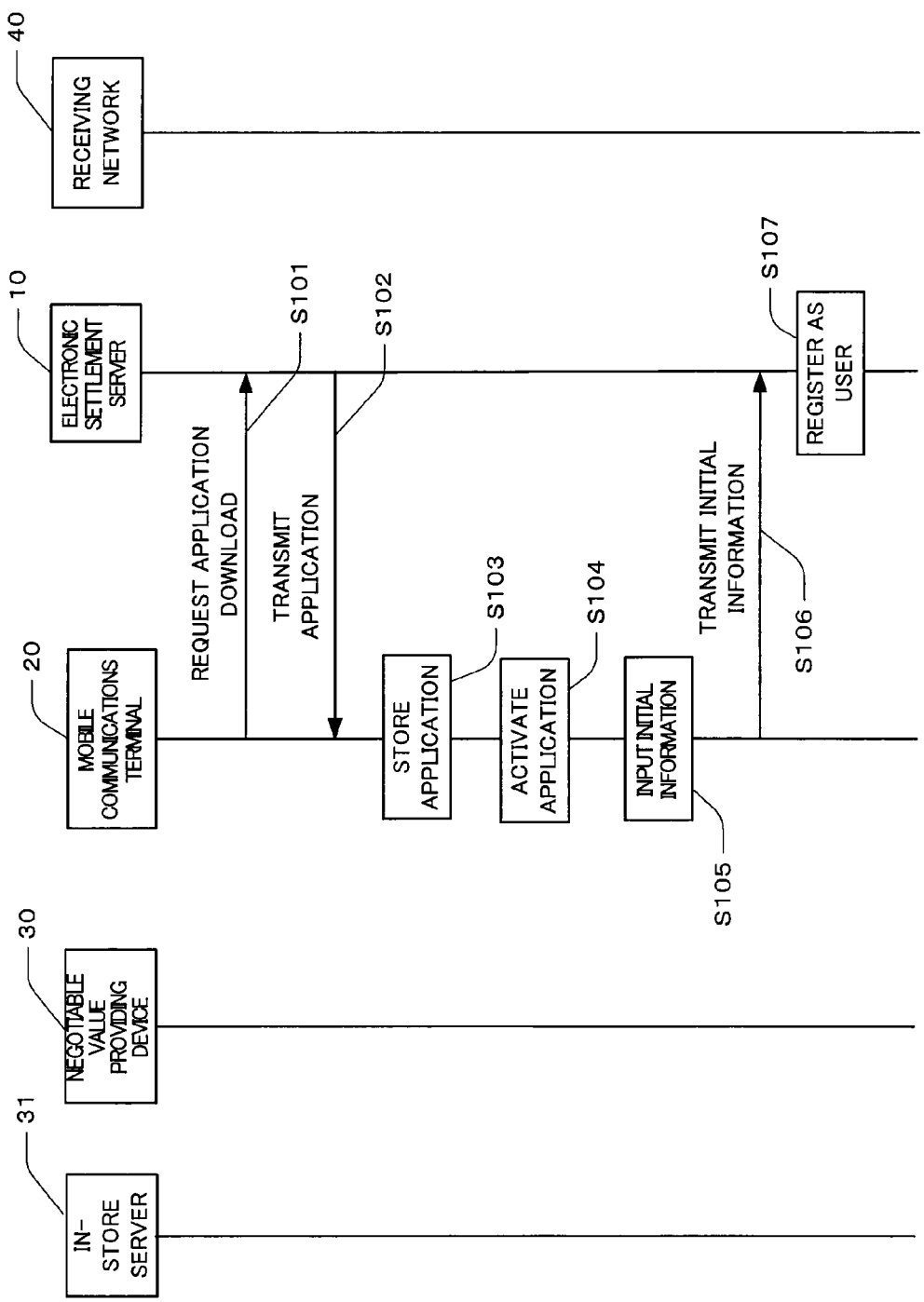
FIG. 11 is a sequence diagram illustrating an operation example of an electronic settlement system when a user registration is performed to the electronic settlement system.
Figure 12:
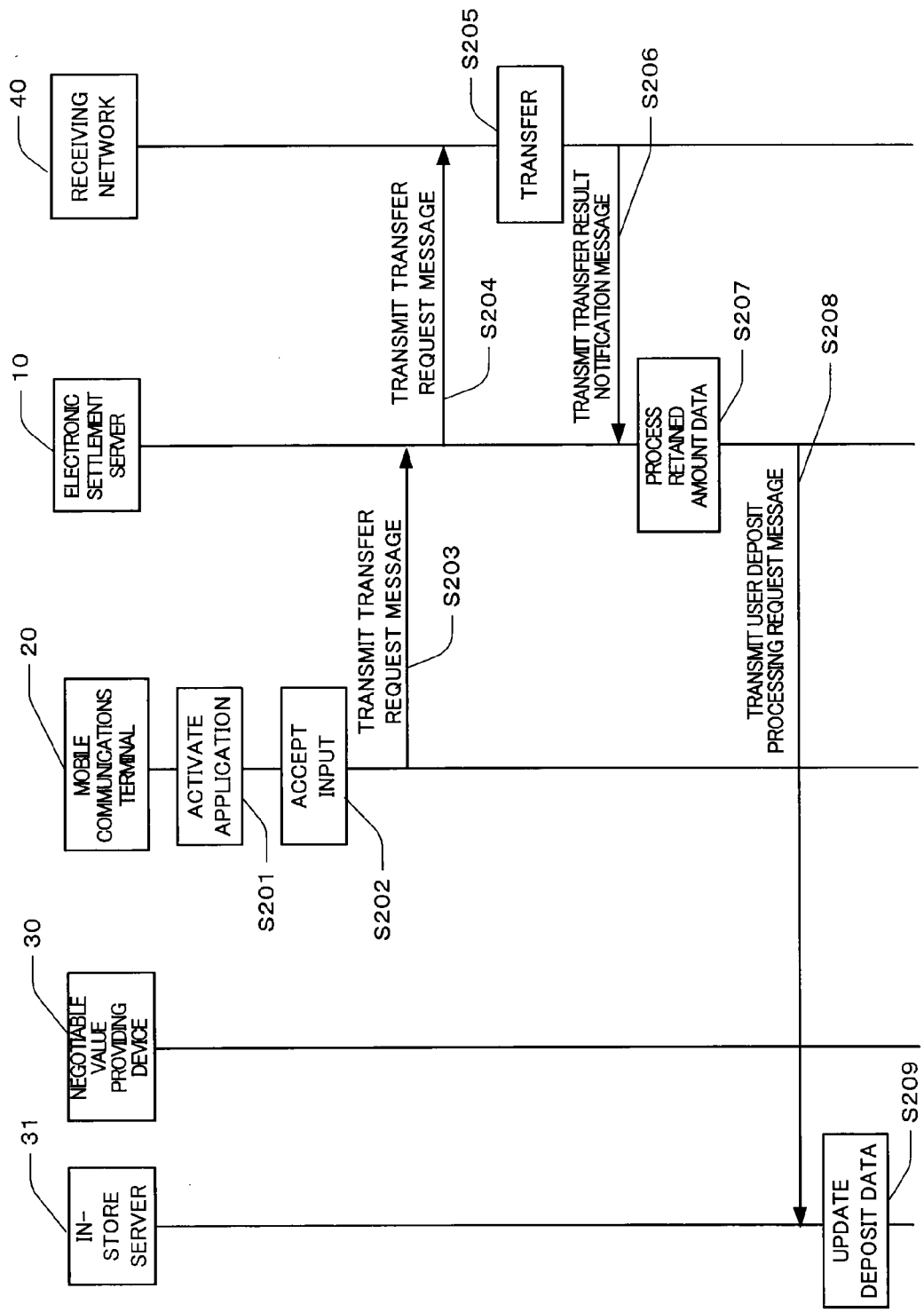
FIG. 12 is a sequence diagram illustrating an operation example of an electronic settlement system when a transfer from a user account to a settlement provider account is requested.
Figure 13:
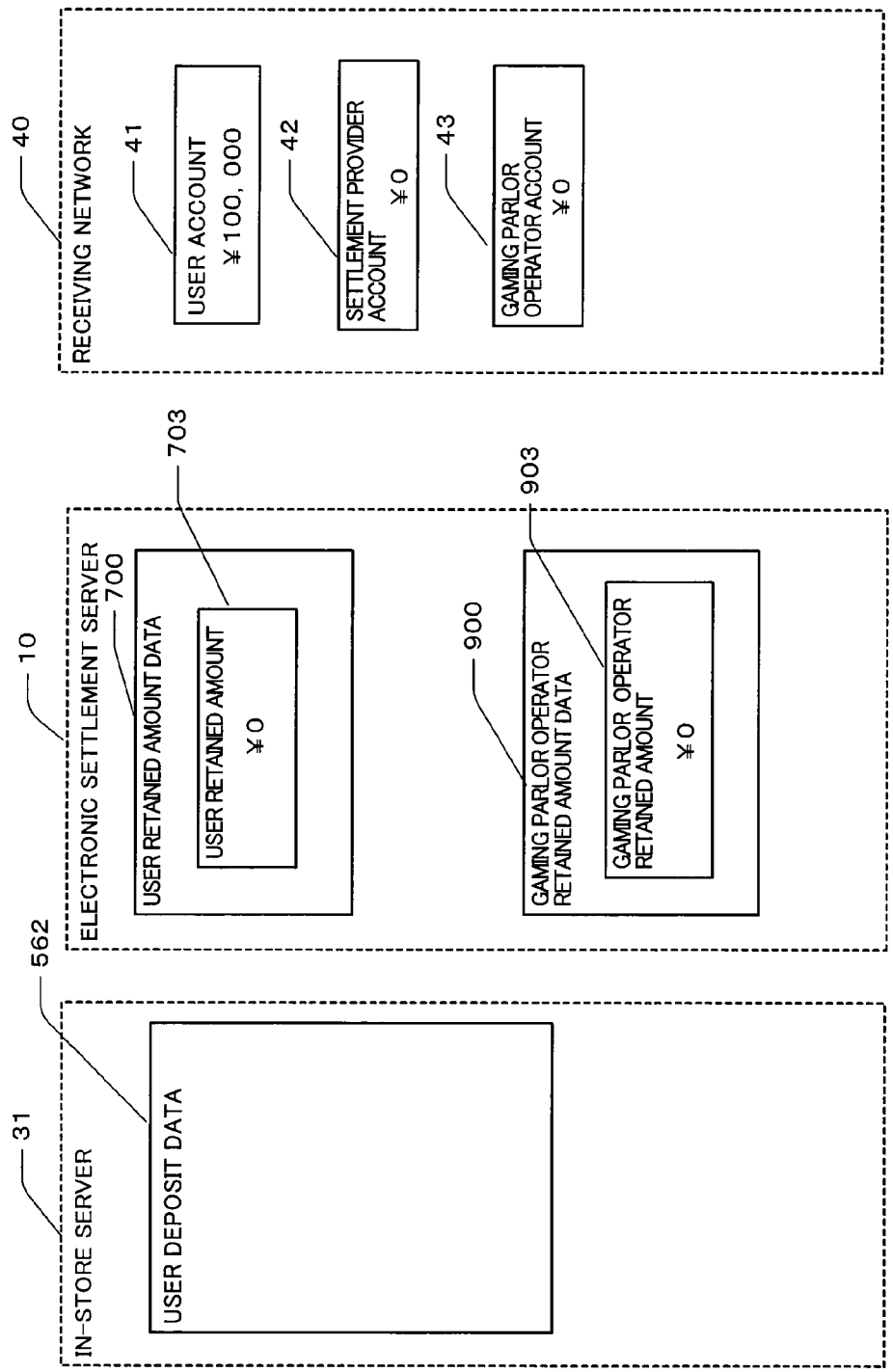
FIG. 13 is a diagram illustrating an operation example of processing of a user transfer amount performed between an electronic settlement server and a receiving network.
Figure 14:
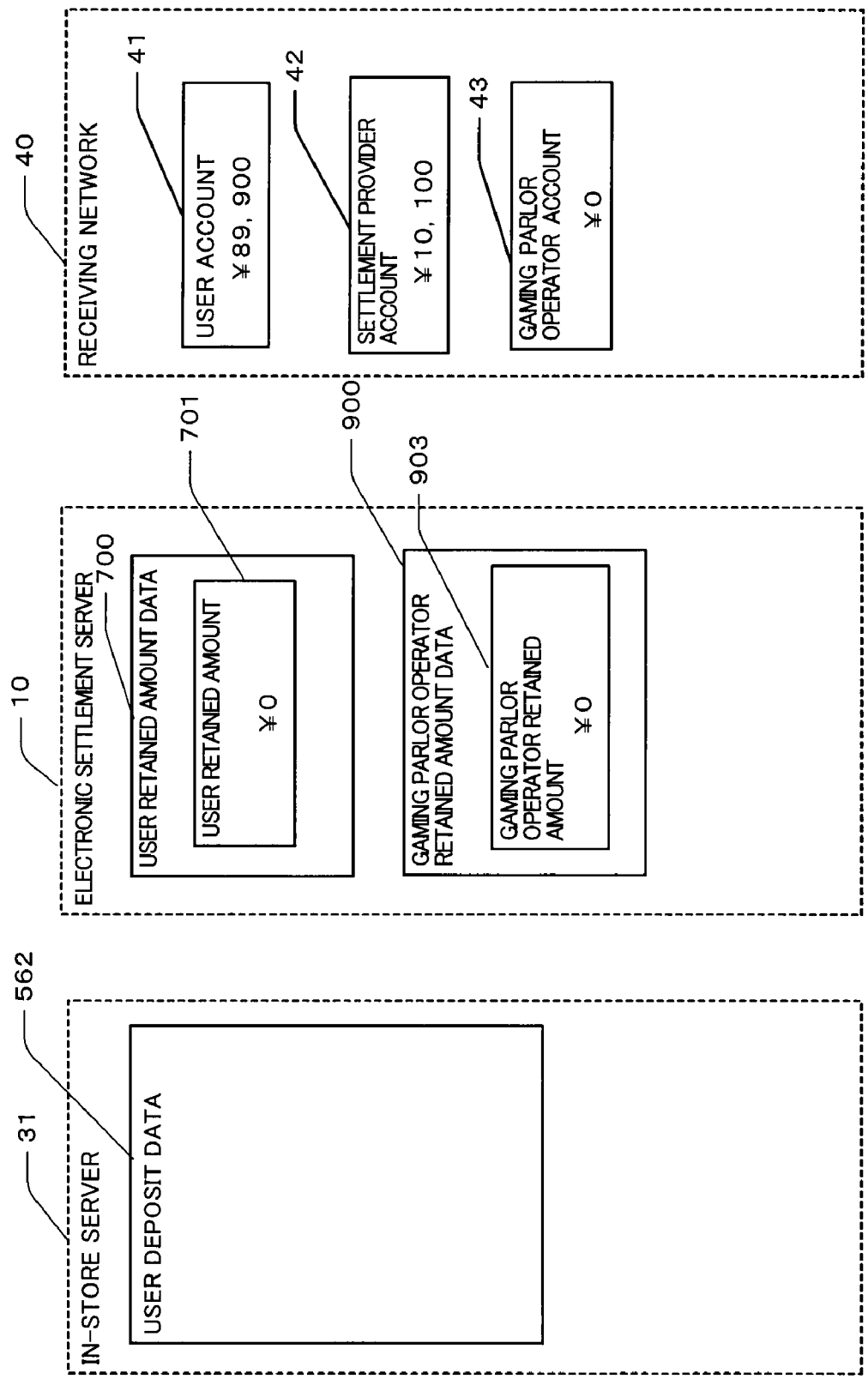
FIG. 14 is a diagram which is a continuation of FIG. 13 and which illustrates an operation example of processing of a user transfer amount performed between an electronic settlement server and a receiving network.
Figure 15A:
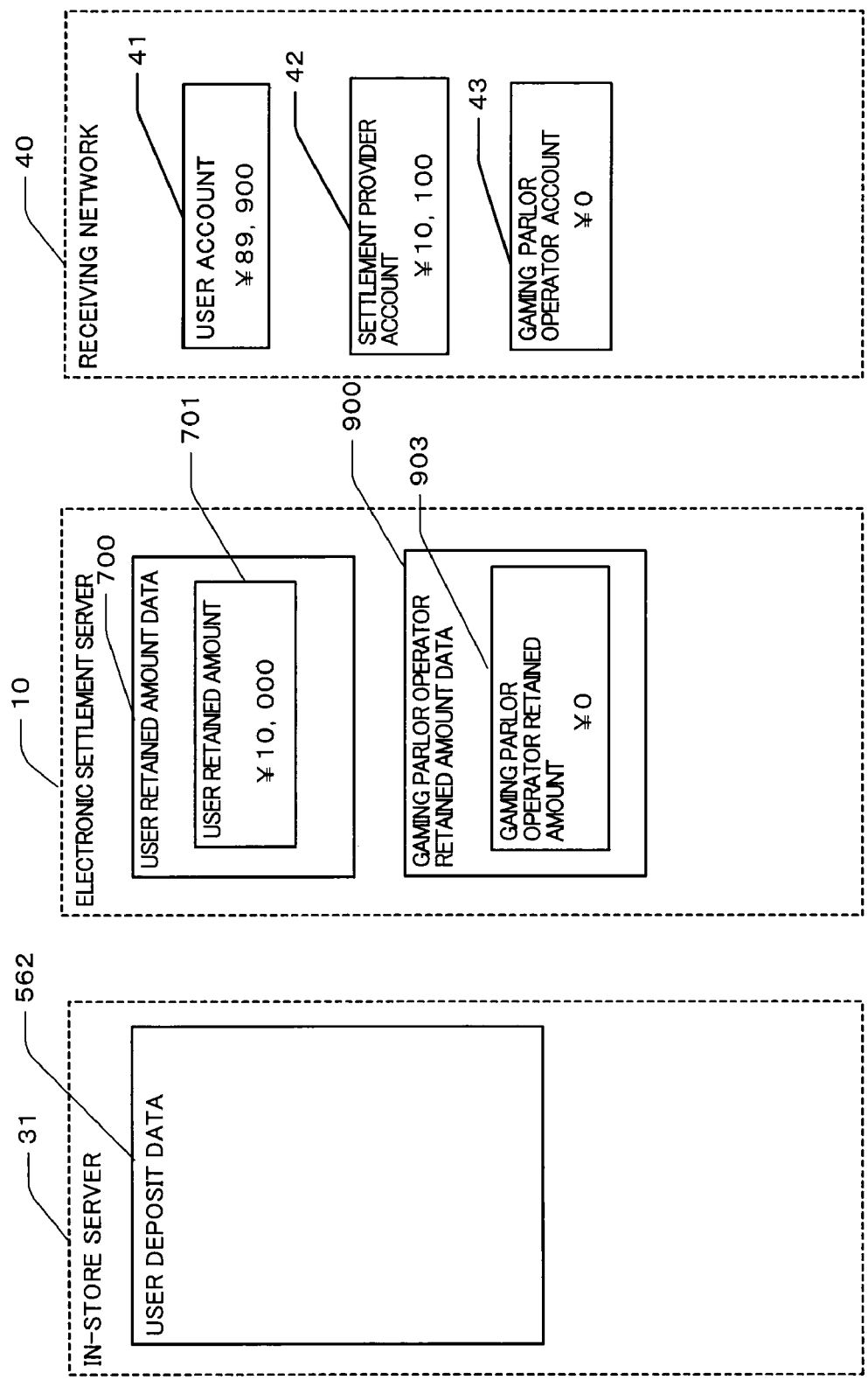
FIG. 15A is a diagram which is a continuation of FIG. 14 and which illustrates an operation example of processing of a user transfer amount performed between an electronic settlement server and a receiving network.
Figure 15B:
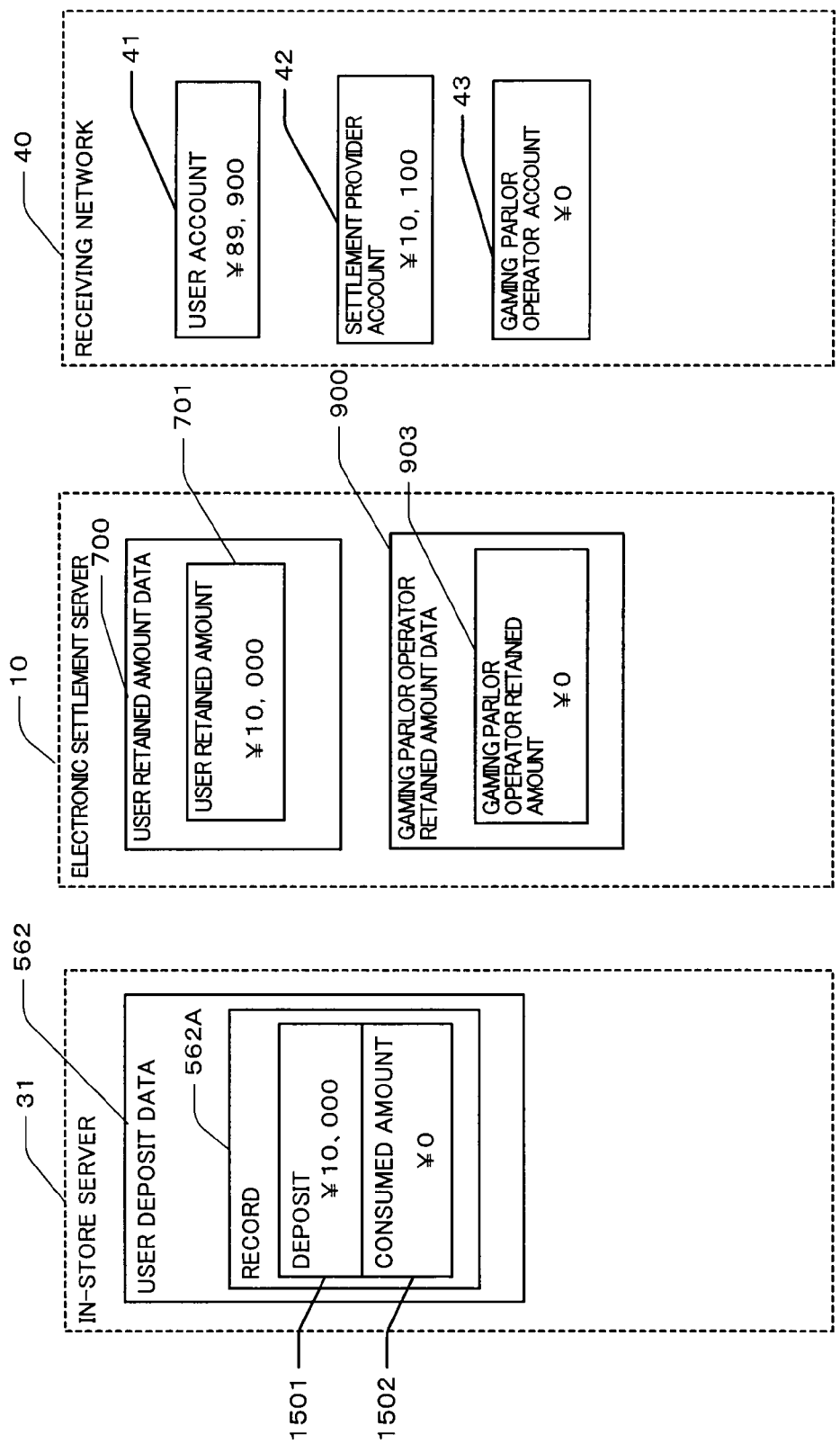
FIG. 15B is a diagram which is a continuation of FIG. 15A and which illustrates an operation example of processing of a user transfer amount performed between an electronic settlement server and a receiving network.
Figure 16:
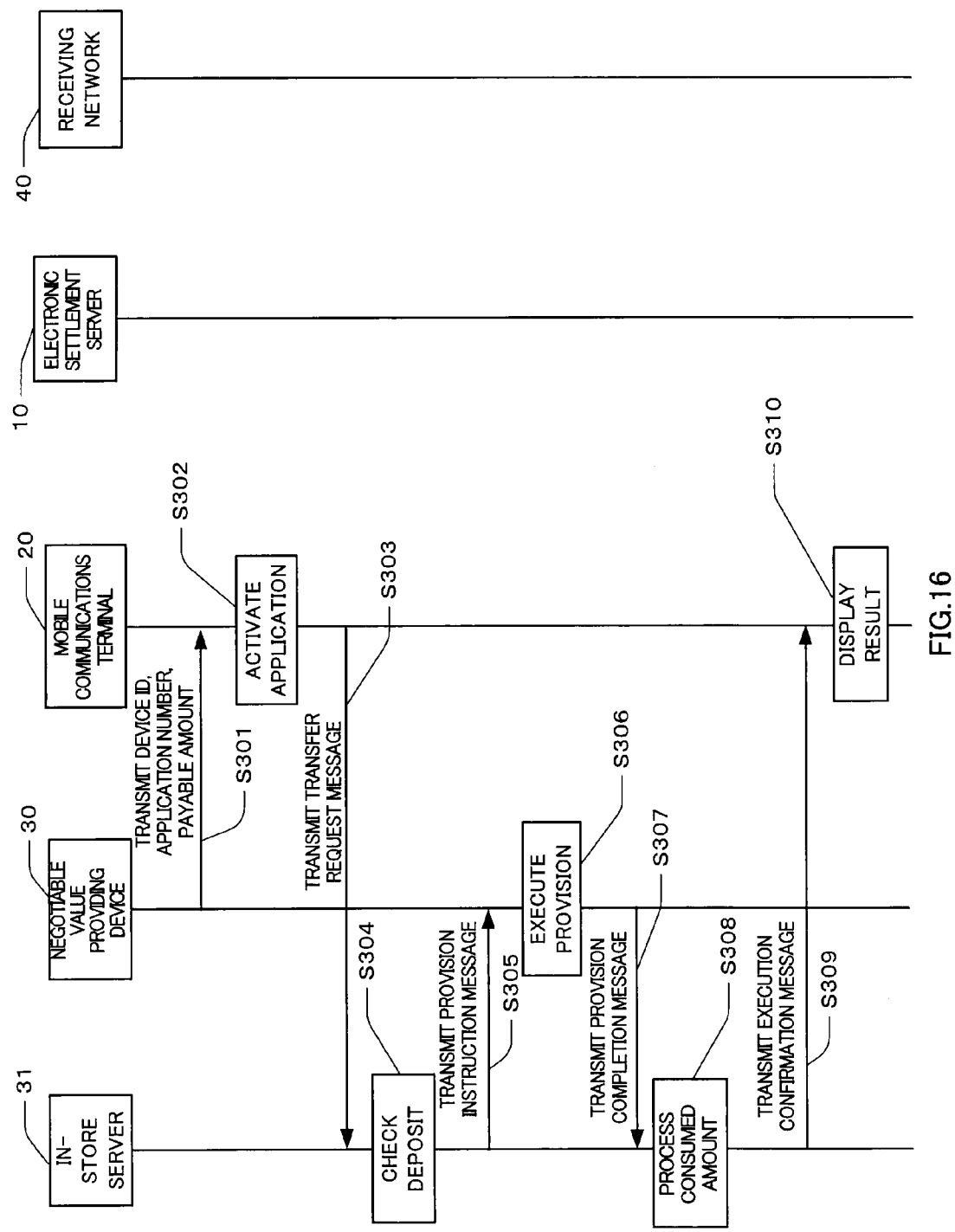
FIG. 16 is a sequence diagram illustrating an operation example of an electronic settlement system when communication using near field communication means is performed between a mobile communications terminal and a negotiable value providing device.
Figure 17:
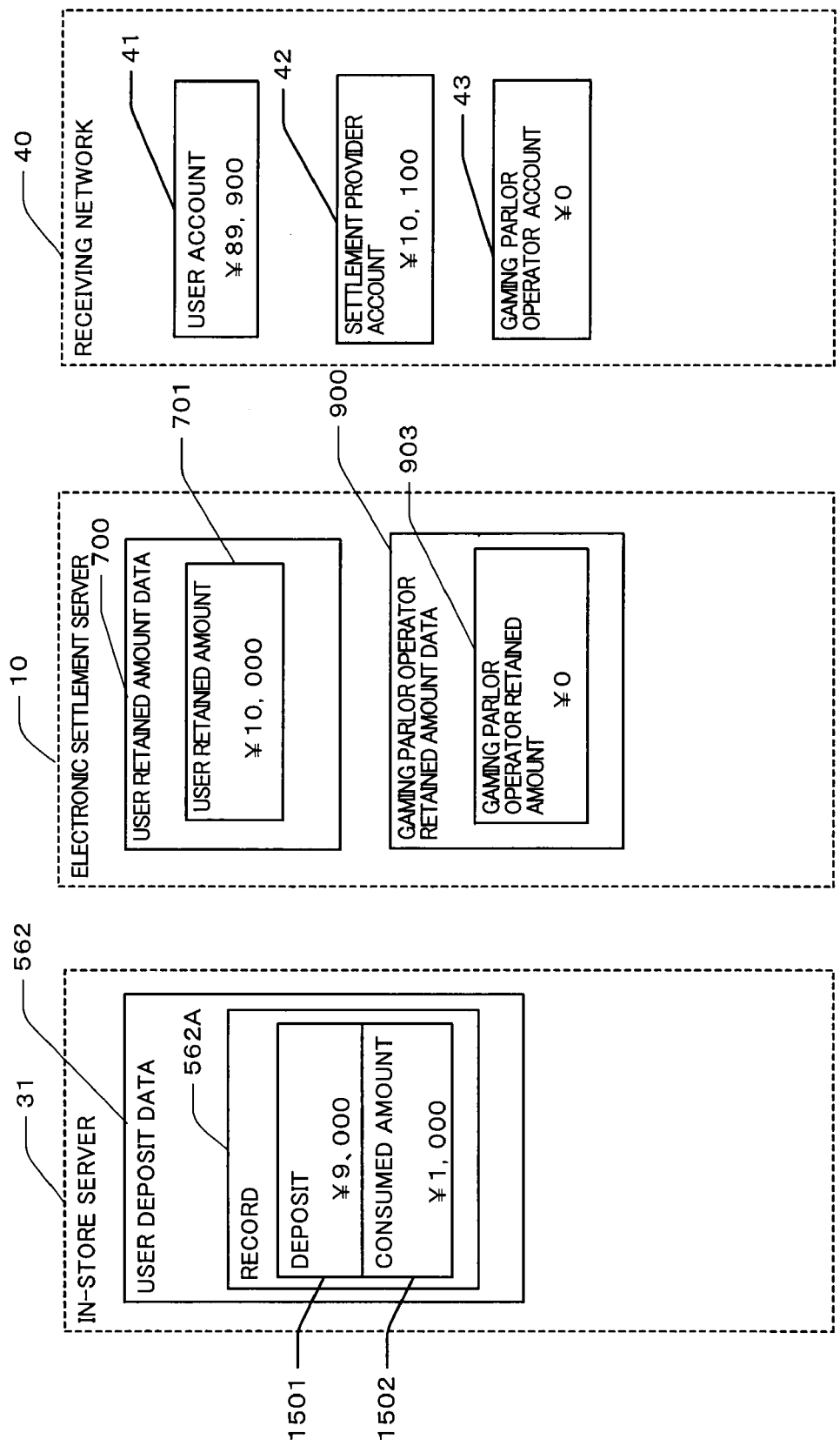
FIG. 17 is a diagram illustrating a state where, after the state illustrated in FIG. 15B, processing of steps S301 to S307 have been performed.
Figure 18:
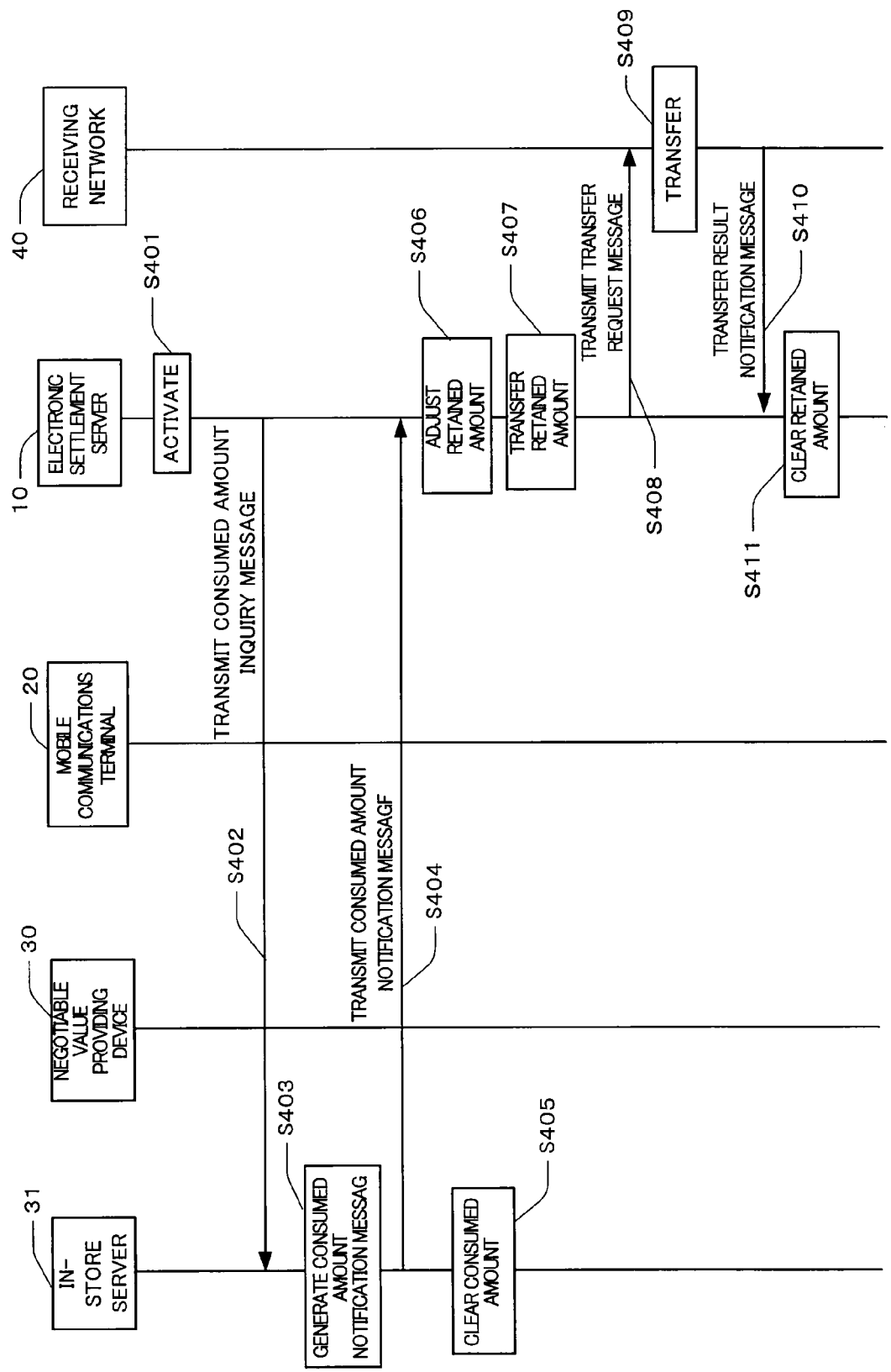
FIG. 18 is a sequence diagram illustrating an example of transfer processing to a gaming parlor operator account in an electronic settlement system.
Figure 19A:
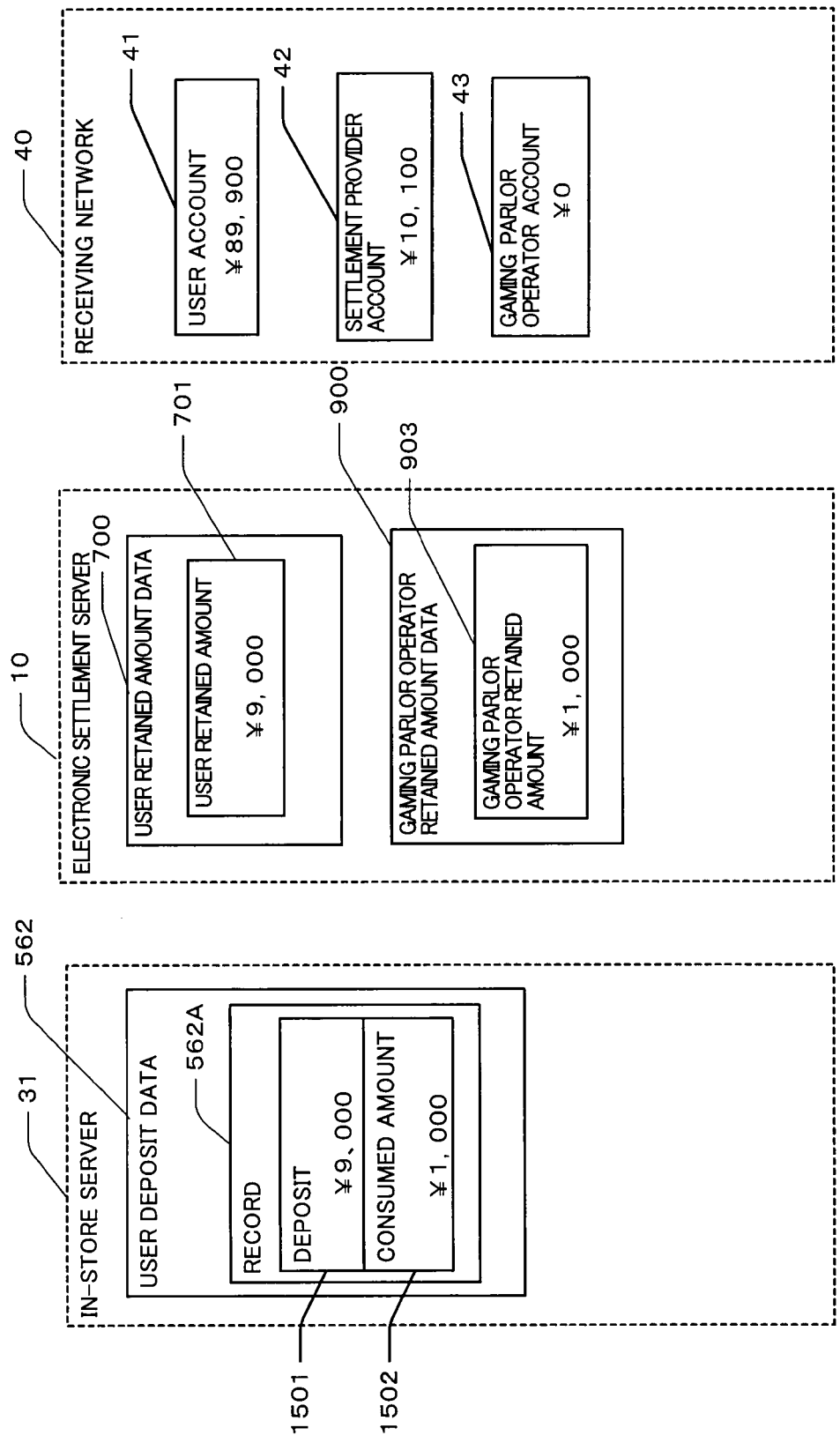
FIG. 19A is a diagram illustrating a result of executing processing of steps S401 to S405 after the state illustrated in FIG. 18.
Figure 19B:
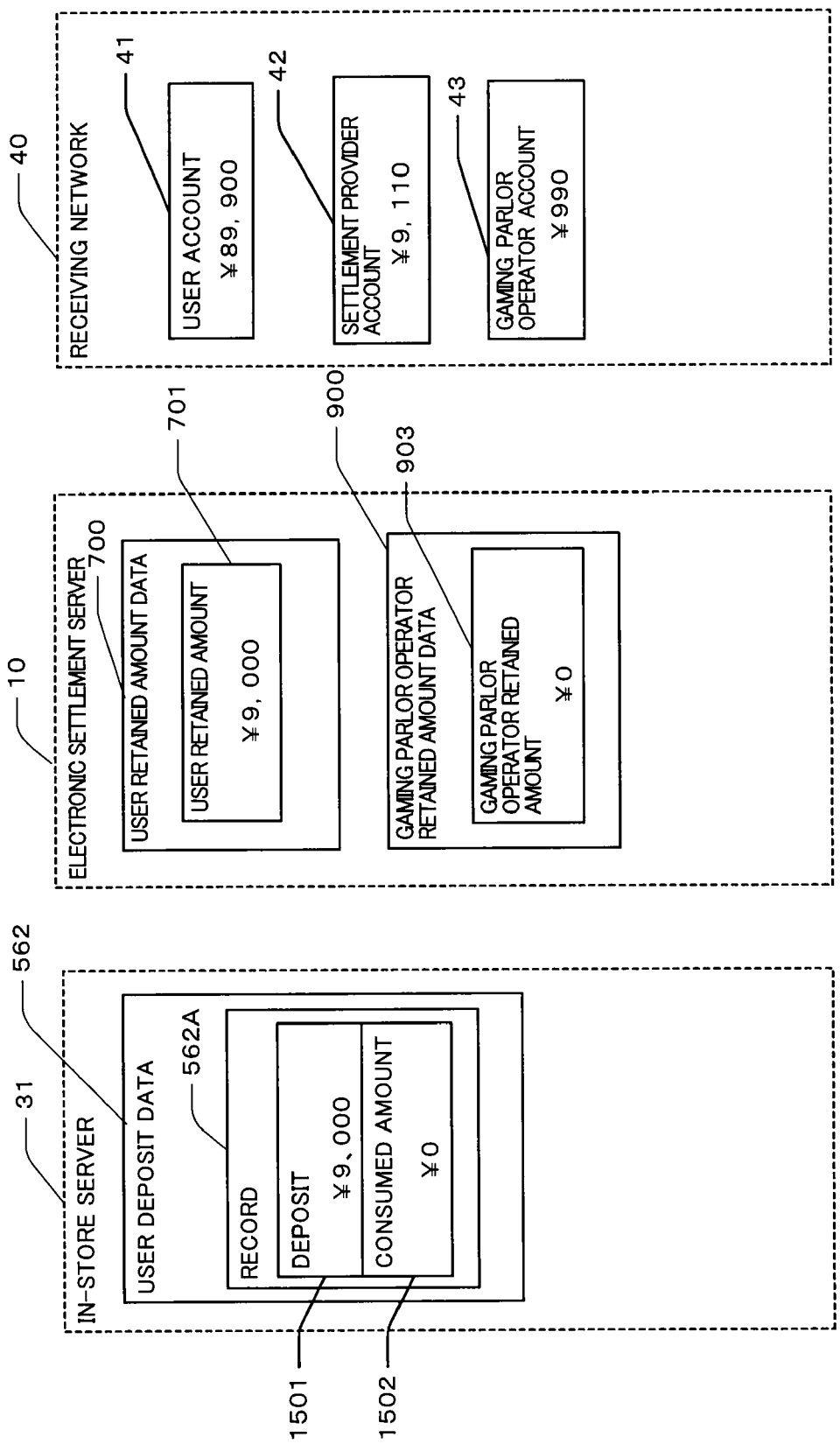
FIG. 19B is a diagram which is a continuation of FIG. 19A and which illustrates a result of processing performed among an in-store server, an electronic settlement server, and a receiving network.
Figure 20:
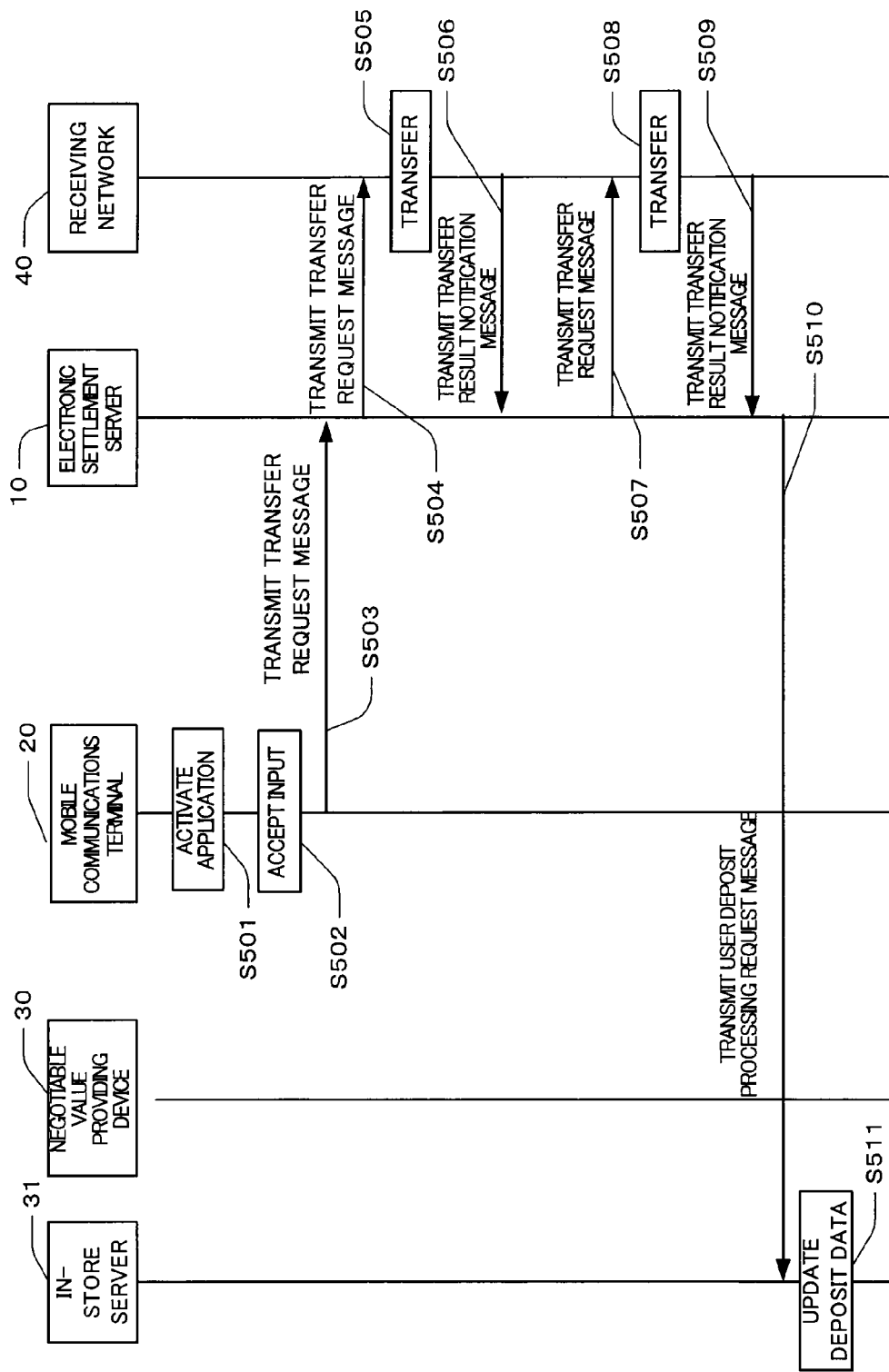
FIG. 20 is a sequence diagram illustrating an operation example of an electronic settlement system when a transfer from a user account to a settlement provider account is requested according to a second embodiment.
Figure 21:
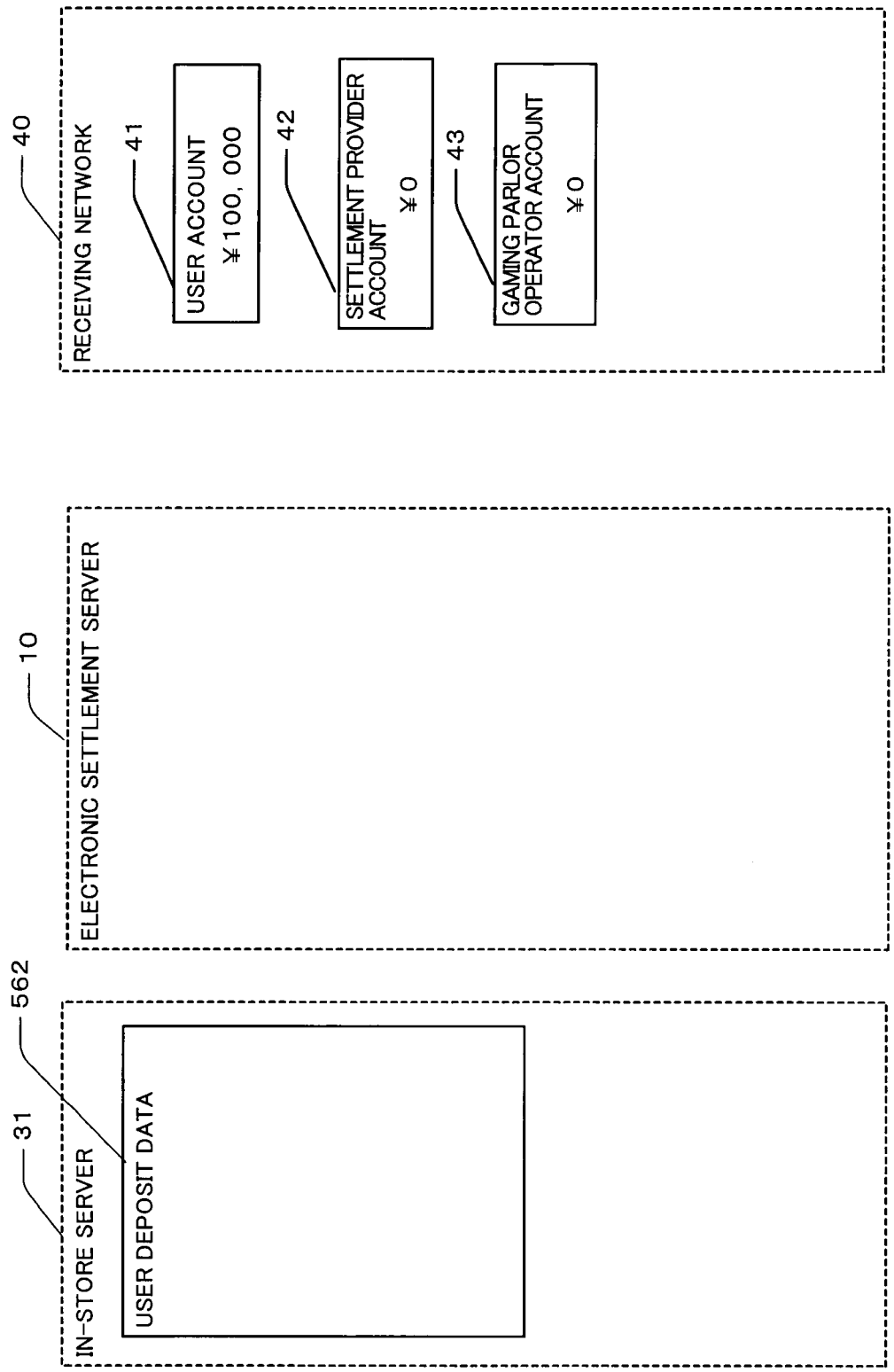
FIG. 21 illustrates an example of a state prior to a user transmitting a transfer request message to an electronic settlement server.
Figure 22:
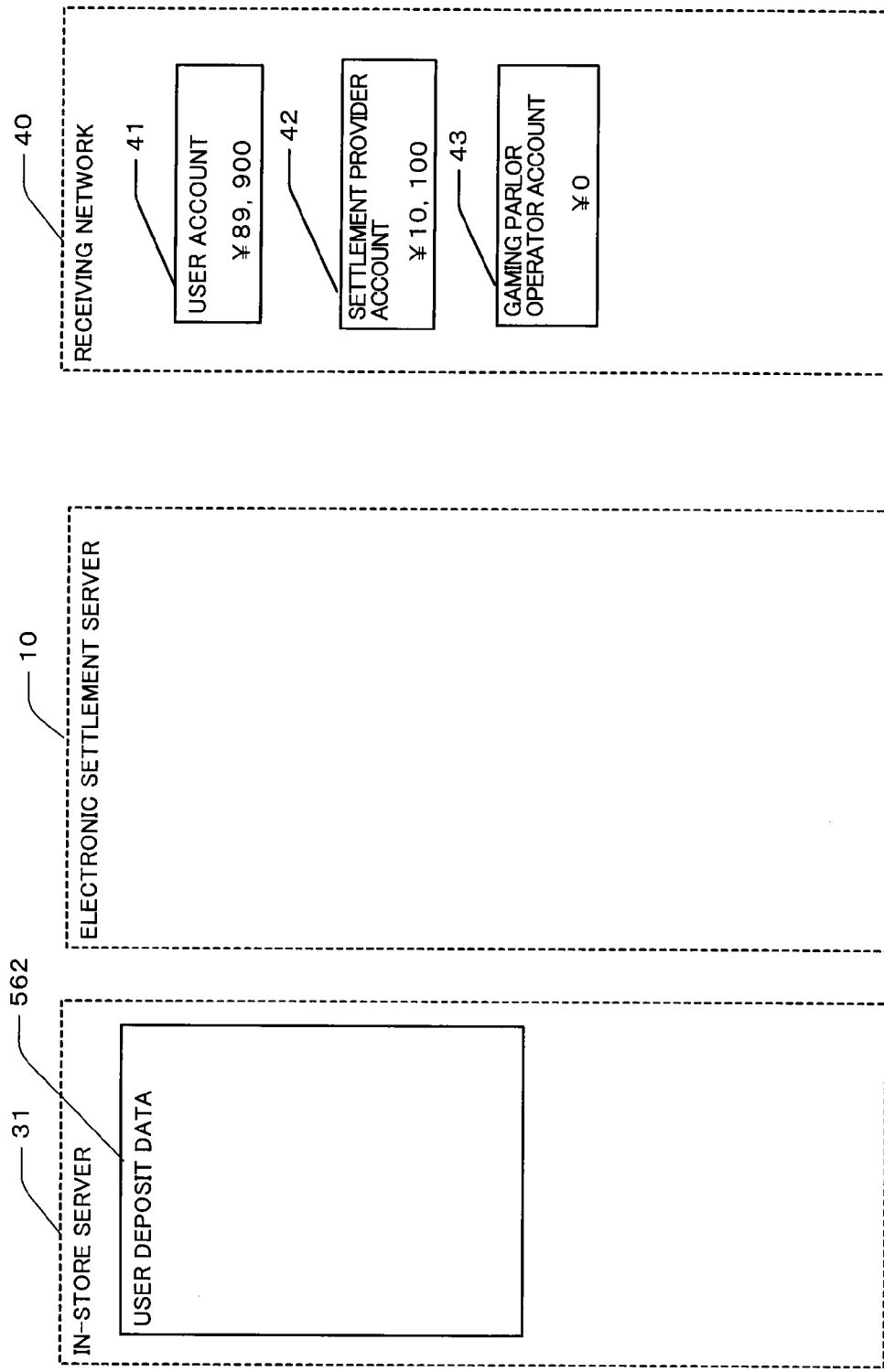
FIG. 22 illustrates a state where, after the state illustrated in FIG. 21, a user has transmitted a transfer request message form a mobile communications terminal to an electronic settlement server to transfer a user transfer amount of 10,000 yen.
Figure 23:
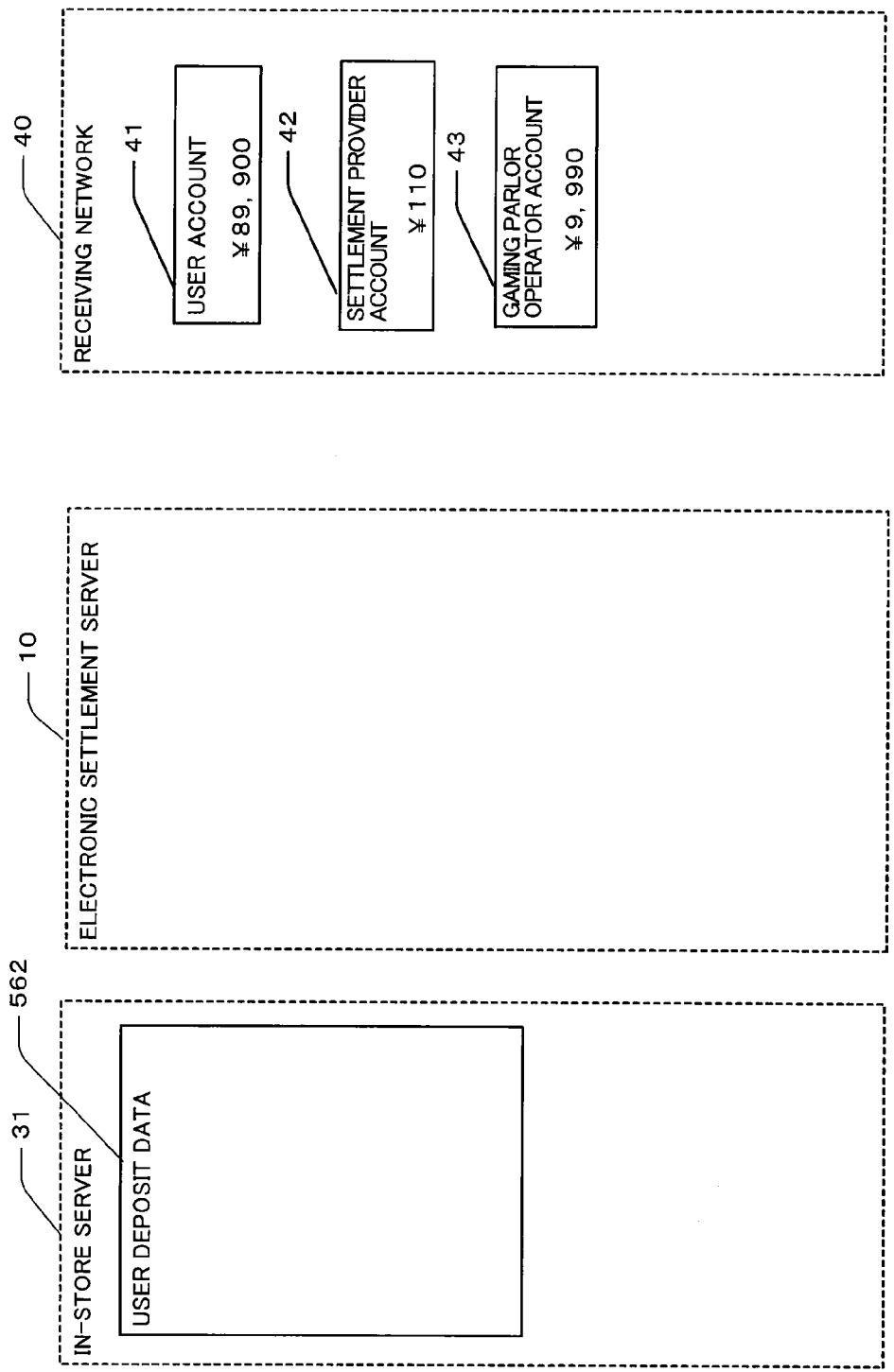
FIG. 23 illustrates a state where, after the state illustrated in FIG. 22, an electronic settlement server has transmitted a transfer request message to a receiving network so as to have an amount corresponding to a user transfer amount transferred from a settlement provider account to a gaming parlor operator account, and the receiving network has executed transfer processing according to the message.

1 . . . electronic settlement system
10 . . . electronic settlement server
20 . . . mobile communications terminal
30 . . . negotiable value providing device
31 . . . in-store server
40 . . . receiving network
41 . . . user account
42 . . . settlement provider account
43 . . . gaming parlor operator account
402 . . . payment request processing unit
403 . . . database unit
404 . . . transfer request processing unit
405 . . . adjustment processing unit
406 . . . provision instructing unit

The invention claimed is:

1. An electronic settlement system comprising: an electronic settlement server capable of requesting, via a communication network, a receiving network capable of transferring money among a user account, a settlement provider account, and a gaming parlor operator account, to make a transfer among the accounts; an in-store server capable of communicating with the electronic settlement server via a communication network; a negotiable value providing device capable of communicating with the in-store server; and a mobile communications terminal capable of communicating, via a communication network, with the in-store server as well as with the negotiable value providing device, wherein the electronic settlement server stores, for each user, a user retained amount that is an amount usable at each in-store server, transmits, to the receiving network, a first transfer request message that requests a user transfer amount corresponding to a transfer amount specified by a user to be transferred from a user account of the user to the settlement provider account, and adds the user transfer amount to the user retained amount and transmits a user deposit processing request message notifying the user transfer amount to the in-store server;

the in-store server calculates and stores, according to the user deposit processing request message, a deposit that is an amount deposited by the user;

the mobile communications terminal acquires, from the negotiable value providing device, a device identification information that identifies the negotiable value providing device, generates a payment request message including the device identification information, and transmits the payment request message to the in-store server;

the in-store server transmits, to the negotiable value providing device identified by the device identification information, in response to the payment request message from the mobile communications terminal, a provision instruction message that instructs a negotiable value to be provided, subtracts an amount corresponding to a user payable amount that is a cost of provision of the negotiable value from the user deposit and adds an amount corresponding to the user payable amount to the user consumed amount, and transmits a consumed amount notification message that notifies the consumed amount to the electronic settlement server;

the negotiable value providing device provides a negotiable value corresponding to the user payable amount upon receiving the provision instruction message from the in-store server; and the electronic settlement server adds the consumed amount to a gaming parlor operator retained amount in response to the consumed amount notification message, and transmits, to the receiving network, a second transfer request message that requests the receiving network to transfer an amount corresponding to the gaming parlor operator retained amount from the settlement provider account to the gaming parlor operator account.

2. The electronic settlement system of claim 1, wherein the electronic settlement server comprises:

storage means storing the user retained amount of each user and the gaming parlor operator retained amount of each gaming parlor operator;

a transfer request processing unit that transmits the first transfer request message to the receiving network, adds the user transfer amount to the user retained amount, and transmits the user deposit processing request message; and adjustment processing means which, in response to the consumed amount notification message, adds the consumed amount to the gaming parlor operator retained amount, and transmits the second transfer request message to the receiving network.

3. The electronic settlement system of claim 1, wherein the in-store server comprises:

storage means that stores a deposit and a consumed amount of each user;

deposit processing means that calculates, and causes to be stored, a deposit in response to the user deposit processing request message transmitted from the electronic settlement server;

payment request processing means which, upon receiving the payment request message that requests payment of the user payable amount, subtracts an amount corresponding to the user payable amount from the deposit and adds an amount corresponding to the user payable amount to the consumed amount;

provision instructing means which, according to a result of subtracting the user payable amount from the deposit, transmits the provision instruction message that instructs provision of the negotiable value; and adjustment processing means that transmits the consumed amount notification message that notifies the consumed amount to the electronic settlement server.

4. The electronic settlement system of claim 1, wherein the mobile communications terminal is adapted to, by communicating with the negotiable value providing device by near field communication means, acquire the device identification information from the negotiable value providing device, generate the payment request message including the device identification information, transmit the payment request message to the in-store server, and cause the in-store server to instruct the negotiable value providing device to provide the negotiable value corresponding to the user payable amount.

* * * * *